United States Patent [19]
Endo et al.

[11] Patent Number: 5,336,435
[45] Date of Patent: Aug. 9, 1994

[54] HIGH POLYMER AND FERROELECTRIC LIQUID CRYSTAL COMPOSITION UTILIZING SAME

[75] Inventors: Hiroyuki Endo; Satoshi Hachiya; Fumio Moriwaki, all of Sodegaura, Japan

[73] Assignee: Idemitsu Kosan Co., Ltd., Tokyo, Japan

[21] Appl. No.: 82,381

[22] Filed: Jun. 28, 1993

Related U.S. Application Data

[62] Division of Ser. No. 992,050, Dec. 17, 1992, Pat. No. 5,264,517.

[30] Foreign Application Priority Data

Dec. 20, 1991 [JP] Japan .................. 3-354443

[51] Int. Cl.⁵ ............... C09K 19/34; C09K 19/52
[52] U.S. Cl. ............... 252/299.61; 252/299.01
[58] Field of Search ............ 252/299.01, 299.61; 528/15, 26, 27, 31

[56] References Cited

U.S. PATENT DOCUMENTS 5,264,517 11/1993 Endo et al. .................. 528/26

FOREIGN PATENT DOCUMENTS

| | | |
|---|---|---|
| 0493601 | 7/1992 | European Pat. Off. |
| 0509465 | 10/1992 | European Pat. Off. |
| 9201764 | 2/1992 | World Int. Prop. O. |

*Primary Examiner*—Philip Tucker
*Attorney, Agent, or Firm*—Antonelli, Terry, Stout & Kraus

[57] ABSTRACT

A high polymer comprising a recurring unit (I) represented by the formula:

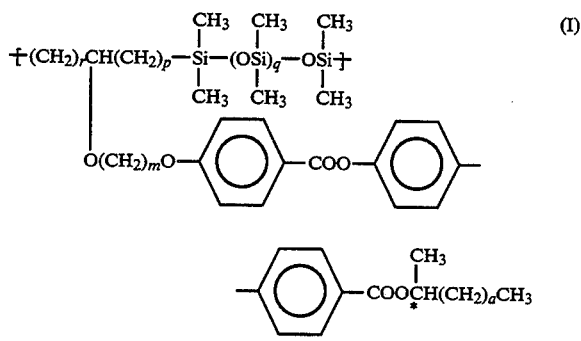

and a recurring unit (II) represented by the formula:

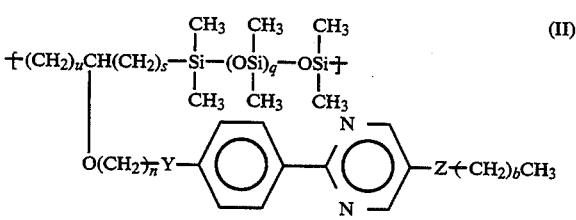

wherein
r, u, p and s each represent an integer of 2 to 5, q represents a number of 0 to 20, m represents an integer of 8 to 12, n represents an integer of 6 to 15, a represents an integer of 1 to 8, b represents an integer of 5 to 15, Y represents —O— or —COO—, Z represents —O— or a single bond, and * represents an asymmetric carbon, and a ferroelectric liquid crystal composition comprising the high polymer and a low molecular weight smectic liquid crystal are disclosed.

13 Claims, 26 Drawing Sheets

HIGH POLYMER AND FERROELECTRIC LIQUID CRYSTAL COMPOSITION UTILIZING SAME

This application is a divisional application of application Ser. No. 992,050, filed Dec. 17, 1992, now U.S. Pat. No. 5,264,517.

BACKGROUND OF THE INVENTION (a) Field of the Invention

The present invention relates to novel high polymers and to ferroelectric liquid crystal compositions containing the same. More particularly, the present invention relates to novel high polymers and ferroelectric liquid crystal compositions which are suitable materials for liquid crystal devices used in optoelectronics fields, for example, digital display devices of desk calculators, clocks and watches, dot-matrix display devices, electrooptic shutters, electrooptic diaphragms, optical modulators, optical-path transfer switches in optical communication systems, memories, liquid crystal printer heads and varifocal lenses.

(b) Description of the Related Art

Display devices utilizing low molecular weight liquid crystals have been used widely for digital display of desk calculators, clocks and watches, etc. In these fields of utilization, the conventional low molecular weight liquid crystals are generally supported between a couple of glass substrates spaced from each other in microns. However, such an adjustment of the space has been impracticable in the production of large picture planes or curved picture planes. A means which has been employed for solving the problem is the development of liquid crystal polymers or of liquid crystal compositions containing low molecular weight liquid crystals and high polymers.

For example, in Japanese Patent Application Kokai Koho (Laid-open) No. 63-284291 proposed are liquid crystal compositions comprising low molecular weight liquid crystals and polymer liquid crystals having asymmetric carbon atoms. However, the side chain polymer liquid crystals exemplified therein have acrylate main chains or siloxane main chains, which cannot provide sufficient spaces between side chains, and increasing their molecular weights makes it difficult to mix the low molecular weight liquid crystals in a sufficient quantity to attain a great increase in response speed. That is, the liquid crystal compositions have difficulty in uniting polymeric properties and high speed response.

As an attempt to unite polymeric properties and high speed response by mixing non-liquid-crystalline high polymers and low molecular weight liquid crystals, Japanese Patent Application Kokai Koho (Laid-open) No. 61-47427 discloses compositions which are endowed with self shape retention by blending amorphous polymers into low molecular weight liquid crystals. However, the compositions involve a problem in that after allowed to stand for a long time, they are apt to separate because of the liquid crystal regions dispersed in the matrix of the high polymers (resins). Further, the compositions are poor in contrast because of the island-dispersion of the low molecular weight liquid crystals, and such a dispersion system makes it difficult to control their orientation. In Japanese Patent Application Kokai Koho (Laid-open) Nos. 62-260859 and 62-260841 disclosed are ferroelectric composite films containing thermoplastic resins and low molecular weight liquid crystals which are compatible with each other. However, it is difficult to select the low molecular weight liquid crystals compatible with the thermoplastic resins, and it is also difficult to control the orientation of the low molecular weight liquid crystals. Further, the low molecular weight liquid crystals are limited to ferroelectric liquid crystals. In Japanese Patent Application Kokai Koho (Laid-open) No. 1-198683 disclosed are compositions which comprise polymers containing proton donors (or proton acceptors) and low molecular weight liquid crystals containing proton acceptors (or proton donors). However, the compositions also involve a problem in that the structures of the polymers and the low molecular weight liquid crystals are limited to those having proton donors or proton acceptors.

ABSTRACT OF THE INVENTION

An object of the present invention is to provide liquid crystal compositions which permit easy control of orientation, can form excellent alignment, exhibit ferroelectricity, are quick to respond to external factors, and are useful as materials of display devices with large or curved picture planes.

Another object of the present invention is to provide novel high polymers, which are so compatible with low molecular weight liquid crystals as to prevent phase separation and are suitable materials of the liquid crystal compositions.

As the result of researches made by the inventors to solve the above-described problems, they found that the objective liquid crystal compositions are obtainable by using as a high polymer component a novel high polymer of a specific structure which provides a wide space between side chains. Based on the finding, they consequently completed the present invention.

That is, the present invention provides a novel high polymer comprising a recurring unit (I) represented by the formula:

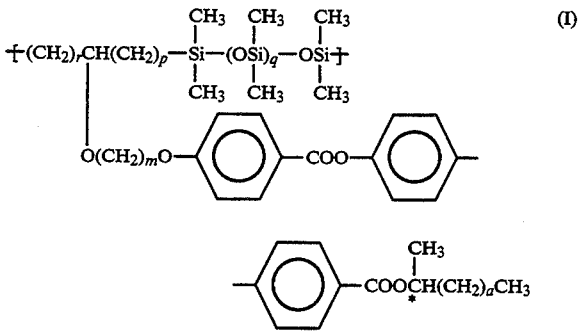

and a recurring unit (II) represented by the formula:

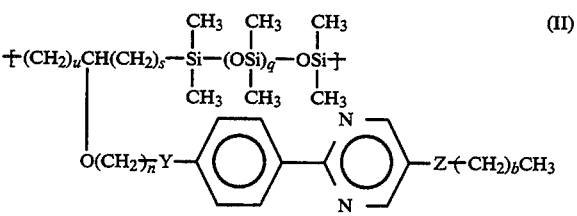

wherein
r, u, p and s each represent an integer of 2 to 5,
q represents a number of 0 to 20,
m represents an integer of 8 to 12,
n represents an integer of 6 to 15, a represents an integer of 1 to 8,
b represents an integer of 5 to 15,
Y represents —O— or —COO—,
Z represents —O— or a single bond,
and * represents an asymmetric carbon.

The present invention further provides a ferroelectric liquid crystal composition comprising the novel high polymer and a low molecular weight liquid crystal. Because of the compatibility of the novel high polymer with the low molecular weight liquid crystal, the ferroelectric liquid crystal composition forms a uniform mixture, which permits easy and uniform orientation of the composition.

PREFERRED EMBODIMENTS OF THE INVENTION

Figure 1:
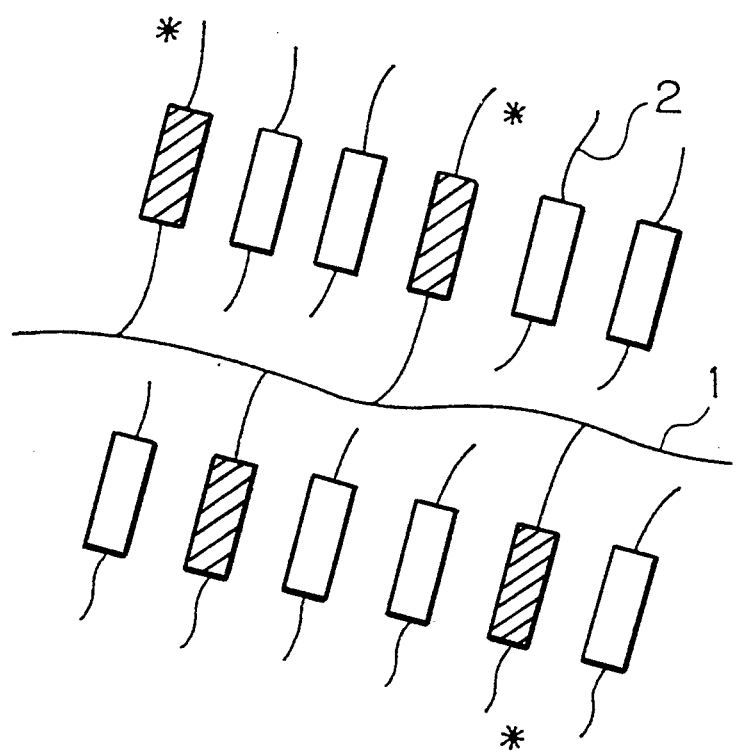
FIG. 1 is a schematic view illustrating the mixed state of the liquid crystal composition of the present invention.

The weight average molecular weight (Mw) of the high polymer of the present invention is preferably 1,000 to 1,000,000, more preferably 1,000 to 100,000. If the Mw is less than 1,000, the high polymer may become poor in moldability into film or coating, and an Mw of more than 1,000,000 may have undesirable effects, such as a decrease in the response speed.

A preferred molar ratio between the recurring unit (I) and the recurring unit (II) ranges from 95:5 to 5:95.

The high polymer of the present invention may be prepared by carrying out a hydrosilylation of a diene compound (III) represented by the formula:

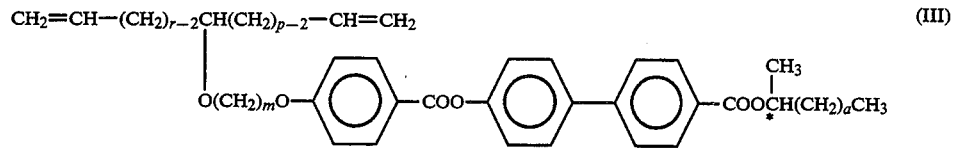

wherein r, p, m, a and * are as defined above,
a diene compound (IV) represented by the formula:

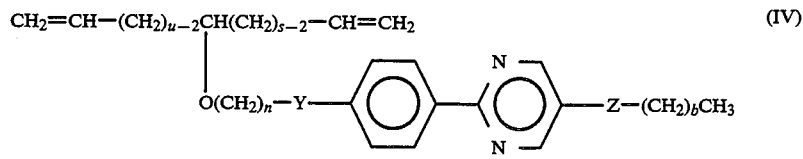

wherein u, s, n, b, Y and Z are as defined above,
and a silicon compound (V) represented by the formula:

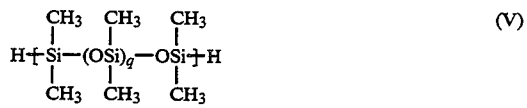

wherein q is as defined above,
in a solvent in the presence of a catalyst.

The polymerization degree of the high polymer varies depending on the ratio of the total amount of the diene compound (III) and the diene compound (IV) used to the amount of the silicon compound (V) used. High polymers of higher polymerization degrees are obtainable by adjusting the molar ratio of [(III)+-(IV)]/(V) nearer 1, and those of lower polymerization degrees are obtainable by adjusting the molar ratio to a value greater or lesser than 1. A preferred molar ratio between the diene compound (III) and the diene compound (IV), (III):(IV), ranges from 95:5 to 5:95.

Preferred examples of the solvent to be used for the hydrosilylation of the compounds (III), (IV) and (V) include inert aromatic hydrocarbons of a boiling point of 70° C. or higher, such as benzene, toluene and xylene, and inert ethers of a boiling point of 65° C. or higher, such as tetrahydrofuran and diisopropyl ether. Preferred examples of the catalyst include platinum catalysts, for example, hydrogen hexachloroplatinate, such as hydrogen hexachloroplatinate (IV) hexahydrate, and dicyclopentadienylplatinum chloride. The reaction is preferably carried out for 5 to 20 hours at 60° to 100° C. in an atmosphere of an inert gas.

The diene compound (III) to be used as a material of the high polymer may be prepared, for example, by the method described below.

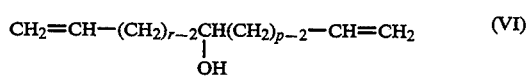

wherein r and p are as defined above,
is etherified with a difunctional compound (VII) represented by the formula:

$$X(CH_2)_mX \qquad (VII)$$

wherein m is an integer of 8 to 12, and X is —Br, —I or —OSO$_2$C$_6$H$_4$CH$_3$,
in a solvent in the presence of a base. The reaction mixture obtained is purified and then etherified with methyl 4-hydroxybenzoate in a solvent in the presence of a base. After the reaction mixture obtained is purified, hydrolysis of the purified product is carried out in an alkaline aqueous solution or an alkaline water-alcohol solution mixture. The obtained reaction solution is poured into water, and the mixed liquid is acidified to obtain a product by ether extraction or filtration. The product is allowed to react with a reagent for forming acyl halides, and the acyl halide obtained is esterified in a solvent with a hydroxy compound (VIII) represented by the formula:

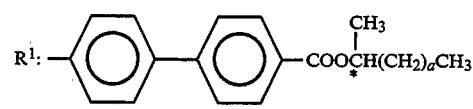

wherein a is as defined above.

For example, these reactions proceed as follows.

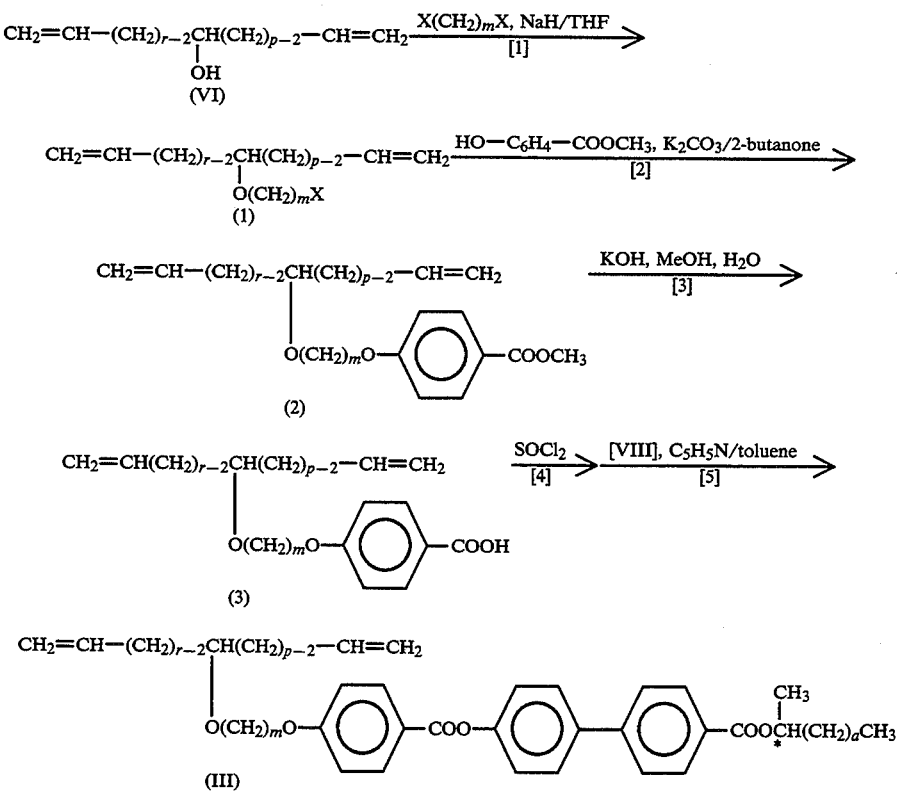

The etherification [1] of the alcohol (VI) and the difunctional compound (VII) is carried out in a solvent in the presence of a base, to obtain the compound (1).

Typical examples of the alcohol (VI) include 1,4-pentadien-3-ol, 1,5-hexadien-3-ol, 1,6-heptadien-3-ol, 1,7-octadien-3-ol, 1,6-heptadien-4-ol, 1,8-nonadien-5-ol and 1,10-undecadien-6-ol.

Typical examples of the difunctional compound (VII) include dibromooctane, diiodooctane, ditosyloctane, dibromononane, diiodononane, ditosylnonane, dibromodecane, diiododecane, ditosyldecane, dibromoundecane, diiodoundecane, ditosylundecane, dibromododecane, diiodododecane and ditosyldodecane.

Suitable examples of the solvent used for the etherification [1] include aprotic polar solvents, such as tetrahydrofuran and N,N-dimethylformamide, and suitable examples of the etherification catalyst include metal hydrides, such as sodium hydride, metal hydroxides, such as potassium hydroxide and sodium hydroxide, and basic compounds which ionize —OH.

The etherification [1] is carried out by introducing the alcohol (VI) into a mixture of the base and solvent to convert it to an alkoxide at room temperature (in the cases of compounds and reagents of low reactivity, at an elevated temperature), introducing thereto the difunctional compound (VII) and then stirring the resulting mixture at 50° to 100° C.

Subsequently, the etherification [2] of the compound (1) with methyl 4-hydroxybenzoate is carried out in a solvent in the presence of a base, to obtain the compound (2). Suitable examples of the solvent used for the etherification [2] include ketone solvents, such as acetone and 2-butanone, and inert ethers, such as tetrahydrofuran and diethyl ether, and suitable examples of the etherification reagent include carbonates, such as potassium carbonate and sodium carbonate, and metal hydroxides, such as potassium hydroxide and sodium hydroxide.

The etherification [2] is carried out by introducing methyl 4-hydroxybenzoate, the compound (1) obtained from the etherification [1], the base and the solvent in a reactor, not in order, and stirring the mixture at 50° to 100° C.

The hydrolysis [3] of the obtained compound (2) is carried out in an alkaline aqueous solution or an alkaline water-alcohol solution mixture, with heating, according to demand, to obtain the compound (3). The halogenation [4] of the compound (3) is then carried out by using a reagent for halogenating acids, and thus obtained acyl halide is esterified [5] with the hydroxy compound (VIII) in a solvent, such as toluene, in the presence of pyridine, etc., to obtain the objective diene compound (III).

In the hydrolysis [3], suitable examples of the base include metal hydroxides, such as potassium hydroxide and sodium hydroxide, and suitable examples of the alcohol include water-soluble lower alcohols, such as methanol and ethanol. Although the hydrolysis may be carried out by heating a mixture of only the three, the esterified compound, alkali catalysts and water, addition of alcohols increases the solubility of the ester compound, and the reaction proceeds more easily.

The halogenation [4] is carried out by using reagents usually used for the preparation of acyl halides, such as thionyl chloride, phosphorus oxychloride and phosphorus pentachloride. Other reagents, such as pyridine and triethylamine, may be added into the reaction system.

Suitable examples of the solvent used for the esterification [5] include inert ethers, such as tetrahydrofuran, and inert hydrocarbons, such as toluene and hexane.

The esterification [5] is carried out by introducing thus obtained acyl chloride or a solution of the acyl chloride dissolved in a solvent, into a solution containing acceptors of hydrogen halides, for example, pyridine and tertiary amines, such as triethylamine, followed by stirring. If the reaction exhibits low reactivity, the mixture may be heated to 30° to 80° C.

The diene compound (III) may also be prepared by other methods, for example, by etherifying the alcohol (VI) with the difunctional compound (VII) in a solvent in the presence of a base, purifying the reaction mixture, and etherifying the purified product with an hydroxy compound (IX) represented by the formula:

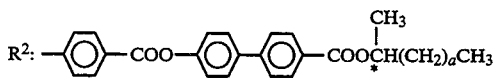

wherein a is as defined above.
in a solvent in the presence of a base. For example, these reactions proceeds as follows.

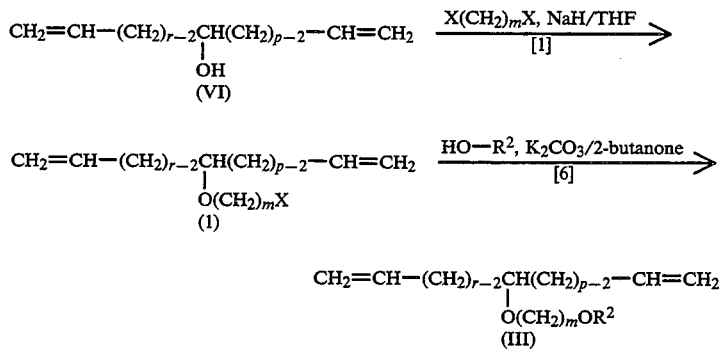

The etherification [1] for the production of the compound (1) is carried out in the same manner as above described. The solvent, the reagent and the reaction conditions employed in the etherification [6] are the same as those employed in etherification [2].

The optically active group in the hydroxy compounds (VIII) and (IX) is introduced by using an optically active alcohol $R^3OH$ by utilizing the following reaction.

Optically active alcohols represented by $R^3OH$ include (+)-2-butanol, (−)-2-butanol, (+)-2-pentanol, (−)-2-pentanol, (+)-2-hexanol, (−)-2-hexanol, (+)-2-heptanol, (−)-2-heptanol, (+)-2-octanol, (−)-2-octanol, (+)-2-nonanol, (−)-2-nonanol, (+)-2-decanol, (−)-2-decanol, (+)-2-undecanol and (−)-2-undecanol.

The diene compound (IV) that is another material of the high polymer may be prepared according to common methods from a compound represented by the following formula:

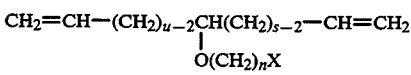

wherein u, s, n and X are as defined above,
which may be prepared in a method similar to the method for preparing the above-described compound (1).

As to the silicon compound (V) that is more another material of the high polymer of the present invention and has two Si—H bonds, the one wherein q is 0, 1 or 2 is used as a single compound since there scarcely exists a distribution among the value of q. The one wherein q has a large value has a distribution in its polymerization degree (the value of q), so that q represents an average value. Therefore, the value of q in the resulting high polymer also is an average value. Concrete examples of the silicon compound to be used include 1,1,3,3-tetramethyldisiloxane, 1,1,3,3,5,5-hexamethyltrisiloxane, 1,1,3,3,5,5,7,7-octamethyltetrasiloxane, and various α,ω-hydrogen olygodimethylsiloxanes of 6 or more silicon atoms.

The present invention further provides a ferroelectric liquid crystal composition comprising the high polymer and a low molecular weight smectic liquid crystal.

The ferroelectric liquid crystal composition of the present invention may be prepared by mixing the high polymer and the low molecular weight smectic liquid crystal.

The low molecular weight smectic liquid crystal to be used in the present invention is not particularly limited and may be at least one selected from known compounds. Some examples of the low molecular weight smectic liquid crystal include the followings:

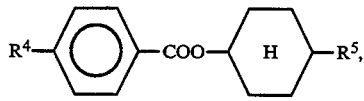
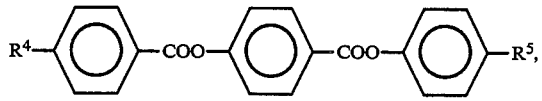
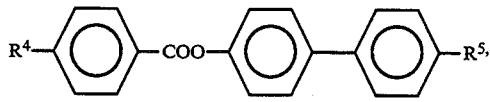
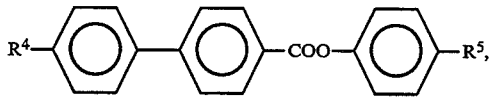
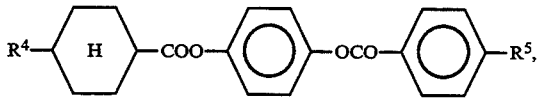
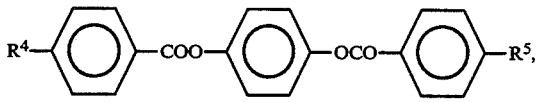
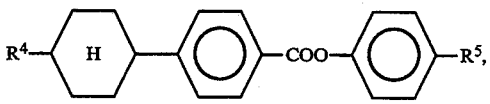

-continued

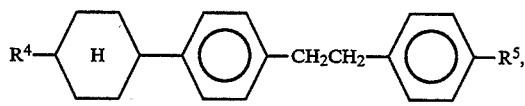
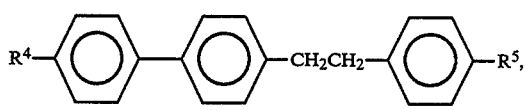
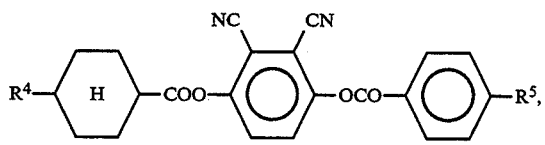
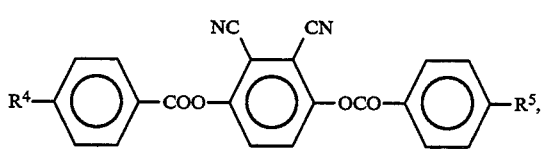
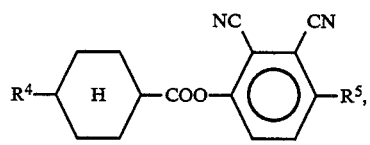
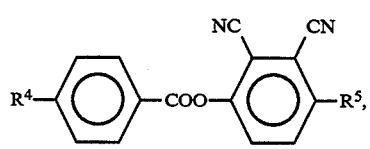
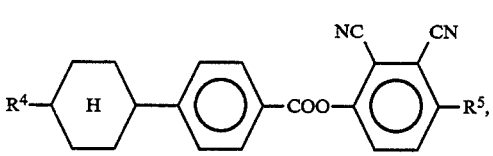
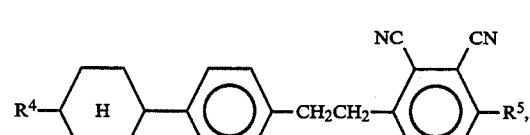
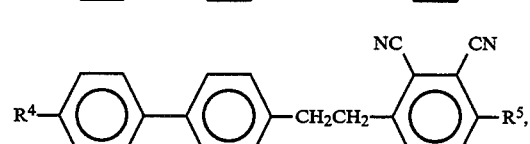
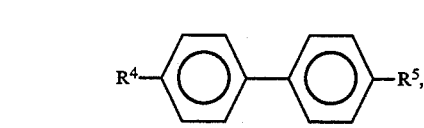
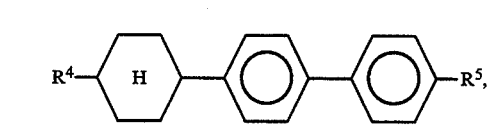
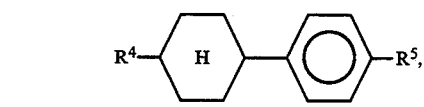

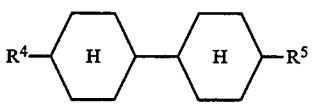

and

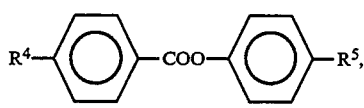

wherein, $R^4$ and $R^5$ each represent a linear or branched alkyl, alkoxy or acyloxy of 1 to 12 carbon atoms, and are identical with or different from each other.

The compounds represented by the following formulas may as well be used as the low molecular weight smectic liquid crystal.

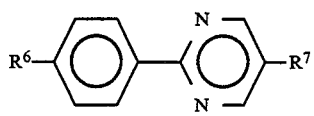  (4)

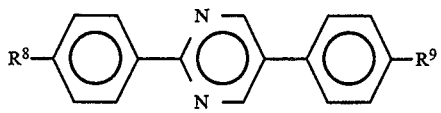  (5)

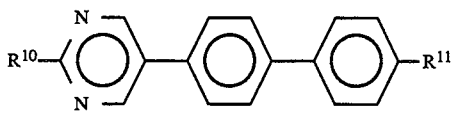  (6)

In the formula (4), $R^6$ represents an alkyl of 7 to 12 carbon atoms, an alkoxy of 6 to 11 carbon atoms or an acyloxy of 6 to 12 carbon atoms, and $R^7$ represents an alkyl of 7 to 12 carbon atoms or an alkoxy of 6 to 11 carbon atoms. In the formula (5), $R^8$ and $R^9$ each represent an alkyl or alkoxy of 4 to 14 carbon atoms and are identical with or different from each other. In the formula (6), $R^{10}$ represents an alkyl of 4 to 14 carbon atoms, and $R^{11}$ represents an alkyl of 5 to 14 carbon atoms or an alkoxy of 4 to 14 carbon atoms.

The above described diene compound (III) may also be used as the low molecular weight smectic liquid crystal.

Some examples of these low molecular weight smectic liquid crystals include the followings:

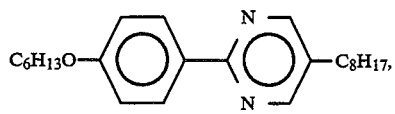

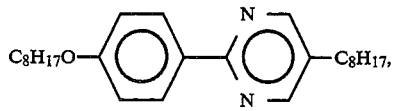

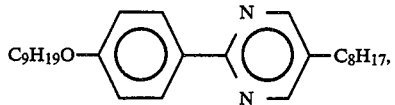

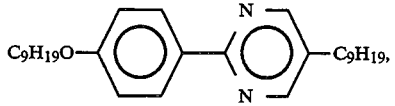

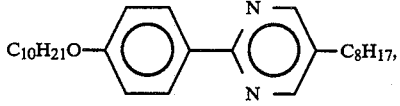

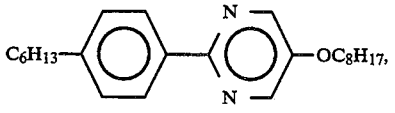

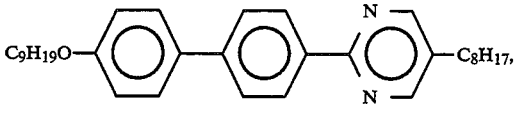

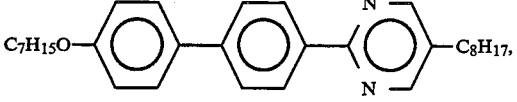

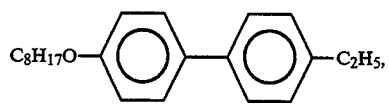
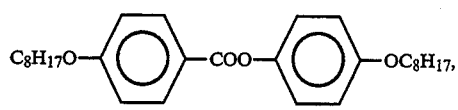
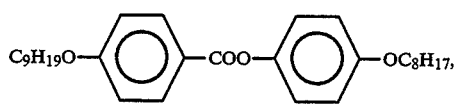
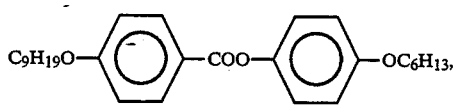
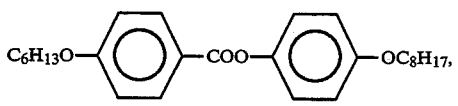
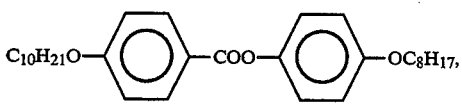
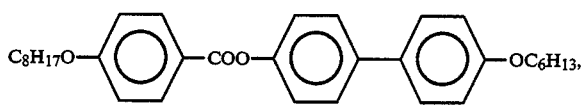
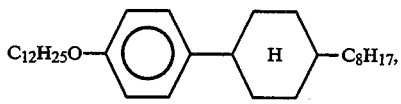
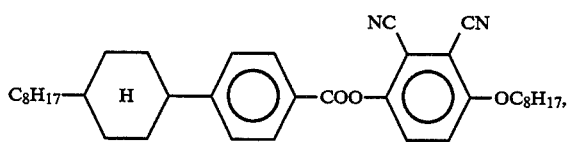
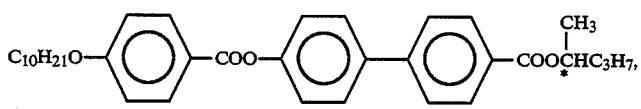
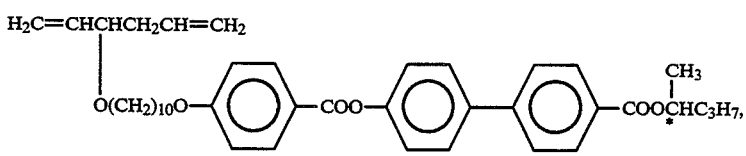
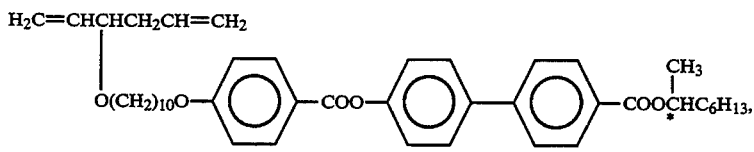

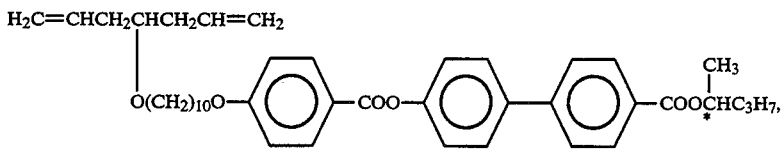

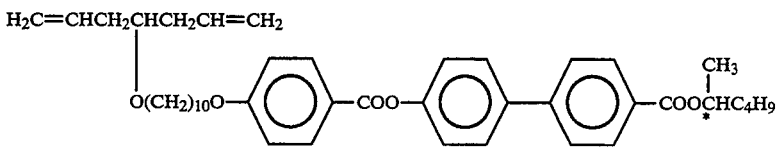

and

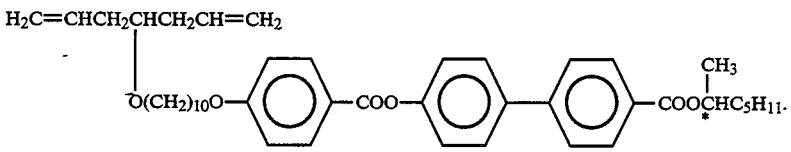

The high polymer may have liquid crystal phases or have no liquid crystal phases. Since the high polymer is a comb-type polymer providing a sufficiently wide space between side chains, it is compatible with the low molecular weight smectic liquid crystal, and the low molecular weight smectic liquid crystal comes into the space between the side chains to form a uniform mixture. FIG. 1 is a schematic view illustrating the mixed state of the ferroelectric liquid crystal composition of the present invention. A referential number 1 represents the novel high polymer, and a referential number 2 represents the low molecular weight smectic liquid crystal.

Since the ferroelectric liquid crystal composition of the present invention forms a uniform mixture as described above, it exhibits a high contrast ratio and responds to external factors at a high speed. Further, due to the high polymer contained therein, it has excellent ability to be oriented and its alignment can be controlled easily. Therefore, the liquid crystal composition of the present invention can simplify the procedure of producing liquid crystal optical devices.

Even if the low molecular weight smectic liquid crystal to be mixed is a non-chiral smectic liquid crystal, the optically active group introduced in the comb-type polymer plays a role as a chiral dopant, thereby endowing the liquid crystal composition with ferroelectricity.

The method of mixing the high polymer and the low molecular weight smectic liquid crystal is not particularly limited, and either direct mixing or solution mixing may be employed. For example, solution mixing may be suitably carried out by putting predetermined amounts of the high polymer and the low molecular weight smectic liquid crystal in a container, dissolving them in a solvent, such as dichloromethane, mixing the solution, and then evaporating the solvent.

A preferred ratio of the high polymer mixed is 5 to 99% by weight, more preferably 30 to 90% by weight, based on the total of the high polymer and the low molecular weight smectic liquid crystal. If the ratio of the high polymer is less than 5% by weight, the liquid crystal composition may have decreased moldability into film and decreased capability of orientation. Further, when a low molecular weight non-chiral smectic liquid crystal is mixed with less than 5% by weight of the high polymer, the liquid crystal composition may not exhibit ferroelectricity. If the ratio of the high polymer is more than 99% by weight, the speed of responding to the change of electric field may be decreased. Further, if a high polymer having no liquid crystal phases is used in such a high ratio, the liquid crystal composition may not have liquid crystal phases, or, if any, the temperature range of the liquid crystal phases may be narrow. It is preferable to adjust the ratio of the high polymer to the low molecular weight smectic liquid crystal so that the liquid crystal composition exhibits a ferroelectric phase exhibiting high response to electric fields. Although such a ratio cannot be defined uniformly since it depends on the kinds of the high polymer and the low molecular weight smectic liquid crystal, ferroelectricity can be easily obtained by using at least one low molecular weight smectic liquid crystal containing an asymmetric carbon. The ferroelectric liquid crystal composition of the present invention may contain other additives, such as coloring matters and adhesives.

Examples of the present invention are set forth below. It will be understood that these examples are for purposes of illustration only and are not to be construed as limiting the invention. In the formulas showing phase transition behaviors, "Cryst" represents crystal phase, "$S_{C^*}$" represents chiral smectic C phase, "$S_C$" represents smectic C phase, "$S_A$" represents smectic A phase, "N" represents nematic phase, "Iso" represents isotropic phase and "glass" represents glass state. In the formulas showing phase transition behaviors, the phase transition temperatures are expressed in °C. In the following Examples, "Mw" represents the weight average molecular weight measured by GPC (gel permeation chromatography).

EXAMPLES 1 TO 40

Synthesis 1

Synthesis of 3-(10-bromodecyloxy)-1,5-hexadiene:

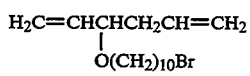

4.1 g of sodium hydride (content 60%) was suspended in 50 ml of tetrahydrofuran (THF), and the atmosphere was replaced with argon. 50 ml of a THF solution containing 9.8 g of 1,5-hexadien-3-ol was added dropwise and agitation was carried out at room temperature till the evolution of hydrogen gas stopped.

After addition of 100 ml of a THF solution containing 75 g of 1,10-dibromodecane, the reaction mixture was refluxed for 7 hours. The insoluble matter formed in the reaction mixture was filtered off, and the THF was distilled off under reduced pressure. The residue was purified by silica gel column chromatography, to obtain 14.3 g of the objective bromide compound. (Yield: 45%)

Synthesis 2

Synthesis of 3-(12-bromododecyloxy)-1,5-hexadiene:

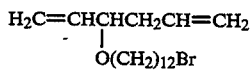

The procedure of Synthesis 1 was repeated in the same scale with the exception that 80 g of 1,12-dibromododecane was used in place of the 1,10-dibromodecane used in Synthesis 1, to obtain 14.8 g of the objective bromide compound. (Yield: 43%)

Synthesis 3

Synthesis of 3-(8-bromooctyloxy)-1,5-hexadiene:

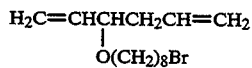

The procedure of Synthesis 1 was repeated in the same scale with the exception that 70 g of 1,8-dibromooctane was used in place of the 1,10-dibromodecane used in Synthesis 1, to obtain 11.6 g of the objective bromide compound. (Yield: 40%)

Synthesis 4

Synthesis of 4-(10-bromodecyloxy)-1,6-heptadiene:

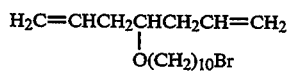

The procedure of Synthesis 1 was repeated in the same scale with the exception that 11.2 g of 1,6-heptadien-4-ol was used in place of the 1,5-hexadien-3-ol used in Synthesis 1, to obtain 11.6 g of the objective bromide compound. (Yield: 35%)

Synthesis 5

Synthesis of 3-(10-carboxydecyloxy)-1,5-hexadiene:

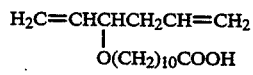

1.7 g of magnesium (ribbon form) was suspended in 50 ml of THF, and the atmosphere was replaced with argon. After 25 ml of a THF solution containing 0.3 g of ethyl bromide and 8.5 g of the bromide compound synthesized by the method of Synthesis 1 was added dropwise, the mixture was refluxed for two hours. After cooling to −60° to −50° C. and blowing of carbonic acid gas into the reaction mixture, the reaction system was allowed to stand till it returned to room temperature. After addition of 100 ml of ether, 10 ml of 35% hydrochloric acid and 50 ml of water, the resulting mixture was shaken. Subsequently, the ether layer was collected and dried over magnesium sulfate, and the solvent was then distilled off under reduced pressure, to obtain 6.0 g of the objective carboxylic acid. (Yield: 79%)

Synthesis 6

Synthesis of optically active monomer A:

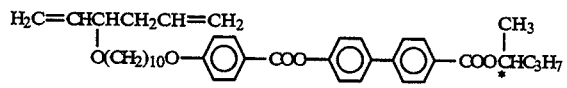

19.0 g of the bromide compound synthesized by the method of Synthesis 1, 9.2 g of methyl 4-hydroxybenzoate and 3.4 g of potassium carbonate were refluxed for 12 hours in 50 ml of 2-butanone. The insoluble matter formed in the reaction mixture was filtered off, and the solvent was distilled off under reduced pressure. The residue was purified by silica gel column chromatography, to obtain a methyl ester compound.

The methyl ester compound, 10.0 g of potassium hydroxide and 3.0 g of water were refluxed for one hour in 20 ml of methanol. After addition of 50 ml of water, reflux was further carried out for one hour. The reaction mixture was then diluted with 300 ml of water, and was then adjusted to pH=2 by dropping diluted hydrochloric acid. The precipitate was collected by filtration, washed with water and dried, to obtain 16.6 g of 4-{10-(1,5-hexadien-3-yloxy)decyloxy}benzoic acid.

To 8.3 g of the obtained carboxylic acid added were 4.0 g of thionyl chloride and a catalytic amount of pyridine, and the mixture was heated for two hours at 85° C. After the excessive thionyl chloride was distilled off under reduced pressure, 50 ml of toluene was added to form a solution of acyl chloride. 50 ml of a toluene solution containing 1.8 g of pyridine and 6.3 g of (S)-1-methylbutyl 4-hydroxybiphenyl-4'-carboxylate was added dropwise to the solution of acyl chloride at room temperature, and reaction was carried out for one day at room temperature. The insoluble matter formed in the reaction mixture was filtered off, and the solvent was distilled off under reduced pressure. The residue was purified by silica gel column chromatography, to obtain 9.7 of the objective optically active monomer A. (Yield from the bromide compound: 50%)

Synthesis 7

Synthesis of optically active monomer B:

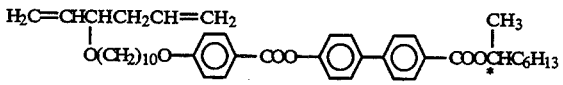

8.3 g of the remaining carboxylic acid obtained in Synthesis 6 was converted into an acyl chloride in the same manner as in Synthesis 6.

The procedure of Synthesis 6 was repeated with the exception that 7.2 g of (S)-1-methylheptyl 4-hydroxybiphenyl-4'-carboxylate was used in place of the (S)-1-methylbutyl 4-hydroxybiphenyl-4'-carboxylate, to obtain 10.9 g of the objective, optically active monomer B. (Yield from the bromide compound: 53%)

Synthesis 8
Synthesis of optically active monomer C:

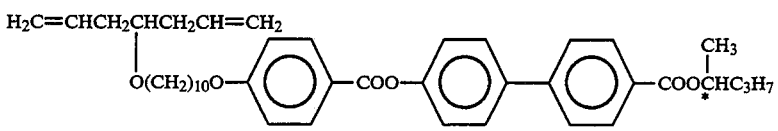

A methyl ester compound was synthesized in the same manner as in Synthesis 6 with the exception that 10.0 g of the bromide compound prepared by the method of Synthesis 4 in place of the bromide compound used in Synthesis 6, 4.6 g of methyl 4-hydroxybenzoate and 4.2 g of potassium carbonate were used. The methyl ester compound was then converted into a carboxylic acid in the same manner as in Synthesis 6 with the exception that 6.0 g of potassium hydroxide and 1.6 g of water were used.

Subsequently, 8.7 g of the objective optically active monomer C was synthesized in the same manner as in Synthesis 6 with the exception that the above described carboxylic acid, 3.5 g of thionyl chloride, 1.6 g of pyridine and 5.4 g of (S)-1-methylbutyl 4-hydroxybiphenyl-4'-carboxylate were used. (Yield from the bromide compound: 44%)

Synthesis 9
Synthesis of optically active monomer D:

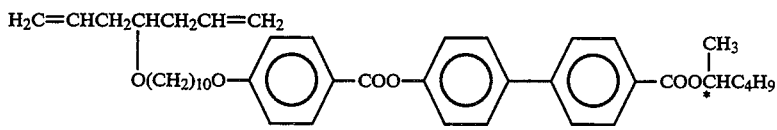

10.0 g of thionyl chloride was added to 4.0 g of the carboxylic acid synthesized by the method of Synthesis 8, and reaction was carried out at 75° C. for four hours. After the excessive thionyl chloride was distilled off under reduced pressure, 8 ml of toluene was added.

5.2 g of the objective optically active monomer D was synthesized in the same manner as in Synthesis 8 with the exception that 3.4 g of (S)-1-methylpentyl 4-hydroxybiphenyl-4'-carboxylate in place of the (S)-1-methylbutyl 4-hydroxybiphenyl-4'-carboxylate, 1.0 g of pyridine and the toluene solution prepared as above were used. (Yield from the carboxylic acid: 75%)

Synthesis 10
Synthesis of optically active monomer E:

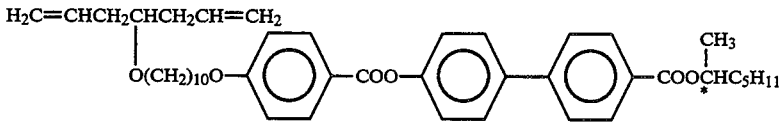

10.0 g of thionyl chloride was added to 4.1 g of the carboxylic acid synthesized by the method of Synthesis 8, and reaction was carried out at 60° C. for four hours. After the excessive thionyl chloride was distilled off under reduced pressure, 11 ml of toluene was added.

5.2 g of the objective monomer E was synthesized in the same manner as in Synthesis 8 with the exception that 3.7 g of (S)-1-methylhexyl 4-hydroxybiphenyl-4'-carboxylate in place of the (S)-1-methylbutyl 4-hydroxybiphenyl-4'-carboxylate, 1.1 g of pyridine and the toluene solution prepared as above were used. (Yield from the carboxylic acid: 72%)

Synthesis 11
Synthesis of optically inert monomer (a):

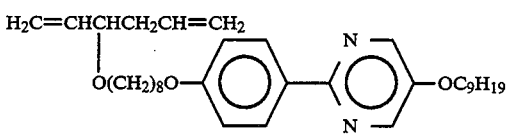

0.33 g of sodium hydride was added to 30 ml of dimethylformamide (DMF), and the atmosphere was replaced with argon. 2.5 g of 2-(4-hydroxyphenyl)-5-nonyloxypyrimidine was added gradually to the mixture. 2.3 g of the bromide compound synthesized by the method of Synthesis 3 was then added, and reaction was carried out for 7 hours at 80° C. After the insoluble matter formed in the reaction mixture was filtered off, the solvent was distilled off under reduced pressure. The residue was purified by silica gel column chromatography, to obtain 2.2 g of the objective monomer (a). (Yield: 53%)

Synthesis 12
Synthesis of optically inert monomer (b):

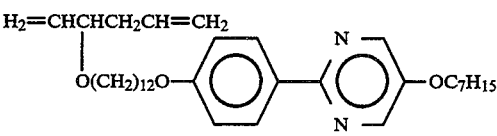

10.4 g of the bromide compound synthesized by the method of Synthesis 2, 8.6 g of 2-(4-hydroxyphenyl)-5-heptyloxypyrimidine and 4.2 g of potassium carbonate were allowed to react in 50 ml of 2-butanone (MEK) at 80° C. for 8 hours. After the insoluble matter formed in the reaction mixture was filtered off, the solvent was distilled off under reduced pressure. The residue was purified by silica gel column chromatography, to obtain 8.2 g of the objective optically inert monomer (b). (Yield: 50%)

Synthesis 13

Synthesis of optically inert monomer (c):

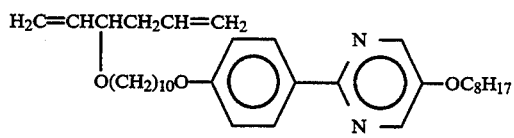

6.4 g of the bromide compound synthesized by the method of Synthesis 1, 6.0 g of 2-(4-hydroxyphenyl)-5-octyloxypyrimidine and 2.8 g of potassium carbonate were allowed to react in 30 ml of MEK at 80° C. for 8 hours. After the insoluble matter formed in the reaction mixture was filtered off, the solvent was distilled off under reduced pressure. The residue was purified by silica gel column chromatography, to obtain 3.6 g of the objective optically inert monomer (c). (Yield: 34%)

Synthesis 14

Synthesis of optically inert monomer (d):

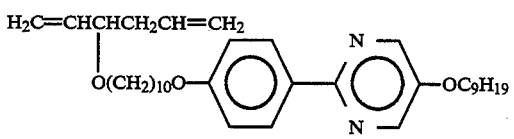

4.0 g of the bromide compound synthesized by the method of Synthesis 1, 4.0 g of 2-(4-hydroxyphenyl)-5-nonyloxypyrimidine and 2.0 g of potassium carbonate were allowed to react in 30 ml of MEK at 80° C. for 10 hours. After the insoluble matter formed in the reaction mixture was filtered off, the solvent was distilled off under reduced pressure. The residue was purified by silica gel column chromatography, to obtain 3.7 g of the objective optically inert monomer (d). (Yield: 54%)

Synthesis 15

Synthesis of optically inert monomer (e):

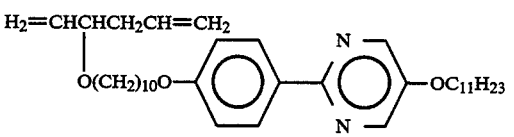

0.7 g of sodium hydride was added to 30 ml of DMF, and the atmosphere was replaced with argon. Subsequently, 5.0 of 2-(4-hydroxyphenyl)-5-undecyloxypyridimine was added gradually. After further addition of 5.0 g of the bromide compound synthesized by the method of Synthesis 1, reaction was carried out at 80° C. for 18 hours. After the insoluble matter formed in the reaction mixture was filtered off, the solvent was distilled off under reduced pressure. The residue was purified by silica gel column chromatography, to obtain 5.2 g of the objective optically inert monomer (e). (Yield: 61%)

Synthesis 16

Synthesis of optically inert monomer (f):

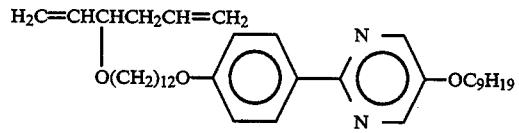

0.36 g of sodium hydride was added to 30 ml of DMF, and the atmosphere was replaced with argon. 2.5 g of 2-(4-hydroxyphenyl)-5-nonyloxypyrimidine was then added gradually. After further addition of 3.1 g of the bromide compound synthesized by the method of Synthesis 2, reaction was carried out at 70° C. for 10 hours. After the insoluble matter formed in the reaction mixture was filtered off, the solvent was distilled off under reduced pressure. The residue was purified by silica gel column chromatography, to obtain 2.6 g of the objective optically inert monomer (f). (Yield: 56%)

Synthesis 17

Synthesis of optically inert monomer (g):

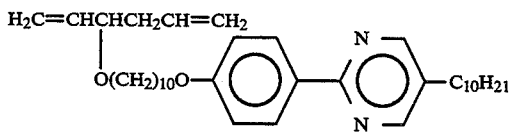

0.34 g of sodium hydride was added to 30 ml of DMF, and the atmosphere was replaced with argon. 2.5 g of 2-(4-hydroxyphenyl)-5-decylpyrimidine was then added gradually. After further addition of 2.5 g of the bromide compound synthesized by the method of Synthesis 1, reaction was carried out at 80° C. for 10 hours. After the insoluble matter formed in the reaction mixture was filtered off, the solvent was distilled off under reduced pressure. The residue was purified by silica gel column chromatography, to obtain 2.8 g of the objective optically inert monomer (g). (Yield: 64%)

Synthesis 18

Synthesis of optically inert monomer (h):

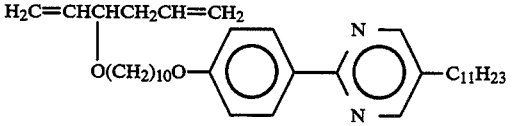

0.7 of sodium hydride was added to 30 ml of DMF, and the atmosphere was replaced with argon. 5.0 g of 2-(4-hydroxyphenyl)-5-undecylpyrimidine was then added gradually. After further addition of 5.0 g of the bromide compound synthesized by the method of Synthesis 1, reaction was carried out at 80° C. for 10 hours. After the insoluble matter formed in the reaction mixture was filtered off, the solvent was distilled off under reduced pressure. The residue was purified by silica gel column chromatography, to obtain 3.8 g of the objective optically inert monomer (h). (Yield: 44%)

Synthesis 19

Synthesis of optically inert monomer (i):

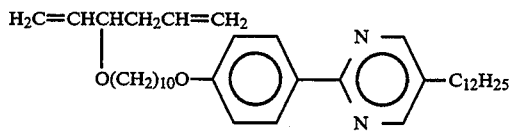

0.25 g of sodium hydride was added to 20 ml of DMF, and the atmosphere was replaced with argon. 2.0 g of 2-(4-hydroxyphenyl)-5-dodecylpyrimidine was then added gradually. After further addition of 1.9 g of the bromide compound synthesized by the method of Synthesis 1, reaction was carried out at 80° C. for 14 hours. After the insoluble matter formed in the reaction mixture was filtered off, the solvent was distilled off under reduced pressure. The residue was purified by silica gel column chromatography, to obtain 2.0 g of the objective optically inert monomer (i). (Yield: 59%)

Synthesis 20

Synthesis of optically inert monomer (j):

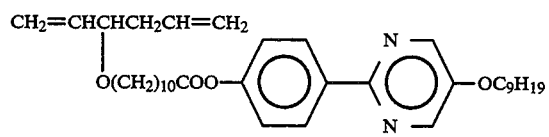

15 g of thionyl chloride was added to 3.0 g of the carboxylic acid obtained in Synthesis 5, and reaction was carried out at 60° C. for two hours. After the excessive thionyl chloride was distilled off under reduced pressure, 20 ml of a toluene solution containing 2.3 g of 2-(4-hydroxyphenyl)-5-nonyloxypyrimidine and 0.73 g of pyridine was added dropwise. The mixture was allowed to react for one day at room temperature. After the insoluble matter formed in the reaction mixture was filtered off, the solvent was distilled off under reduced pressure. The residue was purified by silica gel column chromatography, to obtain 2.6 g of the objective optically inert monomer (j). (Yield: 61%)

Synthesis 21

Synthesis of optically inert monomer (k):

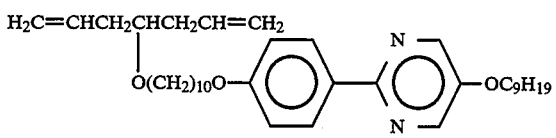

0.28 g of sodium hydride was added to 30 ml of DMF, and the atmosphere was replaced with argon. 2.0 g of 2-(4-hydroxyphenyl)-5-nonyloxypyrimidine was then added gradually. After further addition of 2.3 g of the bromide compound synthesized by the method of Synthesis 4, reaction was carried out at 80° C. for 10 hours. After the insoluble matter formed in the reaction mixture was filtered off, the solvent was distilled off under reduced pressure. The residue was purified by silica gel column chromatography, to obtain 2.6 g of the objective optically inert monomer (k). (Yield: 75%)

EXAMPLE 1

Synthesis of a copolymer:

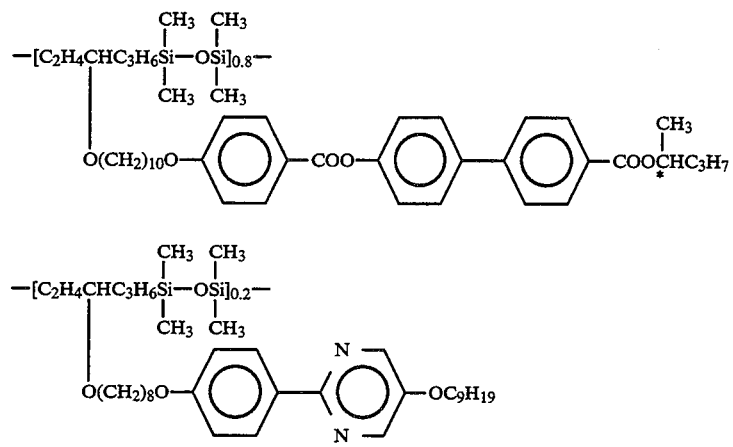

2.4 g of the optically active monomer A synthesized by the method of Synthesis 6 and 0.49 g of the optically inert monomer (a) synthesized by the method of Synthesis 11 were dissolved in 20 ml of toluene, and the atmosphere was replaced with argon. After addition of 0.42 g of 1,1,3,3-tetramethyldisiloxane and a catalytic amount of hydrogen hexachloroplatinate (IV) hexahydrate, polymerization was carried out at 85° C. for 16 hours. After the solvent was distilled off under reduced pressure, the residue was purified by silica gel column chromatography, to obtain 2.7 g of the objective copolymer. (Yield: 82%)

Figure 2:
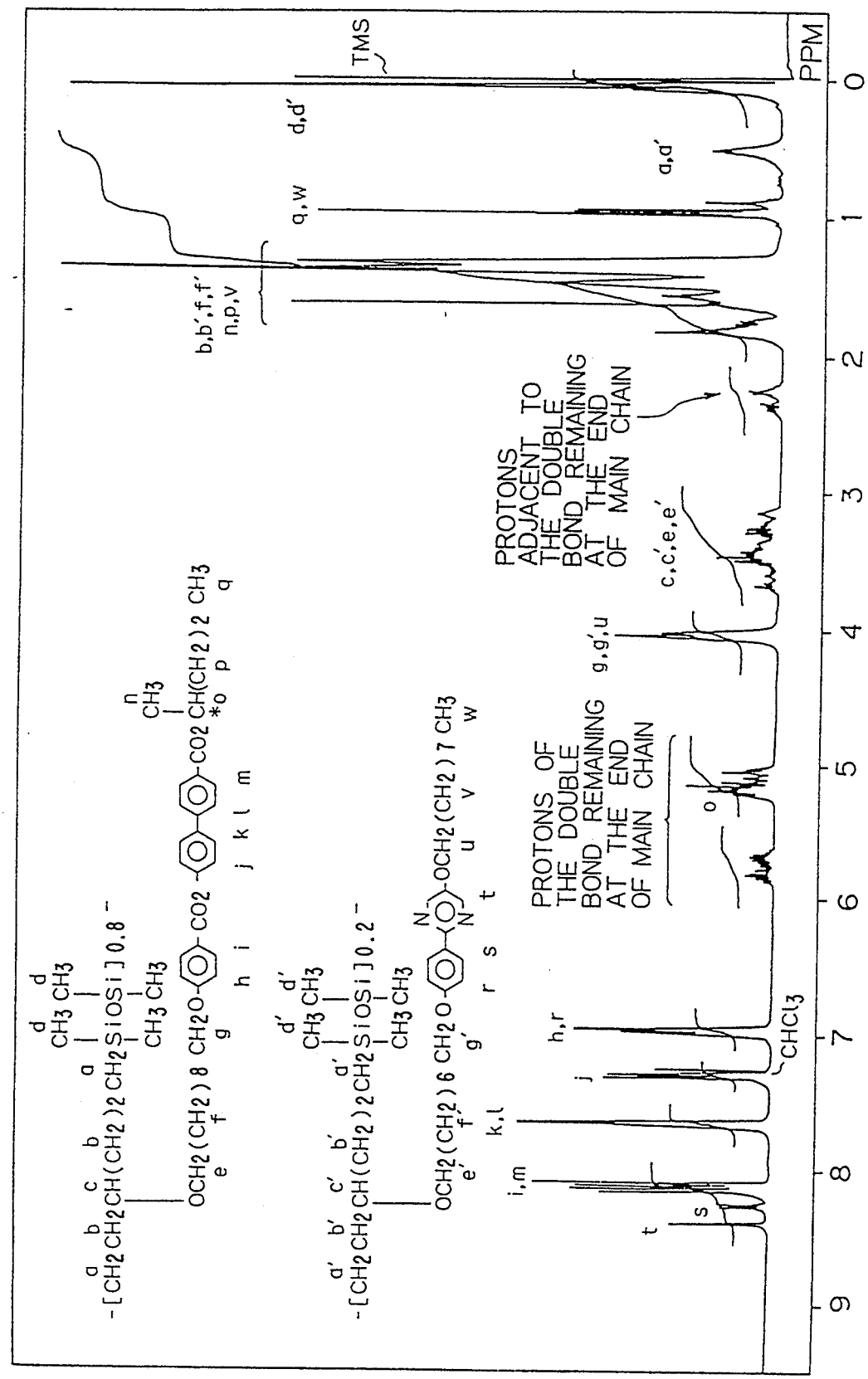
FIG. 2 is an NMR spectrum of the copolymer obtained in Example 1.

The properties of the copolymer are listed in Table 1. The NMR chart of the copolymer is shown in FIG. 2.

EXAMPLE 2

Synthesis of a copolymer:

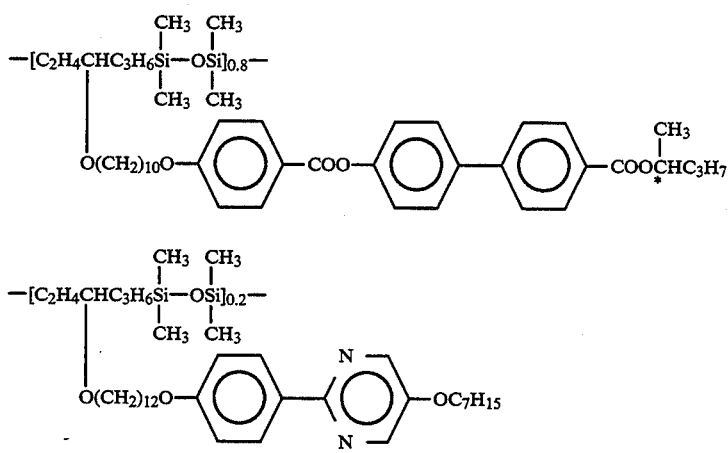

2.5 g of the optically active monomer A synthesized by the method of Synthesis 6 and 0.54 g of the optically inert monomer (b) synthesized by the method of Synthesis 12 were dissolved in 30 ml of toluene, and the atmosphere was replaced with argon. After addition of 0.44 g of 1,1,3,3-tetramethyldisiloxane and a catalytic amount of hydrogen hexachloroplatinate (IV) hexahydrate, polymerization was carried out at 80° C. for 18 hours. After the solvent was distilled off under reduced pressure, the residue was purified by silica gel column chromatography, to obtain 2.8 g of the objective copolymer. (Yield: 80%)

Figure 3:
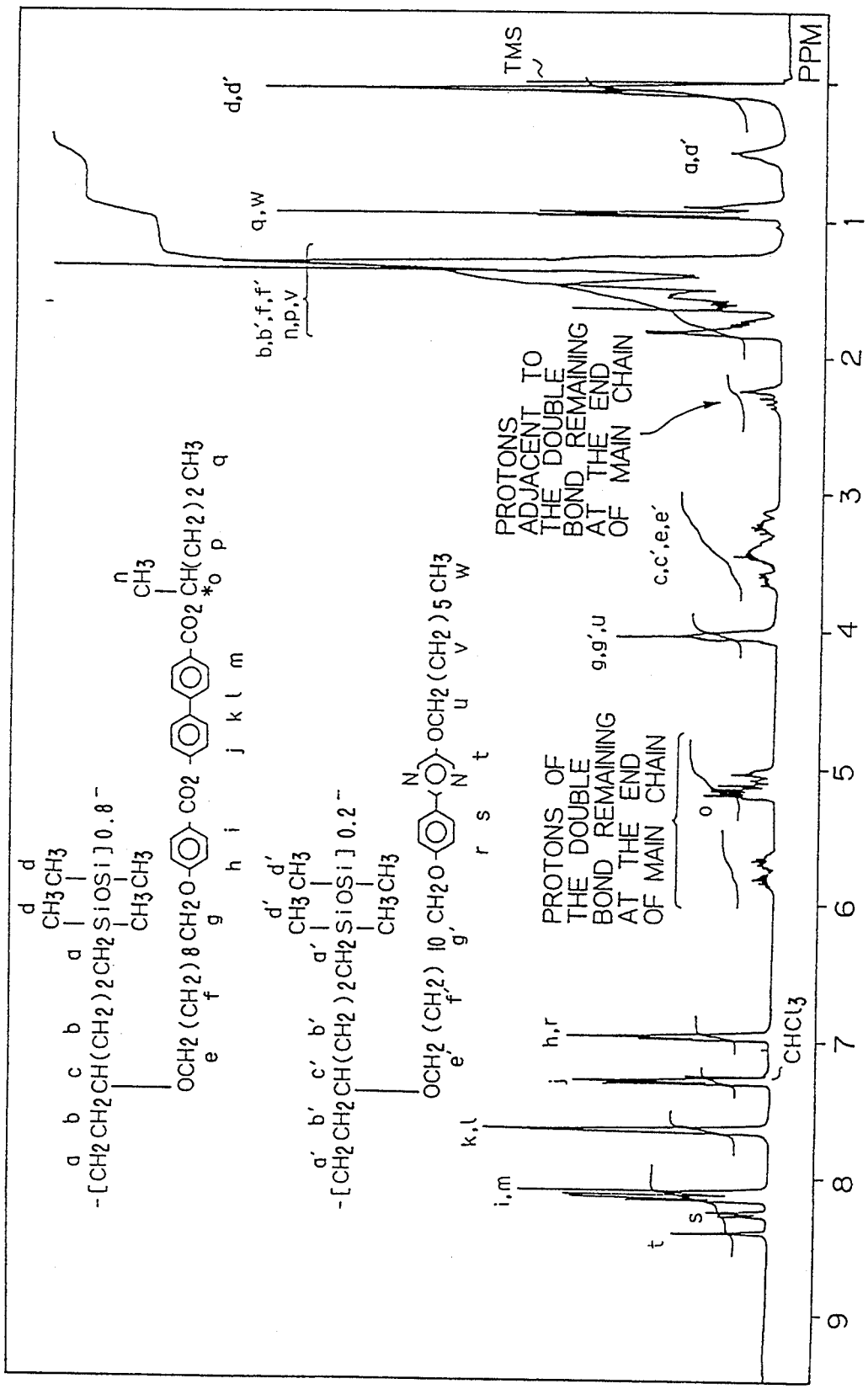
FIG. 3 is an NMR spectrum of the copolymer obtained in Example 2.

The properties of the copolymer are listed in Table 1. The NMR chart of the copolymer is shown in FIG. 3.

EXAMPLE 3

Synthesis of a copolymer:

1.9 g of the optically active monomer A synthesized by the method of Synthesis 6 and 1.1 g of the optically inert monomer (b) synthesized by the method of Synthesis 12 were dissolved in 30 ml of toluene, and the atmosphere was replaced with argon. After addition of 0.44 g of 1,1,3,3-tetramethyldisiloxane and a catalytic amount of hydrogen hexachloroplatinate (IV) hexahydrate, polymerization was carried out at 80° C. for 18 hours. After the solvent was distilled off under reduced pressure, the residue was purified by silical gel column chromatography, to obtain 3.0 g of the objective copolymer. (Yield: 87%)

The properties of the copolymer are listed in Table 1. The copolymerization ratios were determined from an NMR chart. The results are shown in Table 5.

EXAMPLE 4

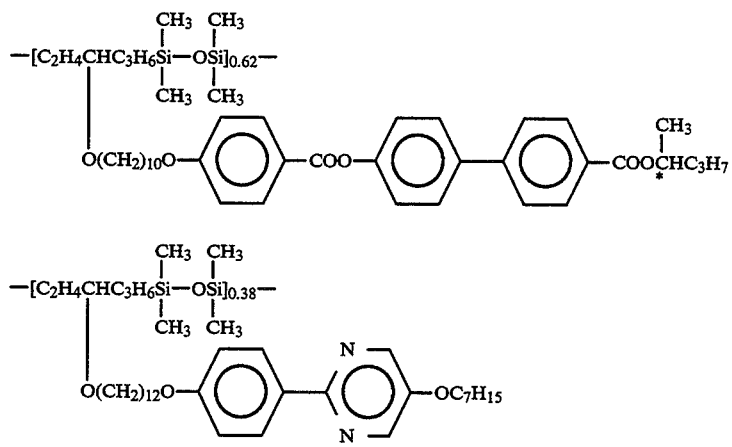

Synthesis of a copolymer:

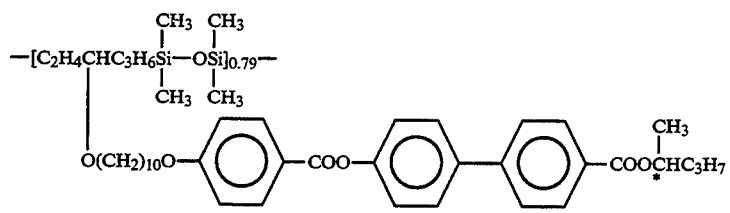

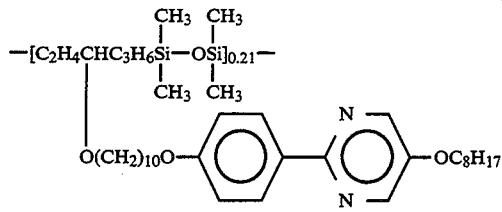

8.6 g of the optically active monomer A synthesized by the method of Synthesis 6 and 1.8 g of the optically inert monomer (c) synthesized by the method of Synthesis 13 were dissolved in 50 ml of toluene, and the atmosphere was replaced with argon. After addition of 1.5 g of 1,1,3,3-tetramethyldisiloxane and a catalytic amount of hydrogen hexachloroplatinate (IV) hexahydrate, polymerization was carried out at 80° C. for 13 hours. After the solvent was distilled off under reduced pressure, the residue was purified by silica gel column chromatography, to obtain 11.1 g of the objective copolymer. (Yield: 93%)

The properties of the copolymer are listed in Table 1.

The copolymerization ratios were determined from an NMR chart. The results are shown in Table 5.

EXAMPLE 5

Synthesis of a copolymer:

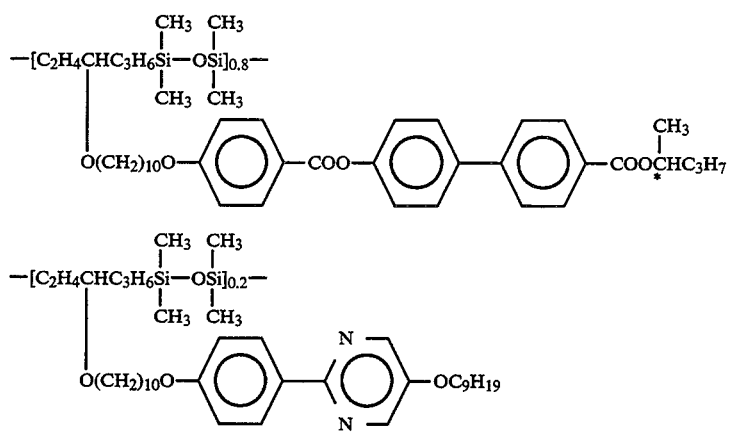

4.0 g of the optically active monomer A synthesized by the method of Synthesis 6 and 0.86 g of the optically inert monomer (d) synthesized by the method of Synthesis 14 were dissolved in 30 ml of toluene, and the atmosphere was replaced with argon. After addition of 0.70 g of 1,1,3,3-tetramethyldisiloxane and a catalytic amount of hydrogen hexachloroplatinate (IV) hexahydrate, polymerization was carried out at 80° C. for 18 hours. After the solvent was distilled off under reduced pressure, the residue was purified by silica gel column chromatography, to obtain 4.4 g of the objective copolymer. (Yield: 79%)

Figure 4:
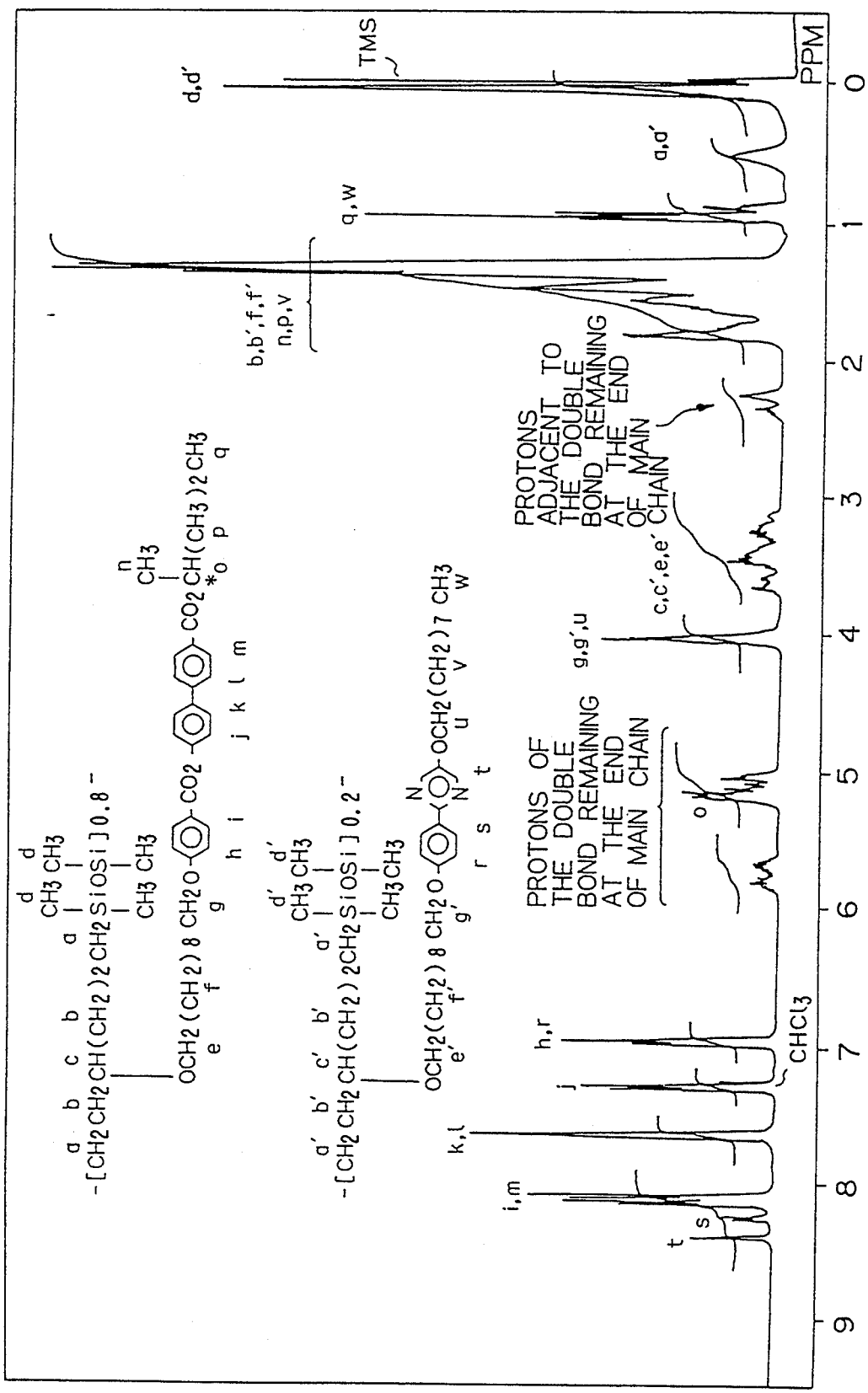
FIG. 4 is an NMR spectrum of the copolymer obtained in Example 5.

The properties of the copolymer are listed in Table 1. The NMR chart of the copolymer is shown in FIG. 4.

EXAMPLES 6 TO 9

Synthesis of copolymers:

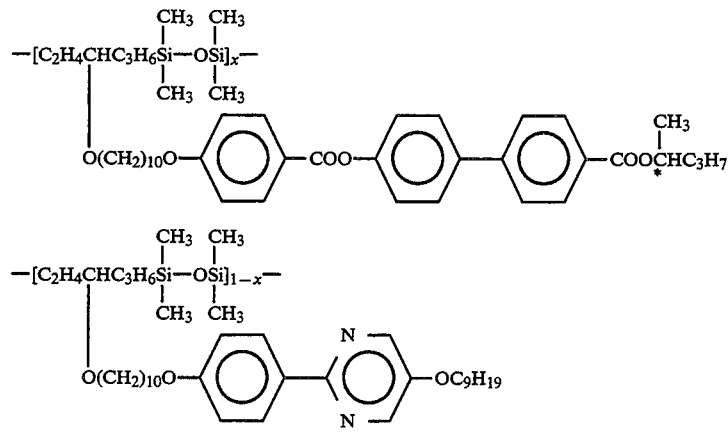

Copolymerizations were carried out in the same manner as in Example 5 with the exception that optically active monomer A and optically inert monomer (d) were used in the ratios listed in Table 2.

TABLE 2

| Examples | Monomer A | Monomer (d) | Siloxane | Yield | Yield |
|---|---|---|---|---|---|
| 6 | 2.3 g | 0.22 g | 0.36 g | 2.4 g | 83% |
| 7 | 1.7 g | 1.0 g | 0.40 g | 2.5 g | 81% |
| 8 | 1.3 g | 1.7 g | 0.45 g | 2.8 g | 81% |
| 9 | 1.1 g | 3.8 g | 0.80 g | 4.7 g | 82% |

Figure 5:
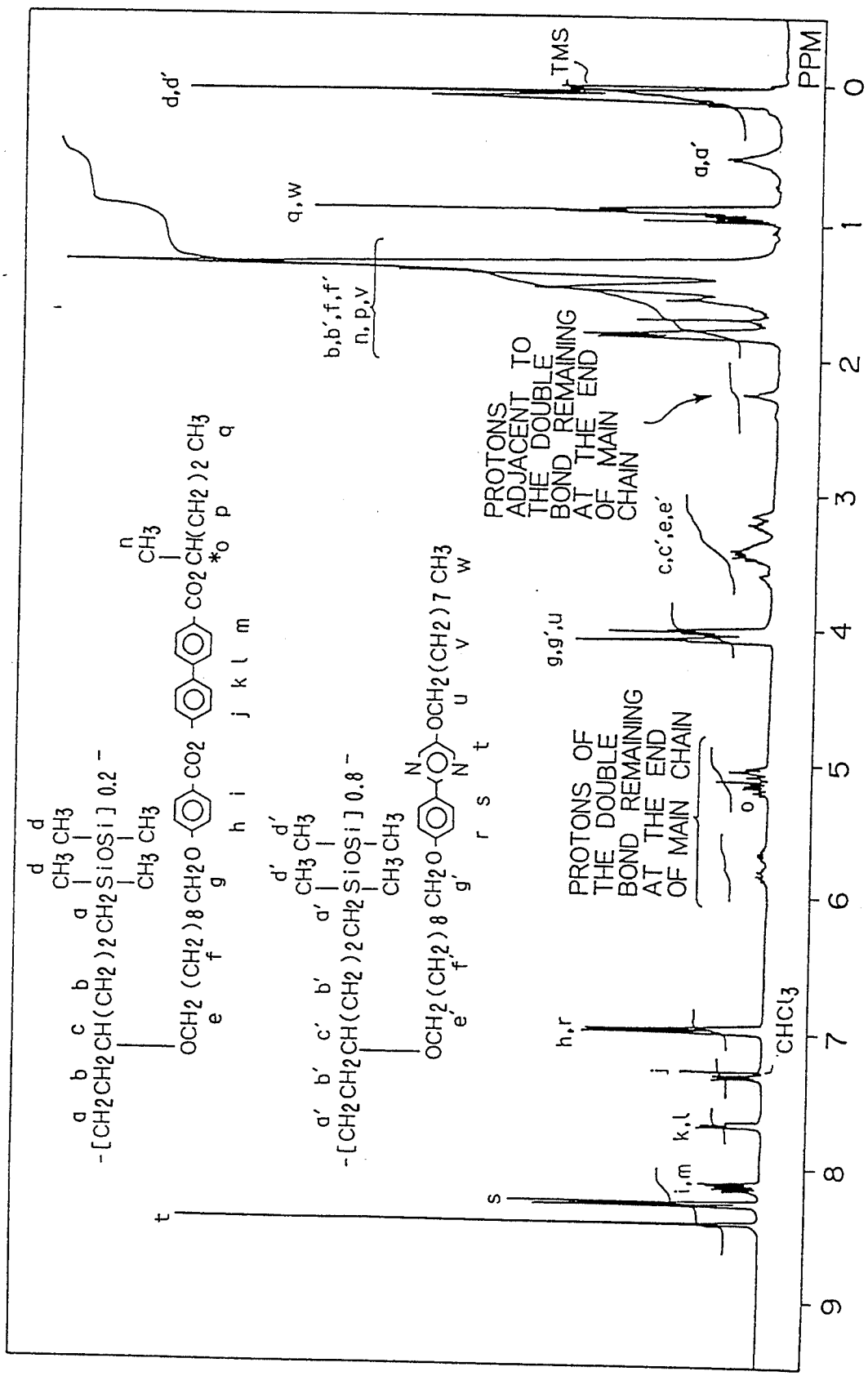
FIG. 5 is an NMR spectrum of the copolymer obtained in Example 9.

The properties of the obtained copolymers are listed in Table 1. From the NMR charts of the copolymers, X of the copolymer of Example 6 was 0.89, X of the copolymer of Example 7 was 0.60, X of the copolymer of Example 8 was 0.41, and X of the copolymer of Example 9 was 0.2. The NMR chart of the copolymer of Example 9 is shown in FIG. 5.

EXAMPLE 10

Synthesis of a copolymer:

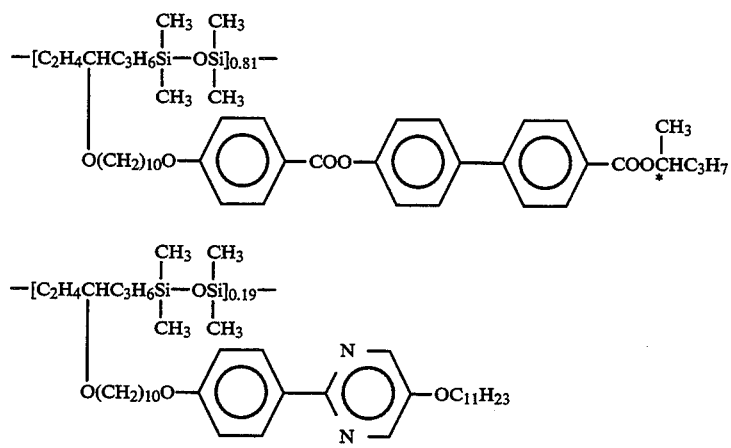

2.2 g of the optically active monomer A synthesized by the method of Synthesis 6 and 0.50 g of the optically inert monomer (e) synthesized by the method of Synthesis 15 were dissolved in 30 ml of toluene, and the atmosphere was replaced with argon. After addition of 0.39 g of 1,1,3,3-tetramethyldisiloxane and a catalytic amount of hydrogen hexachloroplatinate (IV) hexahydrate, polymerization was carried out at 80° C. for 9 hours. After the solvent was distilled off under reduced pressure, the residue was purified by silica gel column chromatography, to obtain 2.6 g of the objective copolymer. (Yield: 84%)

The properties of the copolymer are listed in Table 1. The copolymerization ratios were determined from an NMR chart. The results are listed in Table 5

EXAMPLE 11

Synthesis of a copolymer:

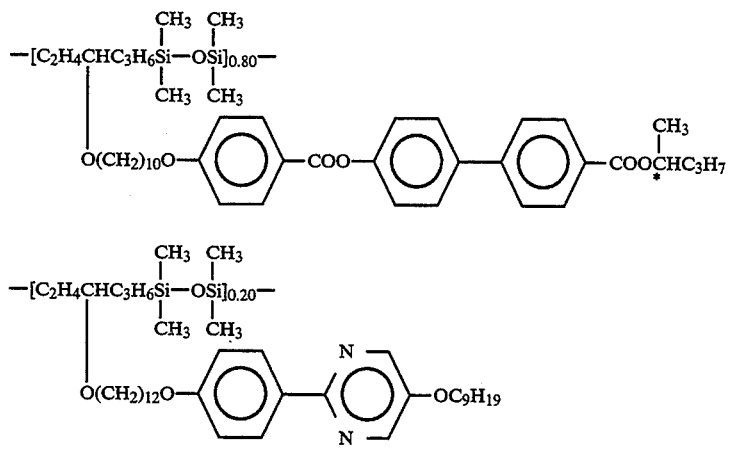

2.4 g of the optically active monomer A synthesized by the method of Synthesis 6 and 0.54 g of the optically inert monomer (f) synthesized by the method of Synthesis 16 were dissolved in 20 ml of toluene, and the atmosphere was replaced with argon. After addition of 0.42 g of 1,1,3,3-tetramethyldisiloxane and a catalytic amount of hydrogen hexachloroplatinate (IV) hexahydrate, polymerization was carried out at 80° C. for 16 hours. After the solvent was distilled off under reduced pressure, the residue was purified by silica gel column chromatography, to obtain 2.5 g of the objective copolymer. (Yield: 74%)

The properties of the copolymer are listed in Table 1. The copolymerization ratios were determined from an NMR chart. The results are listed in Table 5

EXAMPLE 12

Synthesis of a copolymer:

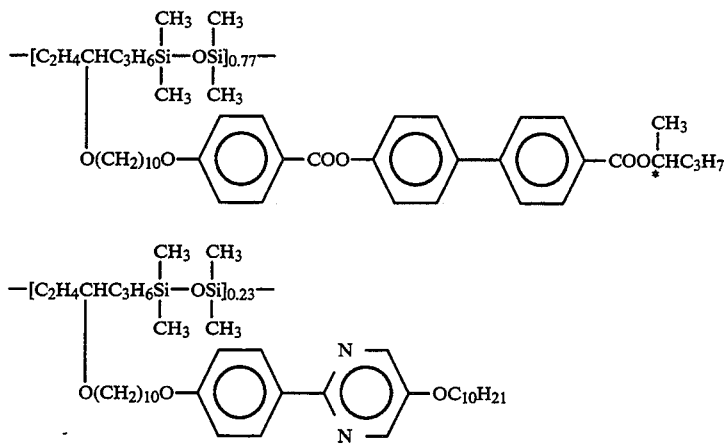

2.4 g of the optically active monomer A synthesized by the method of Synthesis 6 and 0.51 g of the optically inert monomer (g) synthesized by the method of Synthesis 17 were dissolved in 20 ml of toluene, and the atmosphere was replaced with argon. After addition of 0.42 g of 1,1,3,3-tetramethyldisiloxane and a catalytic amount of hydrogen hexachloroplatinate (IV) hexahydrate, polymerization was carried out at 80° C. for 16 hours. After the solvent was distilled off under reduced pressure, the residue was purified by silica gel column chromatography, to obtain 2.9 g of the objective copolymer. (Yield: 86%)

The properties of the copolymer are listed in Table 1. The copolymerization ratios were determined from an NMR chart. The results are listed in Table 5

EXAMPLE 13

Synthesis of a copolymer:

2.3 g of the optically active monomer A synthesized by the method of Synthesis 6 and 0.50 g of the optically inert monomer (h) synthesized by the method of Synthesis 18 were dissolved in 30 ml of toluene, and the atmosphere was replaced with argon. After addition of 0.40 g of 1,1,3,3-tetramethyldisiloxane and a catalytic amount of hydrogen hexachloroplatinate (IV) hexahydrate, polymerization was carried out at 80° C. for 9 hours. After the solvent was distilled off under reduced pressure, the residue was purified by silica gel column chromatography, to obtain 2.8 g of the objective copolymer. (Yield: 88%)

Figure 6:
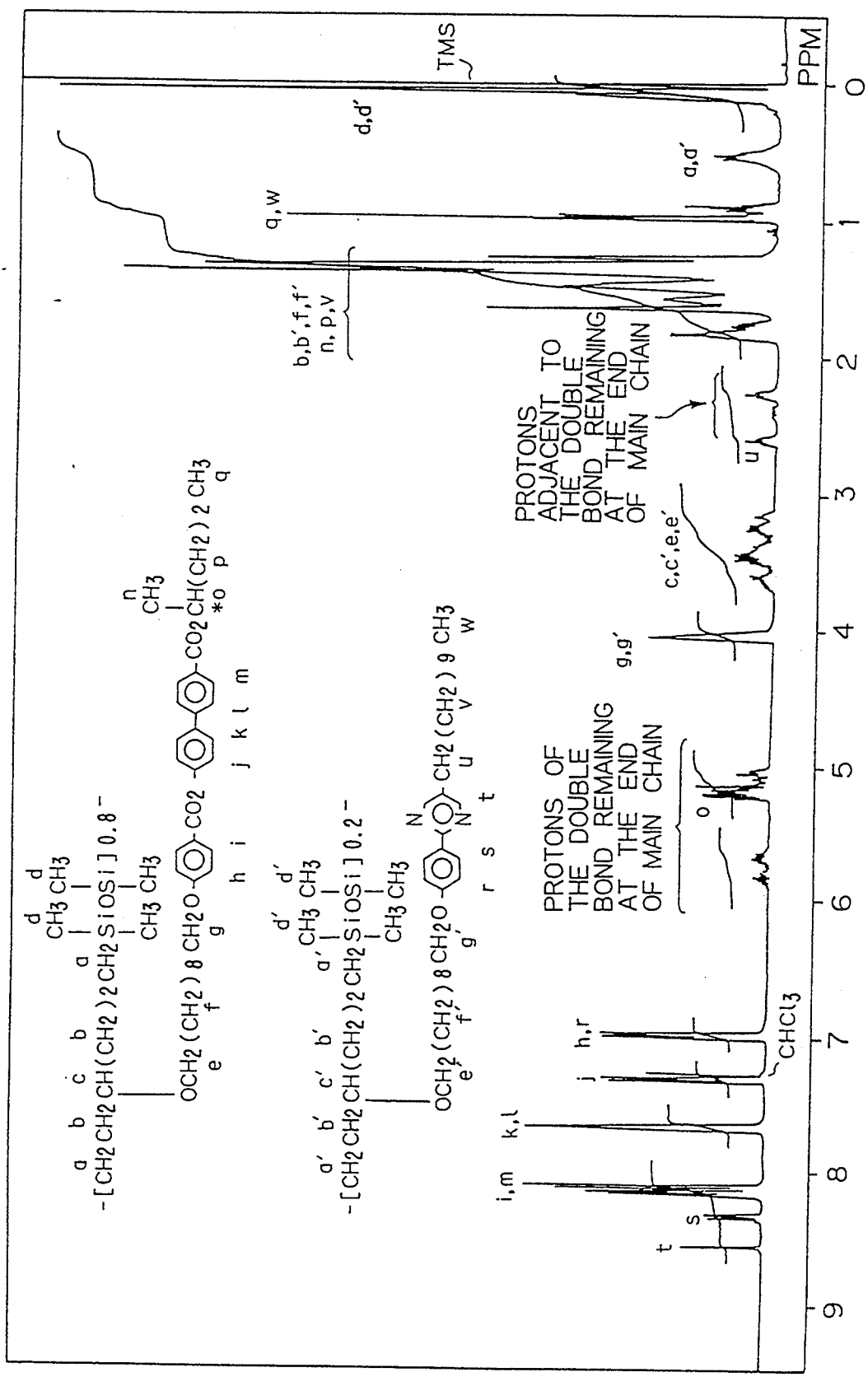
FIG. 6 is an NMR spectrum of the copolymer obtained in Example 13.

The properties of the copolymer are listed in Table 1. The NMR chart of the copolymer is shown in FIG. 6.

EXAMPLE 14

Synthesis of a copolymer:

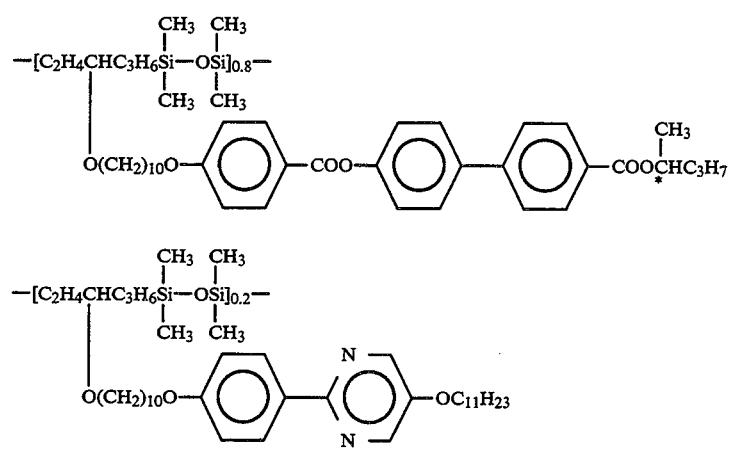

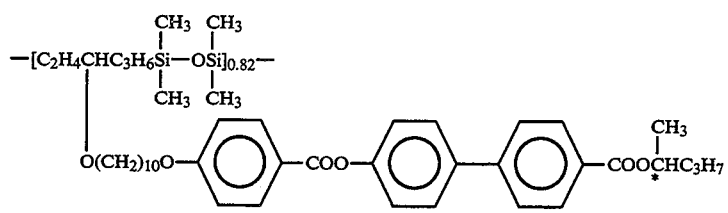

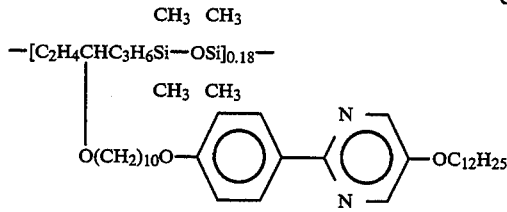

2.4 g of the optically active monomer A synthesized by the method of Synthesis 6 and 0.54 g of the optically inert monomer (i) synthesized by the method of Synthesis 19 were dissolved in 20 ml of toluene, and the atmosphere was replaced with argon. After addition of 0.42 g of 1,1,3,3-tetramethyldisiloxane and a catalytic amount of hydrogen hexachloroplatinate (IV) hexahydrate, polymerization was carried out at 85° C. for 9 hours. After the solvent was distilled off under reduced pressure, the residue was purified by silica gel column chromatography, to obtain 2.5 g of the objective copolymer. (Yield: 74%)

The properties of the copolymer are listed in Table 1. The copolymerization ratios of the copolymer were determined from an NMR chart. The results are listed in Table 5.

EXAMPLE 15

Synthesis of a copolymer:

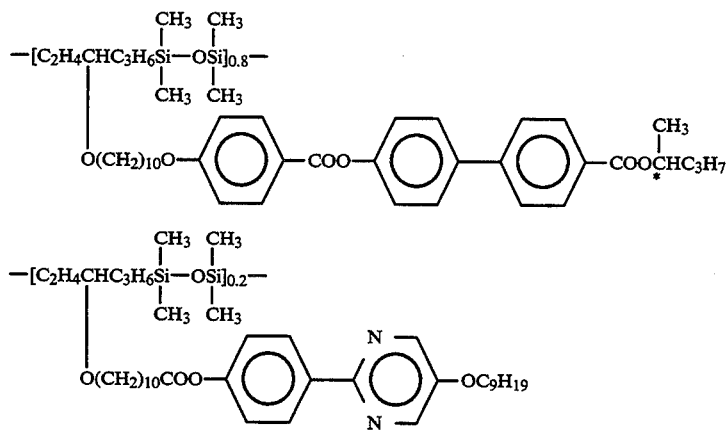

0.75 g of the optically active monomer A synthesized by the method of Synthesis 6 and 0.17 g of the optically inert monomer (j) synthesized by the method of Synthesis 20 were dissolved in 8 ml of toluene, and the atmosphere was replaced with argon. After addition of 0.13 g of 1,1,3,3-tetramethyldisiloxane and a catalytic amount of hydrogen hexachloroplatinate (IV) hexahydrate, polymerization was carried out at 85° C. for 9 hours. After the solvent was distilled off under reduced pressure, the residue was purified by silica gel column chromatography, to obtain 0.78 g of the objective copolymer. (Yield: 74%)

Figure 7:
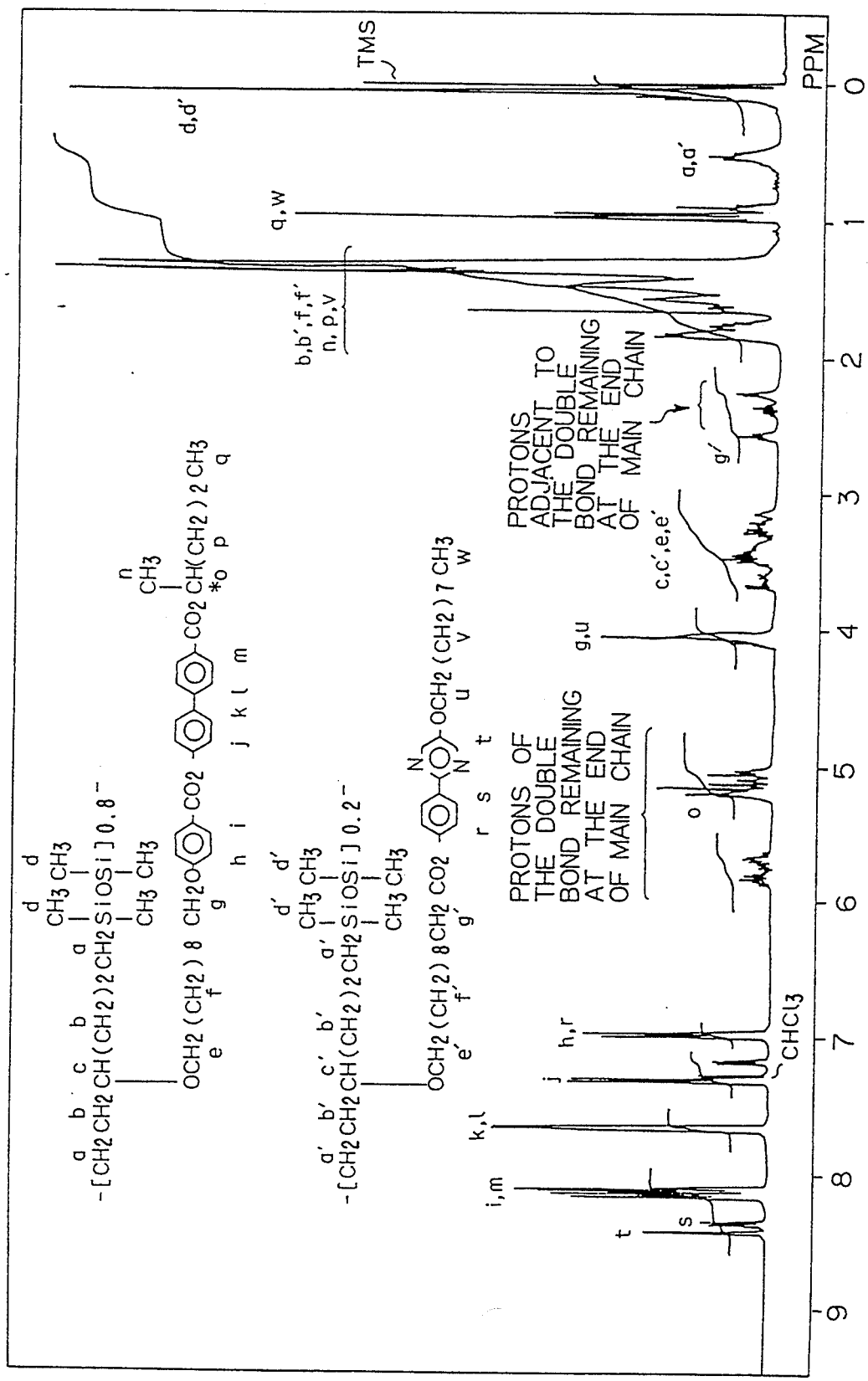
FIG. 7 is an NMR spectrum of the copolymer obtained in Example 15.

The properties of the copolymer are listed in Table 1. The NMR chart of the copolymer is shown in FIG. 7.

EXAMPLE 16

Synthesis of a copolymer:

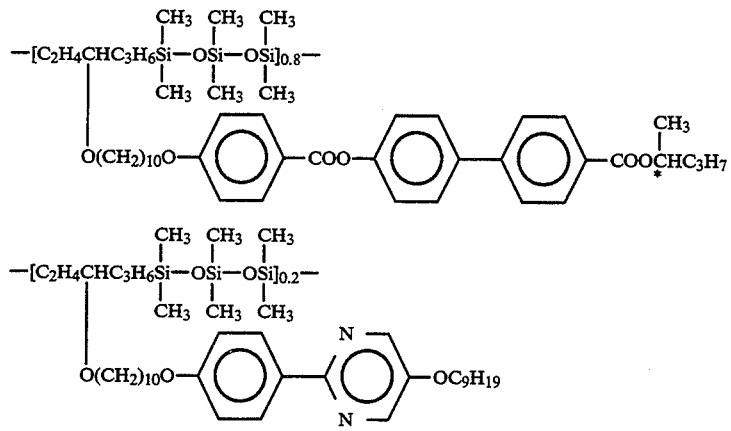

1.9 g of the optically active monomer A synthesized by the method of Synthesis 6 and 0.40 g of the optically inert monomer (d) synthesized by the method of Synthesis 14 were dissolved in 30 ml of toluene, and the atmosphere was replaced with argon. After addition of 0.50 g of 1,1,3,3,5,5-hexamethyldisiloxane and a catalytic amount of hydrogen hexachloroplatinate (IV) hexahydrate, polymerization was carried out at 80° C. for 9 hours. After the solvent was distilled off under reduced pressure, the residue was purified by silica gel column chromatography, to obtain 2.6 g of the objective copolymer. (Uield: 93%)

Figure 8:
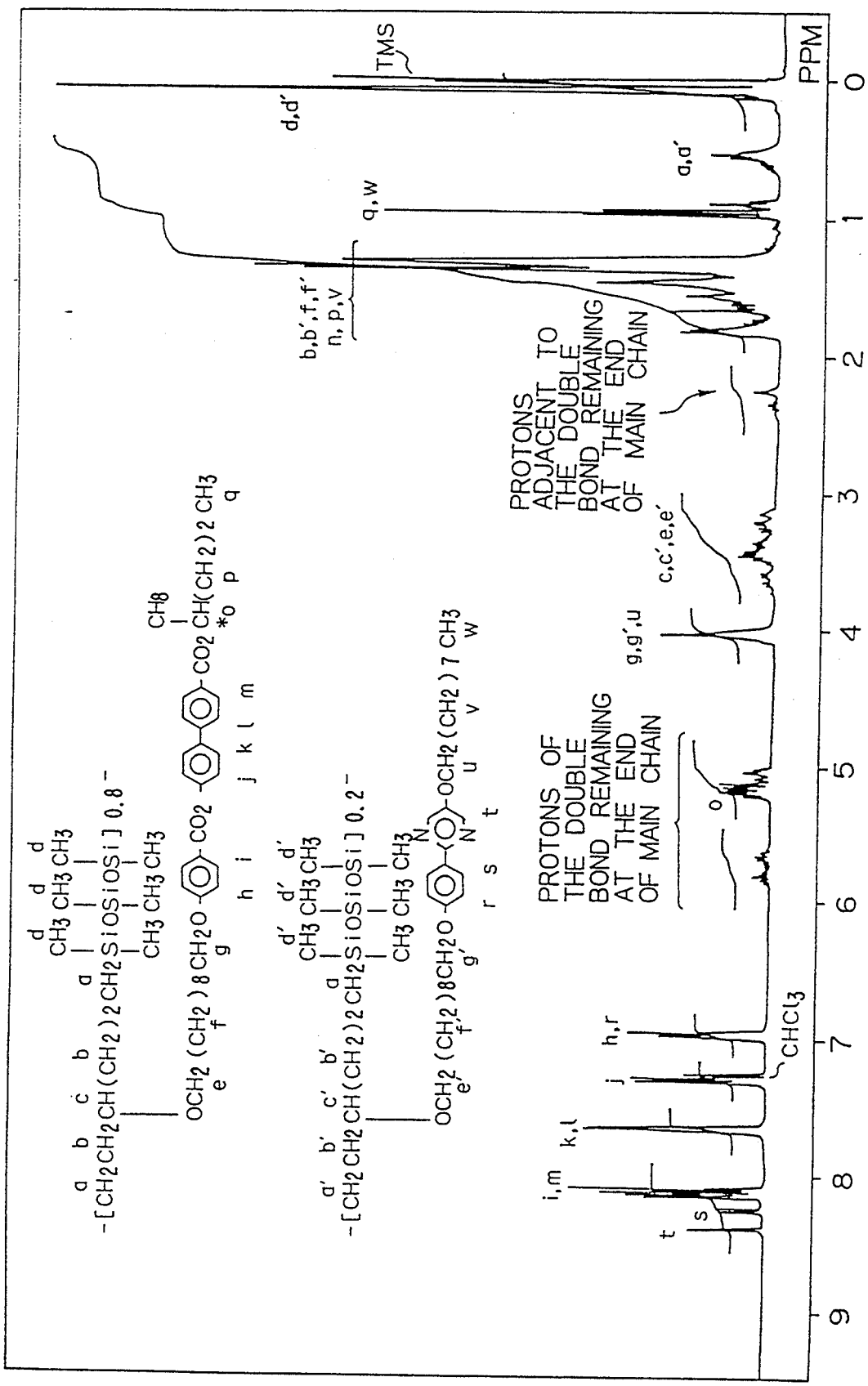
FIG. 8 is an NMR spectrum of the copolymer obtained in Example 16.

The properties of the copolymer are listed in Table 1. The NMR chart of the copolymer is shown in FIG. 8.

EXAMPLE 17

Synthesis of a copolymer:

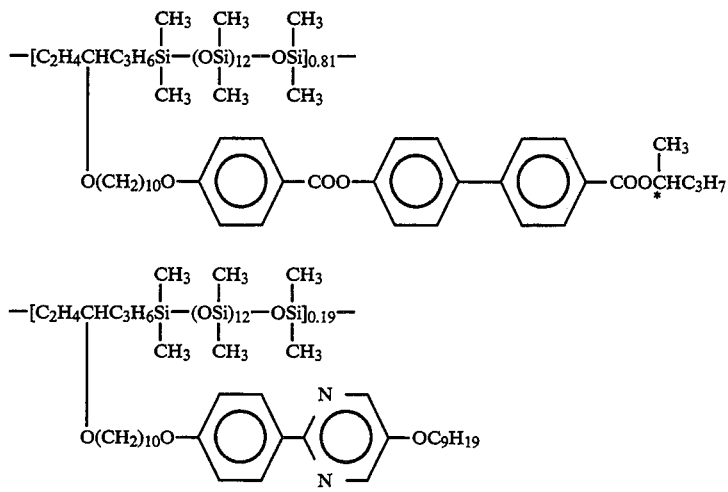

Figure 9:
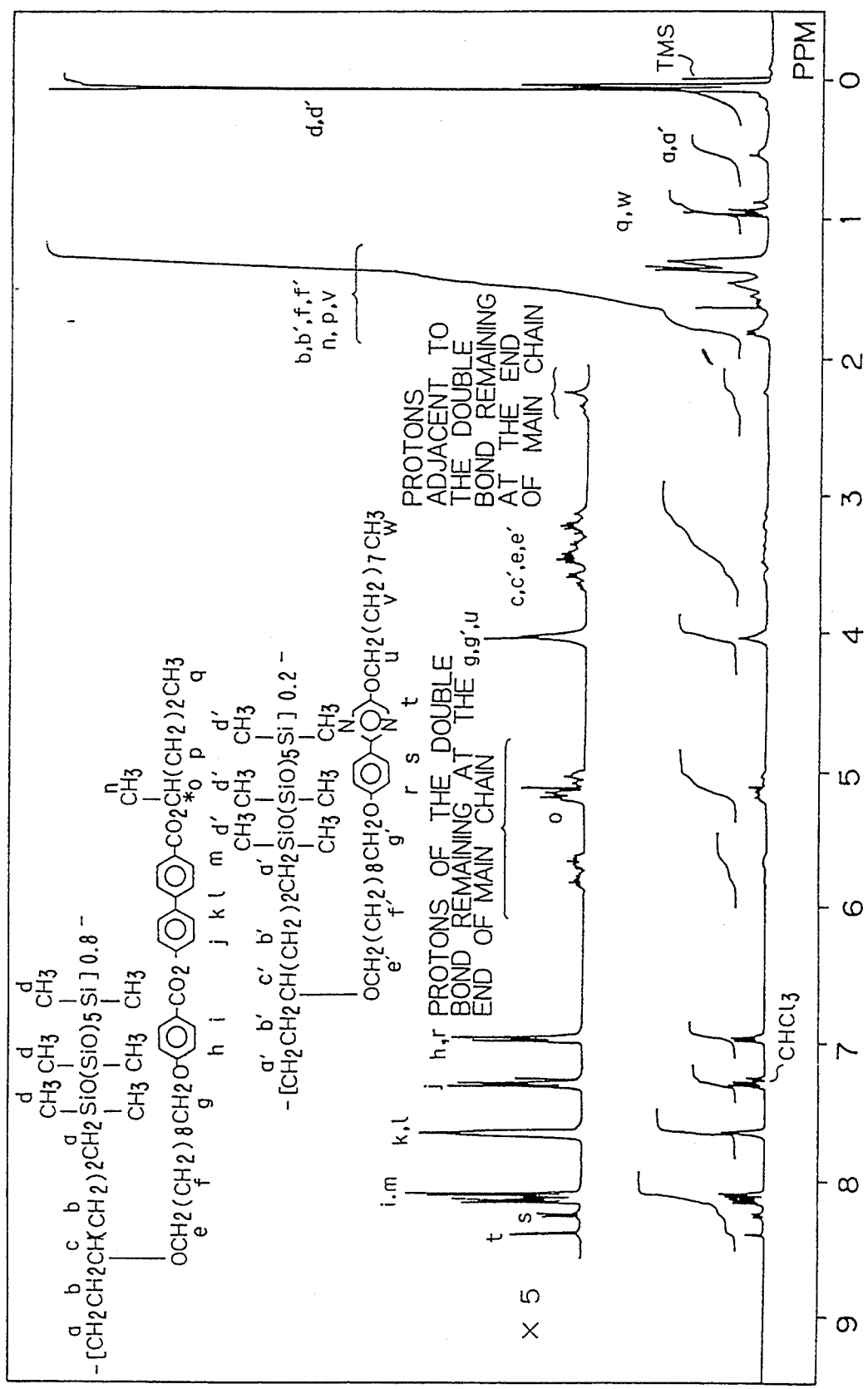
FIG. 9 is an NMR spectrum of the copolymer obtained in Example 17.

The properties of the copolymer are listed in Table 1. The NMR chart of the copolymer is shown in FIG. 9.

EXAMPLE 18

Synthesis of a copolymer:

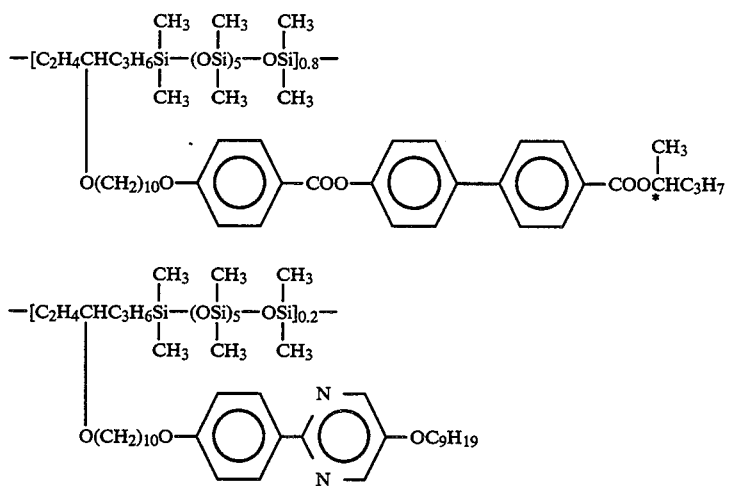

1.9 g of the optically active monomer A synthesized by the method of Synthesis 6 and 0.40 g of the optically inert monomer (d) synthesized by the method of Synthesis 14 were dissolved in 30 ml of toluene, and the atmosphere was replaced with argon. After addition of 1.2 g of an α, ω-hydrogen oligodimethylsiloxane (weight average molecular weight: 730) and a catalytic amount of hydrogen hexachloroplatinate (IV) hexahydrate, polymerization was carried out at 80° C. for 8 hours. After the solvent was distilled off under reduced pressure, the residue was purified by silica gel column chromatography, to obtain 2.9 g of the objective copolymer. (Yield: 83%)

1.9 g of the optically active monomer A synthesized by the method of Synthesis 6 and 0.40 g of the optically inert monomer (d) synthesized by the method of Synthesis 14 were dissolved in 30 ml of toluene, and the atmosphere was replaced with argon. After addition of 2.4 g of an α, ω-hydrogen oligodimethylsiloxane (weight average molecular weight: 1420) and a catalytic amount of hydrogen hexachloroplatinate (IV) hexahydrate, polymerization was carried out at 80° C. for 12 hours. After the solvent was distilled off under reduced pressure, the residue was purified by silica gel column chromatography, to obtain 3.8 g of the objective copolymer. (Yield: 81%)

The properties of the copolymer are listed in Table 1. The copolymerization ratios were determined from an NMR chart. The results are listed in Table 5.

EXAMPLE 19

Synthesis of a copolymer:

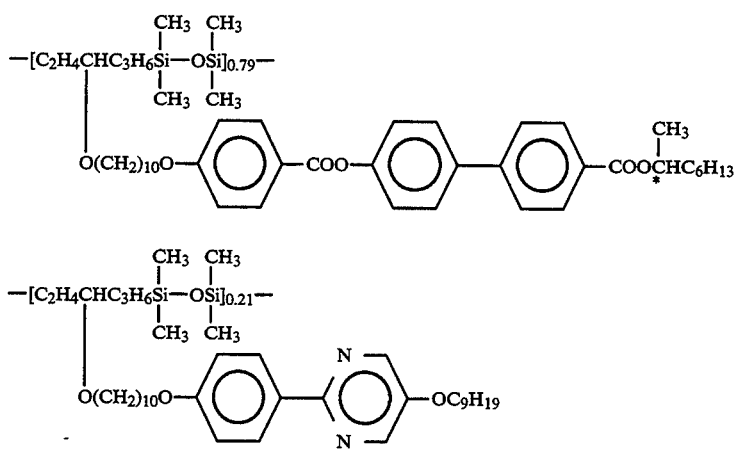

2.5 g of the optically active monomer B synthesized by the method of Synthesis 7 and 0.50 g of the optically inert monomer (d) synthesized by the method of Synthesis 14 were dissolved in 30 ml of toluene, and the atmosphere was replaced with argon. After addition of 0.41 g of 1,1,3,3-tetramethyldisiloxane and a catalytic amount of hydrogen hexachloroplatinate (IV) hexahydrate, polymerization was carried out at 80° C. for 18 hours. After the solvent was distilled off under reduced pressure, the residue was purified by silica gel column chromatography, to obtain 2.9 g of the objective copolymer. (Yield: 85%)

The properties of the copolymer are listed in Table 1. The copolymerization ratios were determined from an NMR chart. The results are listed in Table 5.

EXAMPLE 20

Synthesis of a copolymer:

1.3 g of the optically active monomer B synthesized by the method of Synthesis 7 and 0.70 g of the optically inert monomer (d) synthesized by the method of Synthesis 14 were dissolved in 30 ml of toluene, and the atmosphere was replaced with argon. After addition of 0.28 g of 1,1,3,3-tetramethyldisiloxane and a catalytic amount of hydrogen hexachloroplatinate (IV) hexahydrate, polymerization was carried out at 80° C. for 11 hours. After the solvent was distilled off under reduced pressure, the residue was purified by silica gel column chromatography, to obtain 1.9 g of the objective copolymer. (Yield: 83%)

Figure 10:
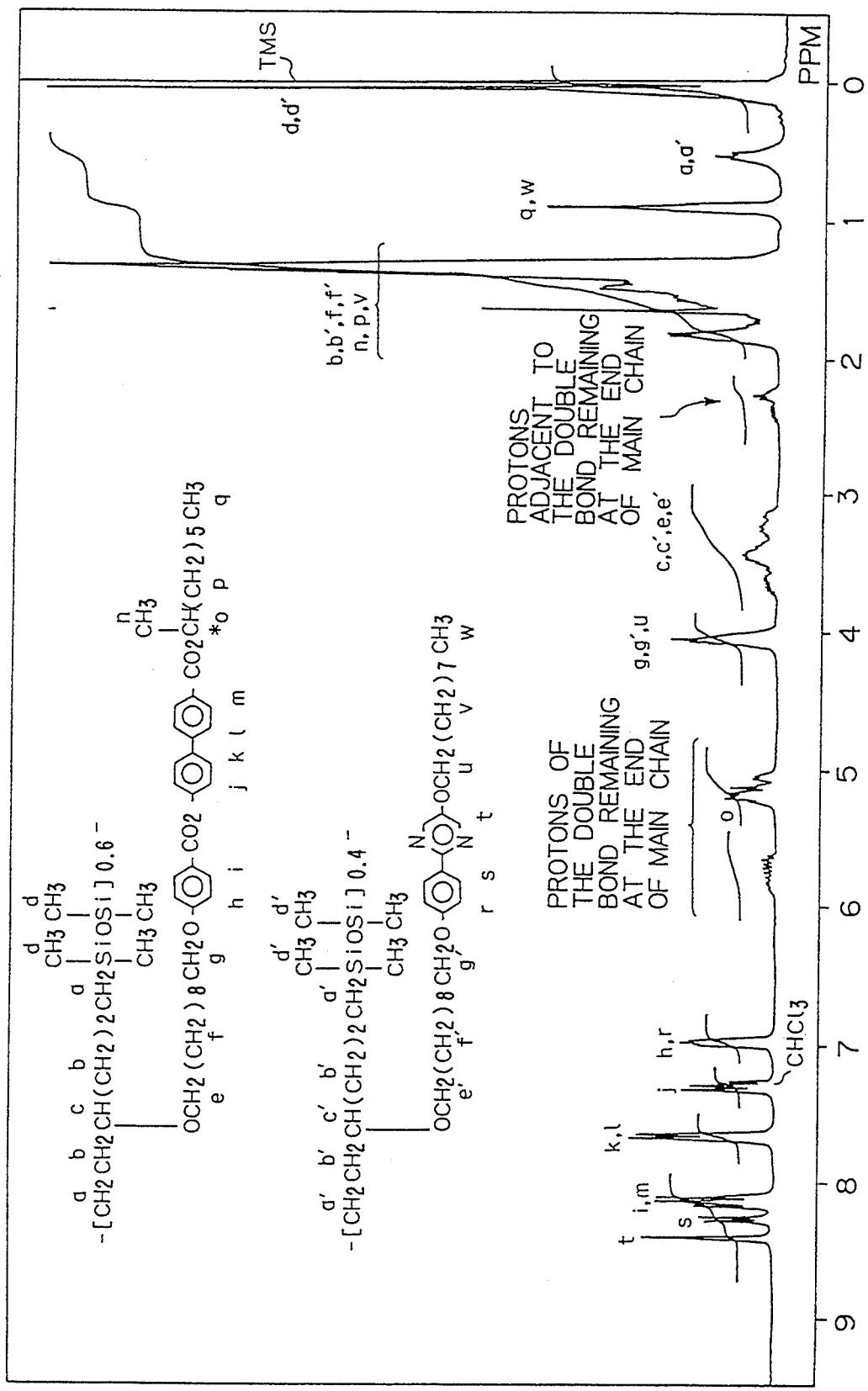
FIG. 10 is an NMR spectrum of the copolymer obtained in Example 20.

The properties of the copolymer are listed in Table 1. The NMR chart of the copolymer is shown in FIG. 10.

EXAMPLE 21

Synthesis of a copolymer:

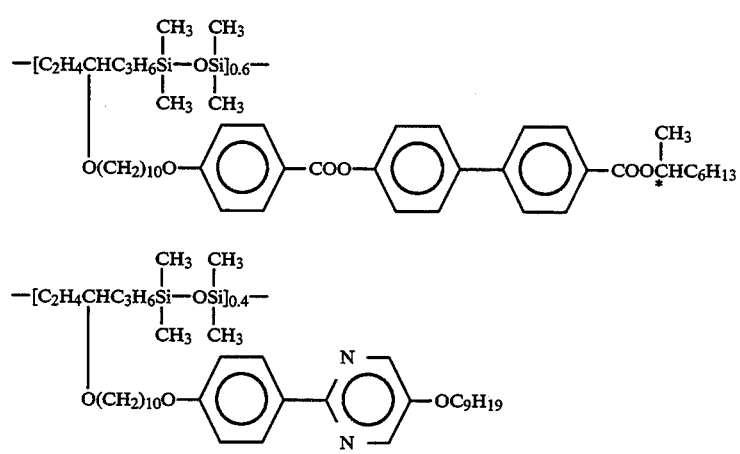

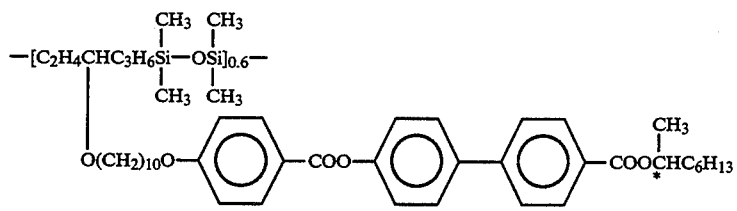

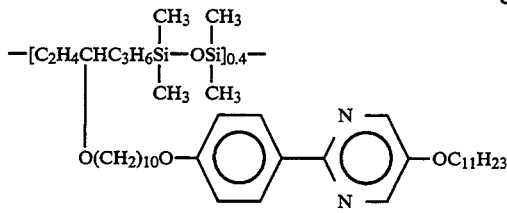

2.0 g of the optically active monomer B synthesized by the method of Synthesis 7 and 1.1 g of the optically inert monomer (e) synthesized by the method of Synthesis 15 were dissolved in 40 ml of toluene, and the atmosphere was replaced with argon. After addition of 0.44 g of 1,1,3,3-tetramethyldisiloxane and a catalytic amount of hydrogen hexachloroplatinate (IV) hexahydrate, polymerization was carried out at 80° C. for 8 hours. After the solvent was distilled off under reduced pressure, the residue was purified by silica gel column chromatography, to obtain 2.7 g of the objective copolymer. (Yield: 79%)

Figure 11:
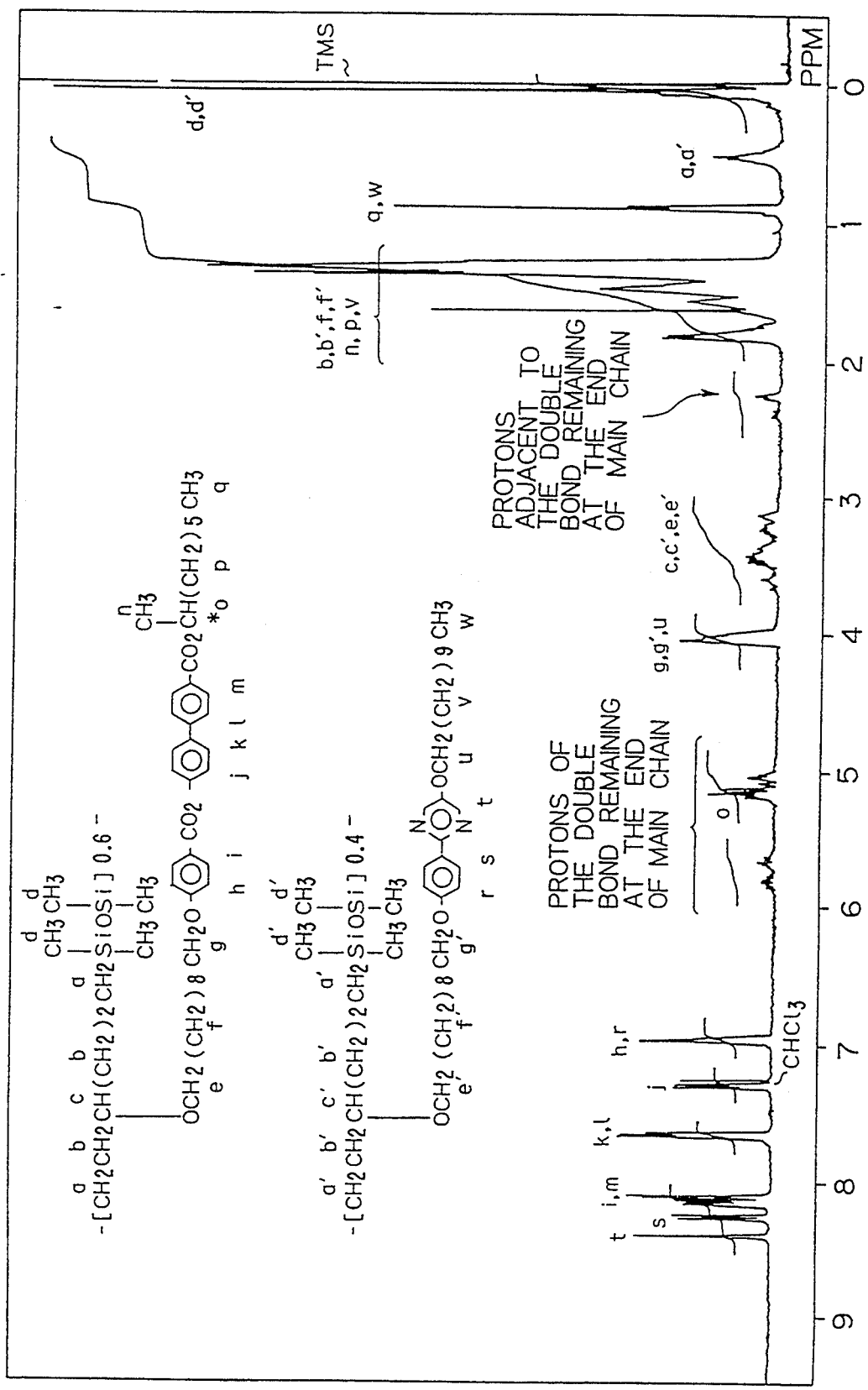
FIG. 11 is an NMR spectrum of the copolymer obtained in Example 21.

The properties of the copolymer are listed in Table 1. The NMR chart of the copolymer is shown in FIG. 11.

EXAMPLE 22

Synthesis of a copolymer:

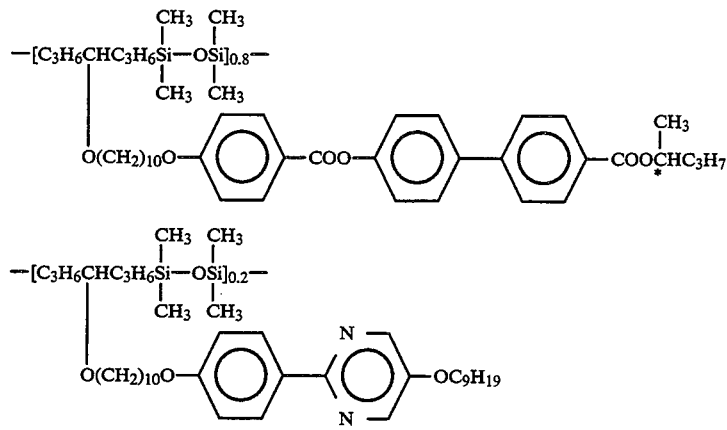

2.0 g of the optically active monomer C synthesized by the method of Synthesis 8 and 0.43 g of the optically inert monomer (k) synthesized by the method of Synthesis 21 were dissolved in 20 ml of toluene, and the atmosphere was replaced with argon. After addition of 0.34 g of 1,1,3,3-tetramethyldisiloxane and a catalytic amount of hydrogen hexachloroplatinate (IV) hexahydrate, polymerization was carried out at 85° C. for 9 hours. After the solvent was distilled off under reduced pressure, the residue was purified by silica gel column chromatography, to obtain 2.3 g of the objective copolymer. (Yield: 83%)

Figure 12:
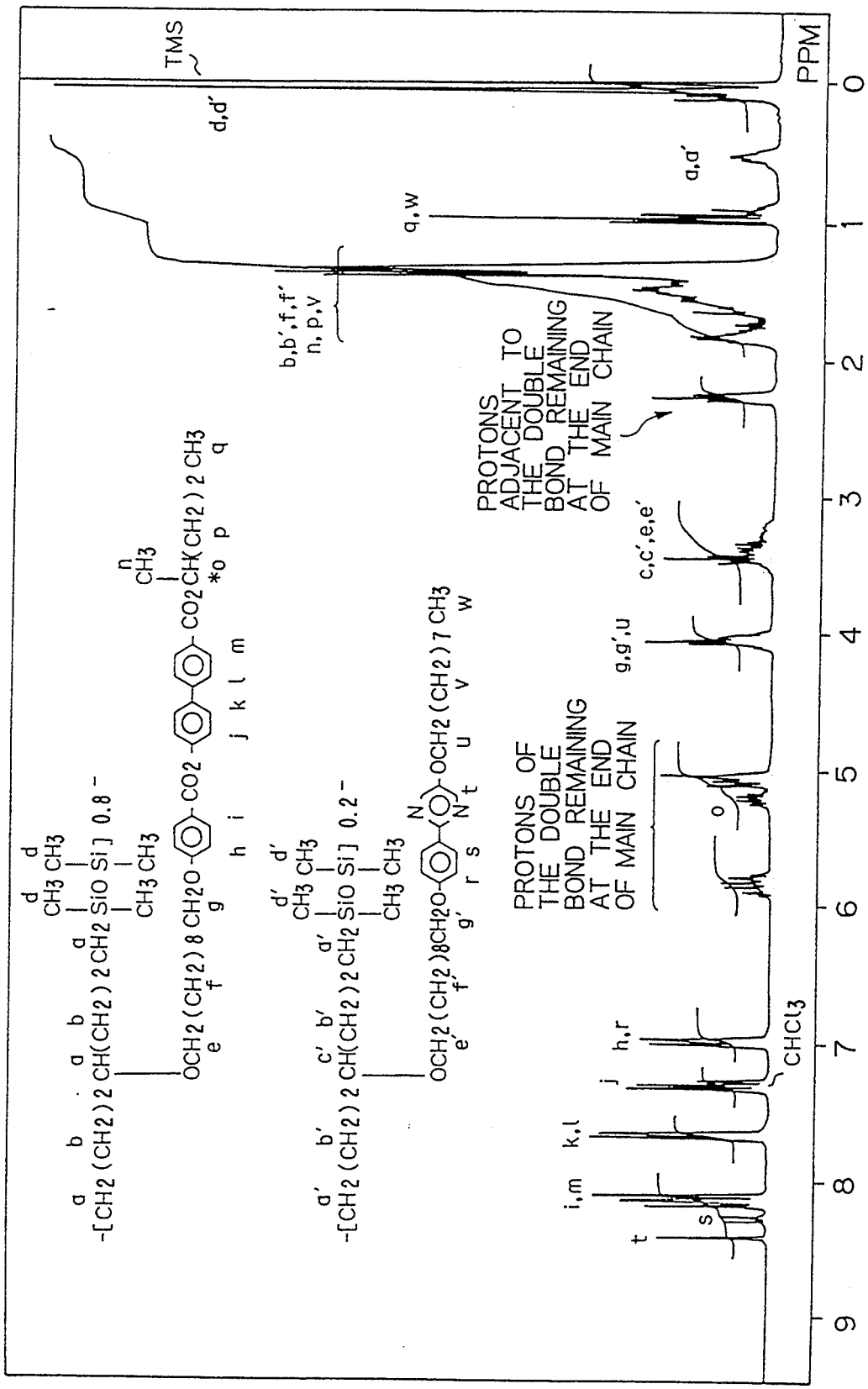
FIG. 12 is an NMR spectrum of the copolymer obtained in Example 22.

The properties of the copolymer are listed in Table 1. The NMR chart of the copolymer is shown in FIG. 12.

EXAMPLE 23

Synthesis of a copolymer:

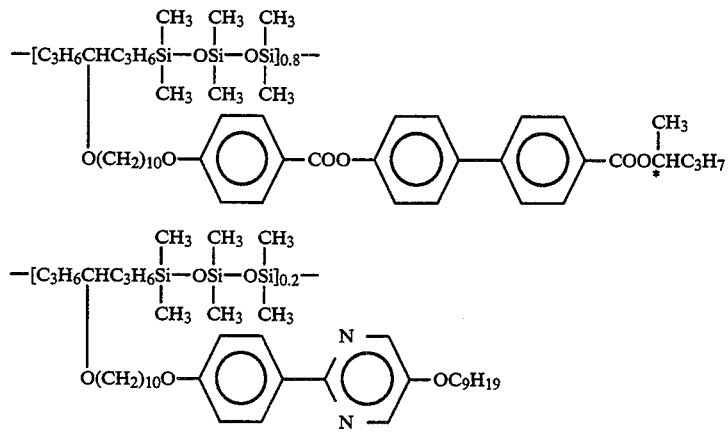

2.0 g of the optically active monomer C synthesized by the method of Synthesis 8 and 0.43 g of the optically inert monomer (k) synthesized by the method of Synthesis 21 were dissolved in 20 ml of toluene, and the atmosphere was replaced with argon. After addition of 0.53 g of 1,1,3,3,5,5-hexamethyltrisiloxane and a catalytic amount of hydrogen hexachloroplatinate (IV) hexahydrate, polymerization was carried out at 85° C.

for 11 hours. After the solvent was distilled off under reduced pressure, the residue was purified by silica gel column chromatography, to obtain 2.7 g of the objective copolymer. (Yield: 91%)

The properties of the copolymer are listed in Table 1.

Figure 14:
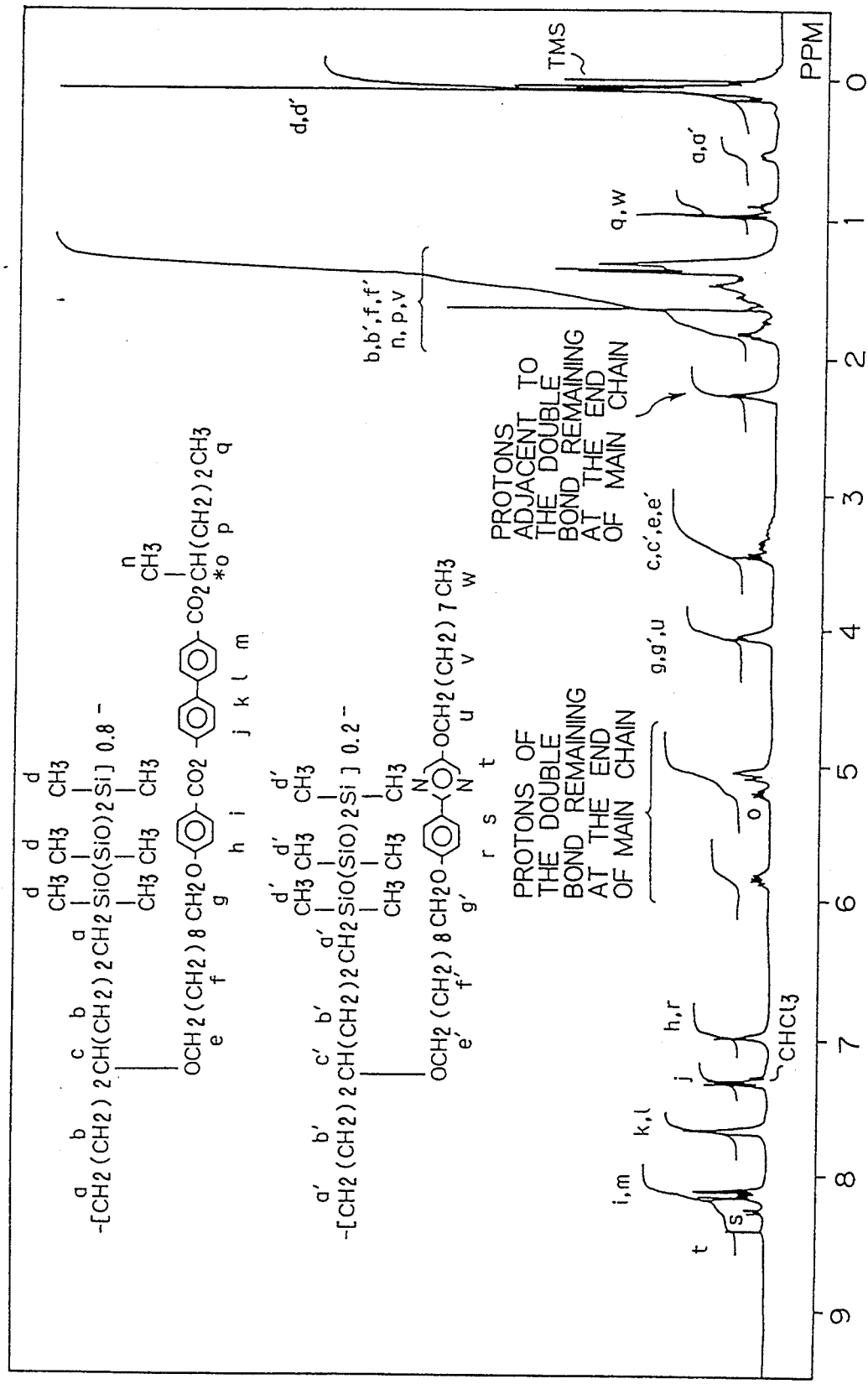
FIG. 14 is an NMR spectrum of the copolymer obtained in Example 24.

The properties of the copolymer are listed in Table 1. The NMR chart of the copolymer is shown in FIG. 14.

EXAMPLE 25

Synthesis of a copolymer:

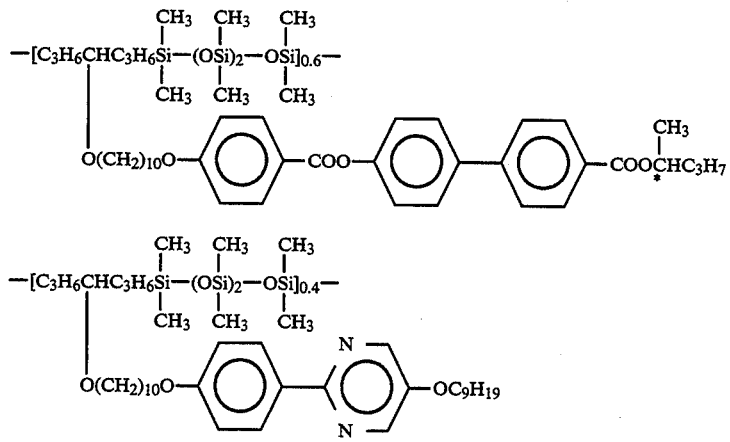

Figure 13:
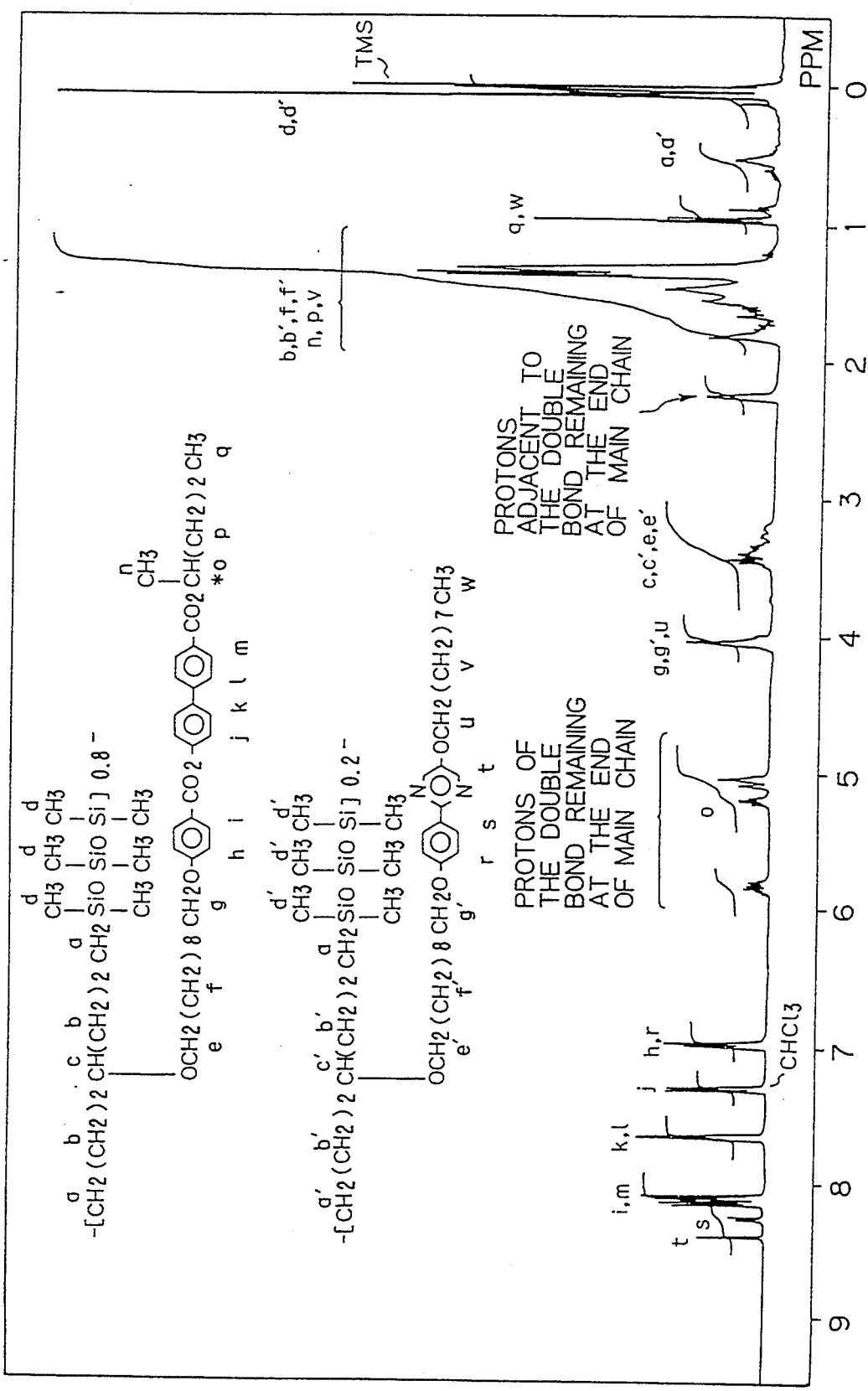
FIG. 13 is an NMR spectrum of the copolymer obtained in Example 23.

The NMR chart of the copolymer is shown in FIG. 13.

EXAMPLE 24

Synthesis of a copolymer:

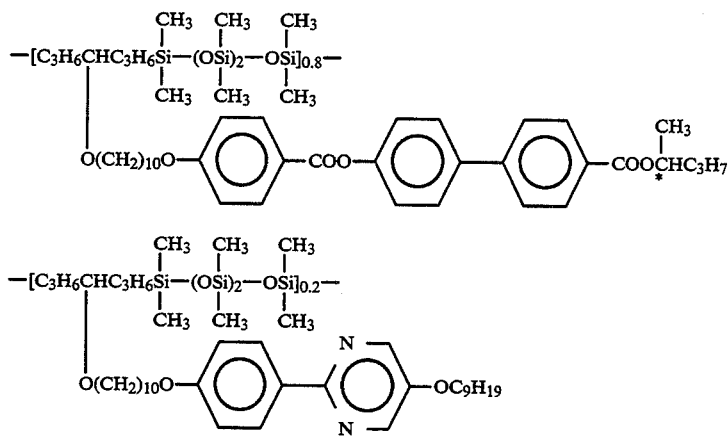

0.91 g of the optically active monomer C synthesized by the method of Synthesis 8 and 0.20 g of the optically inert monomer (k) synthesized by the method of Synthesis 21 were dissolved in 10 ml of toluene, and the atmosphere was replaced with argon. After addition of 0.40 g of 1,1,3,3,5,5,7,7-octamethyltetrasiloxane and a catalytic amount of hydrogen hexachloroplatinate (IV) hexahydrate, polymerization was carried out at 85° C. for 8 hours. After the solvent was distilled off under reduced pressure, the residue was purified by silica gel column chromatography, to obtain 0.96 g of the objective copolymer. (Yield: 64%)

0.65 g of the optically active monomer C synthesized by the method of Synthesis 8 and 0.37 g of the optically inert monomer (k) synthesized by the method of Synthesis 21 were dissolved in 10 ml of toluene, and the atmosphere was replaced with argon. After addition of 0.38 g of 1,1,3,3,5,5,7,7-octamethyltetrasiloxane and a catalytic amount of hydrogen hexachloroplatinate (IV) hexahydrate, polymerization was carried out at 85° C. for 14 hours. After the solvent was distilled off under reduced pressure, the residue was purified by silica gel column chromatography, to obtain 1.1 g of the objective copolymer. (Yield: 79%)

Figure 15:
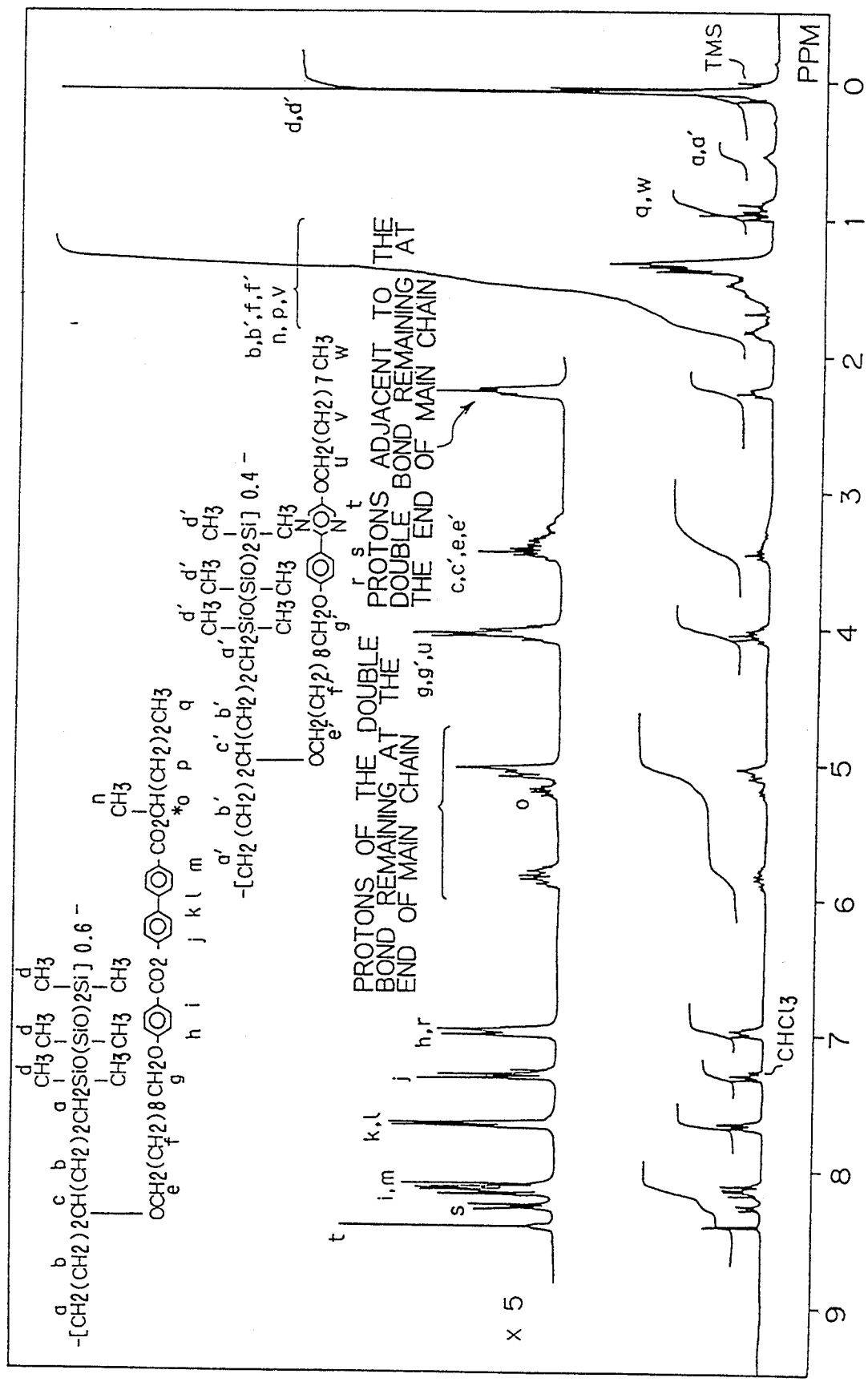
FIG. 15 is an NMR spectrum of the copolymer obtained in Example 25.

The properties of the copolymer are listed in Table 1. The NMR chart of the copolymer is shown in FIG. 15.

EXAMPLE 26

Synthesis of a copolymer:

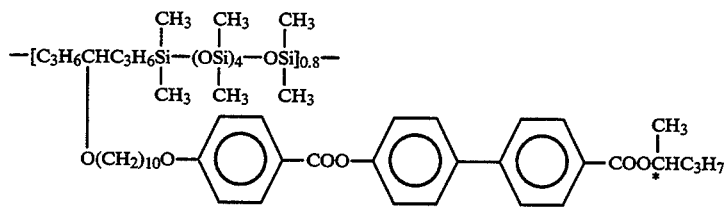

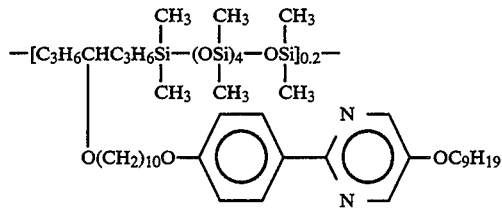

0.91 g of the optically active monomer C synthesized by the method of Synthesis 8 and 0.20 g of the optically inert monomer (k) synthesized by the method of Synthesis 21 were dissolved in 10 ml of toluene, and the atmosphere was replaced with argon. After addition of 0.58 g of an α, ω-hydrogen oligodimethylsiloxane (weight average molecular weight: 670) and a catalytic amount of hydrogen hexachloroplatinate (IV) hexahydrate, polymerization was carried out at 85° C. for 13 hours. After the solvent was distilled off under reduced pressure, the residue was purified by silica gel column chromatography, to obtain 1.5 g of the objective copolymer. (Yield: 91%)

Figure 16:
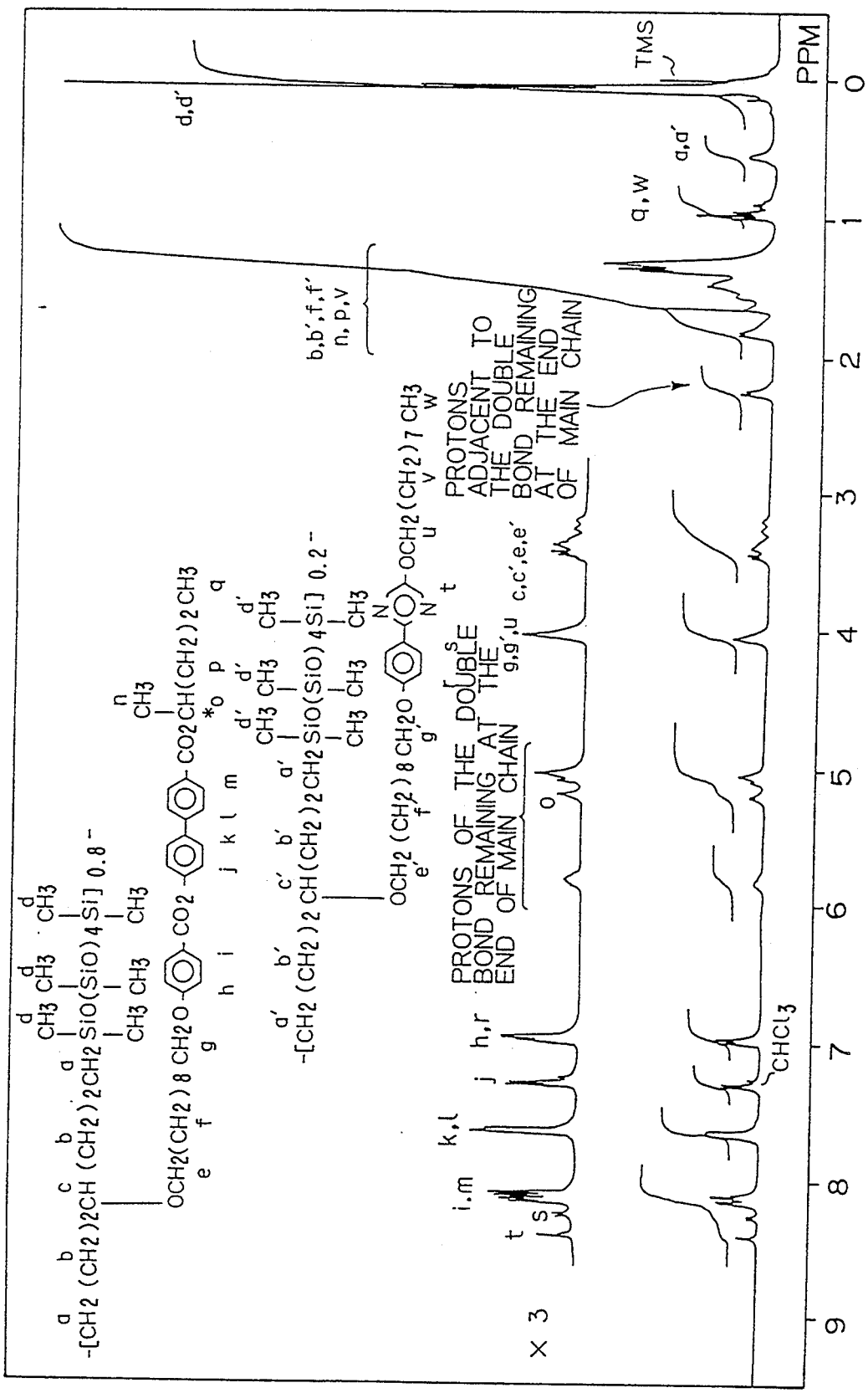
FIG. 16 is an NMR spectrum of the copolymer obtained in Example 26.

The properties of the copolymer are listed in Table 1. The NMR chart of the copolymer is shown in FIG. 16.

thesis 21 were dissolved in 20 ml of toluene, and the atmosphere was replaced with argon. After addition of 1.3 g of an α, ω-hydrogen oligodimethylsiloxane (weight average molecular weight: 730) and a catalytic amount of hydrogen hexachloroplatinate (IV) hexahydrate, polymerization was carried out at 85° C. for 9 hours. After the solvent was distilled off under reduced pressure, the residue was purified by silica gel column chromatography, to obtain 3.2 g of the objective copolymer. (Yield: 86%)

Figure 17:
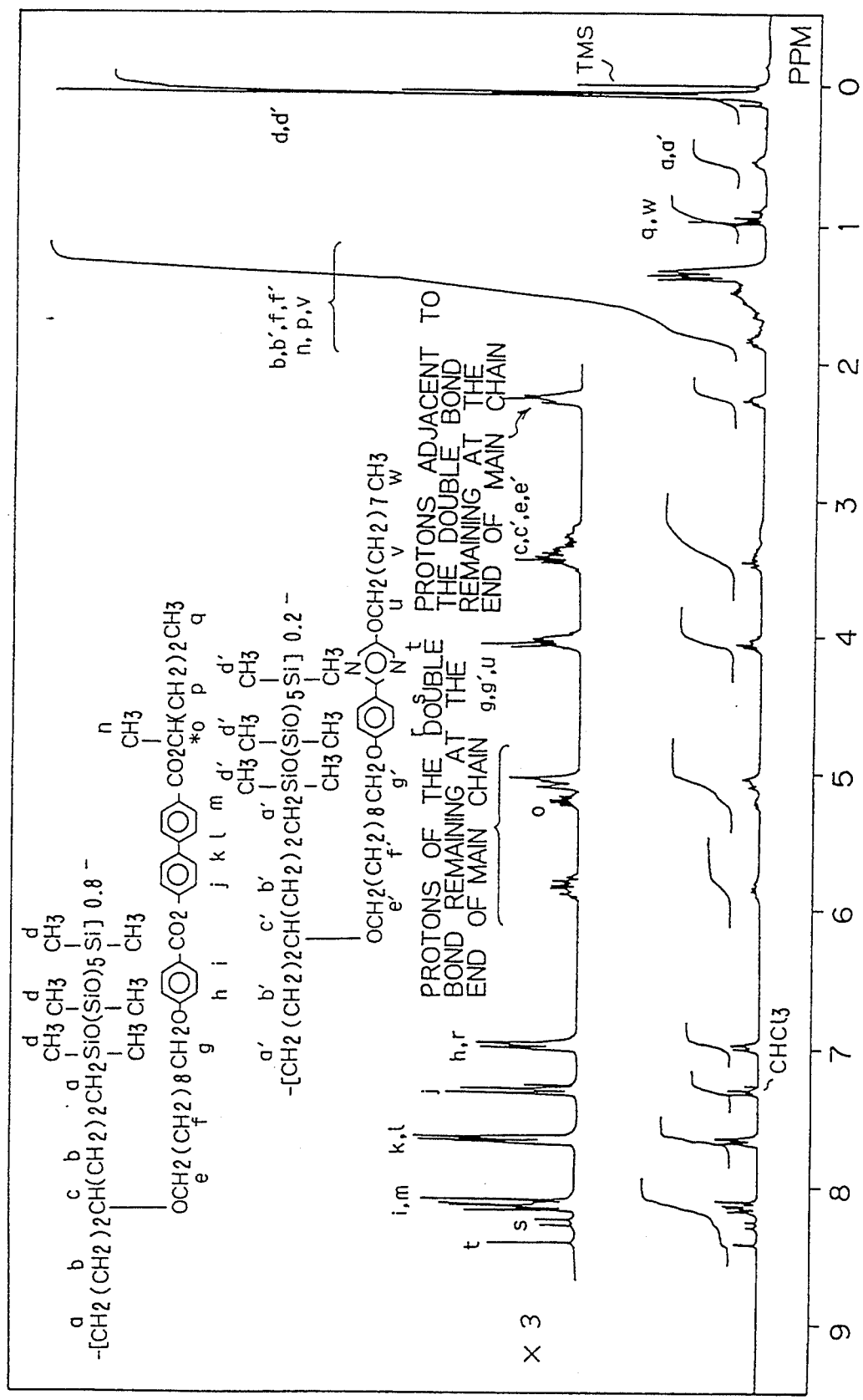
FIG. 17 is an NMR spectrum of the copolymer obtained in Example 27.

The properties of the copolymer are listed in Table 1. The NMR chart of the copolymer is shown in FIG. 17.

EXAMPLE 28

Synthesis of a copolymer:

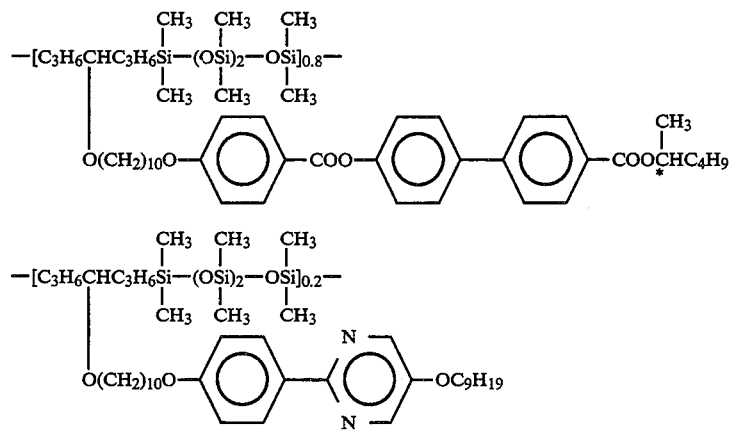

EXAMPLE 27

Synthesis of a copolymer:

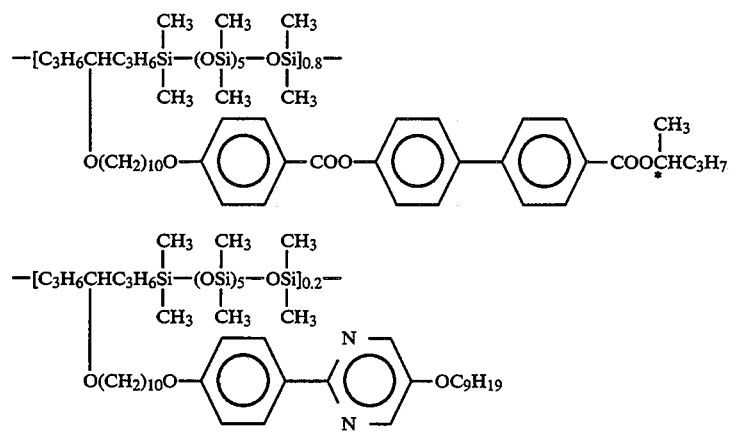

2.0 g of the optically active monomer C synthesized by the method of Synthesis 8 and 0.43 g of the optically inert monomer (k) synthesized by the method of Syn- 0.93 g of the optically active monomer D synthesized by the method of Synthesis 9 and 0.20 g of the optically inert monomer (k) synthesized by the method of Synthesis 21 were dissolved in 10 ml of toluene, and the atmosphere was replaced with argon. After addition of 0.40 g of 1,1,3,3,5,5,7,7-octamethyltetrasiloxane and a catalytic amount of hydrogen hexachloroplatinate (IV) hexahydrate, polymerization was carried out at 85° C. for 8 hours. After the solvent was distilled off under reduced pressure, the residue was purified by silica gel column chromatography, to obtain 1.2 g of the objective copolymer. (Yield: 78%)

Figure 18:
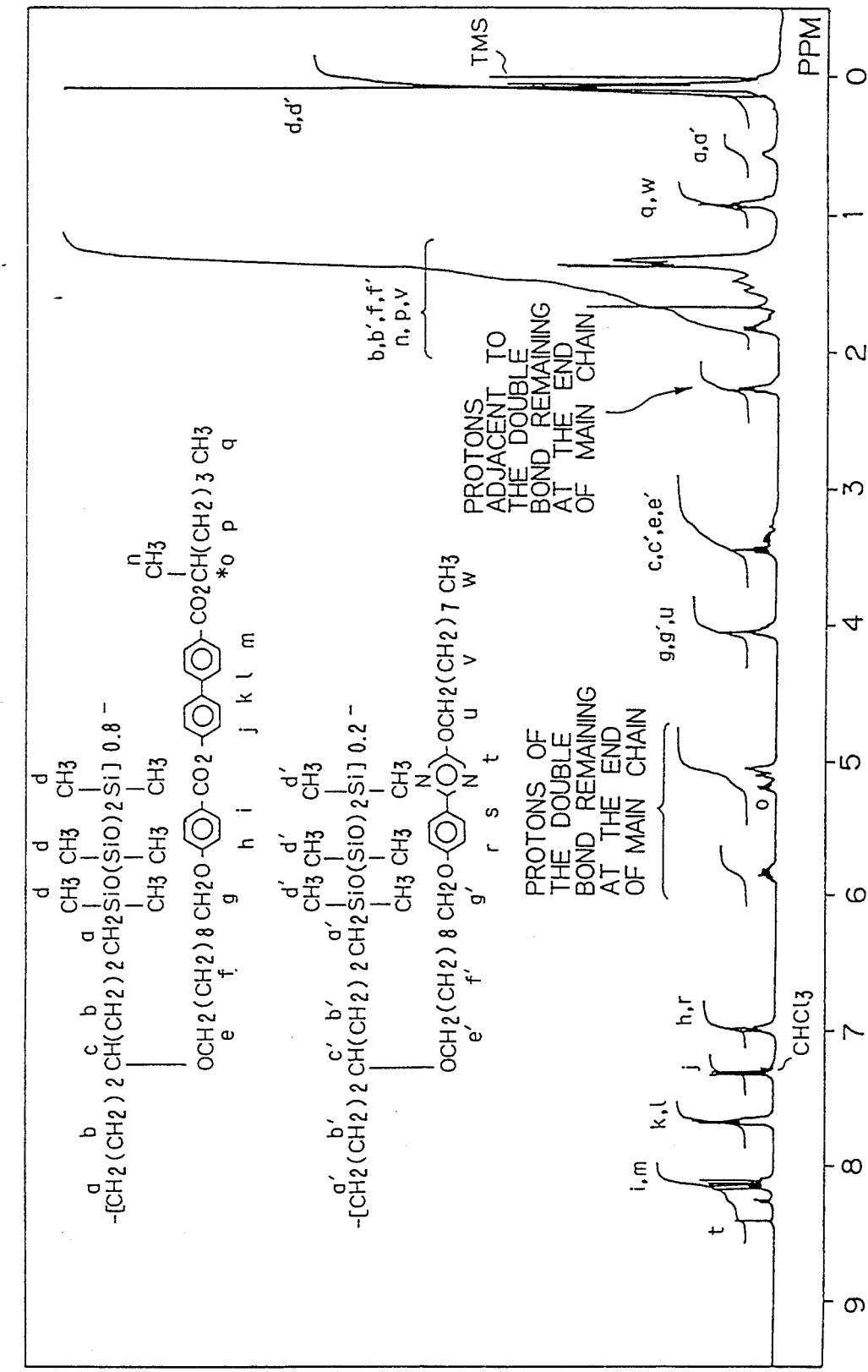
FIG. 18 is an NMR spectrum of the copolymer obtained in Example 28.

The properties of the copolymer are listed in Table 1. The NMR chart of the copolymer is shown in FIG. 18.

EXAMPLES 29 TO 31

Synthesis of copolymers:

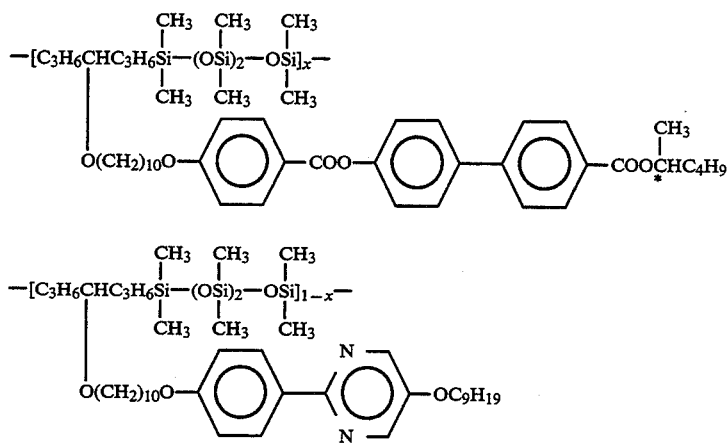

Copolymerizations were carried out in the same manner as in Example 28 with the exception that optically active monomer D and optically inert monomer (k) were used in the ratios listed in Table 3.

TABLE 3

| Examples | Monomer D | Monomer (k) | Siloxane | Yield | Yield |
|---|---|---|---|---|---|
| 29 | 0.67 g | 0.38 g | 0.38 g | 1.2 g | 84% |
| 30 | 0.40 g | 0.51 g | 0.34 g | 1.1 g | 88% |
| 31 | 0.20 g | 0.67 g | 0.34 g | 0.95 g | 79% |

Figure 19:
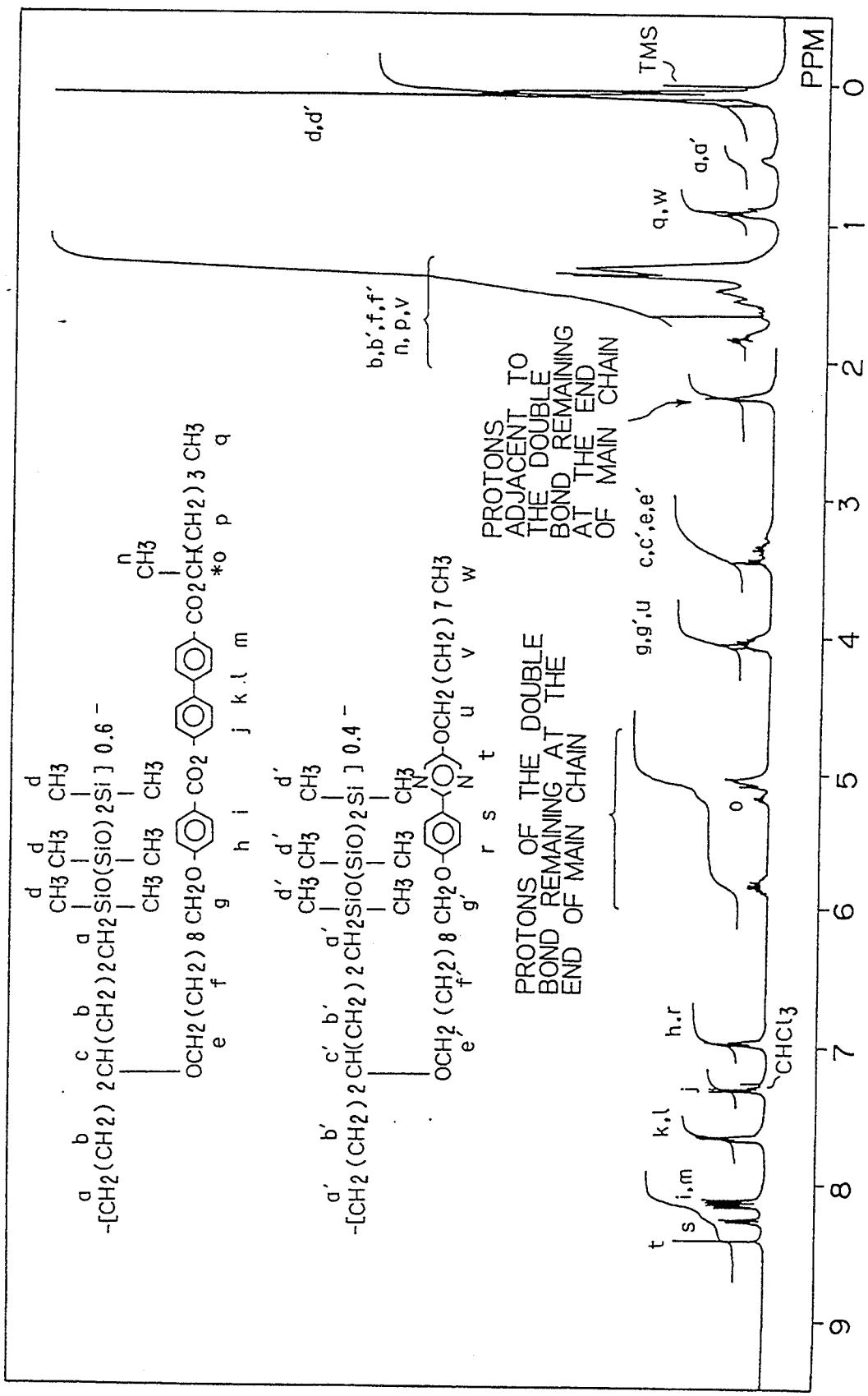
FIG. 19 is an NMR spectrum of the copolymer obtained in Example 29.
Figure 20:
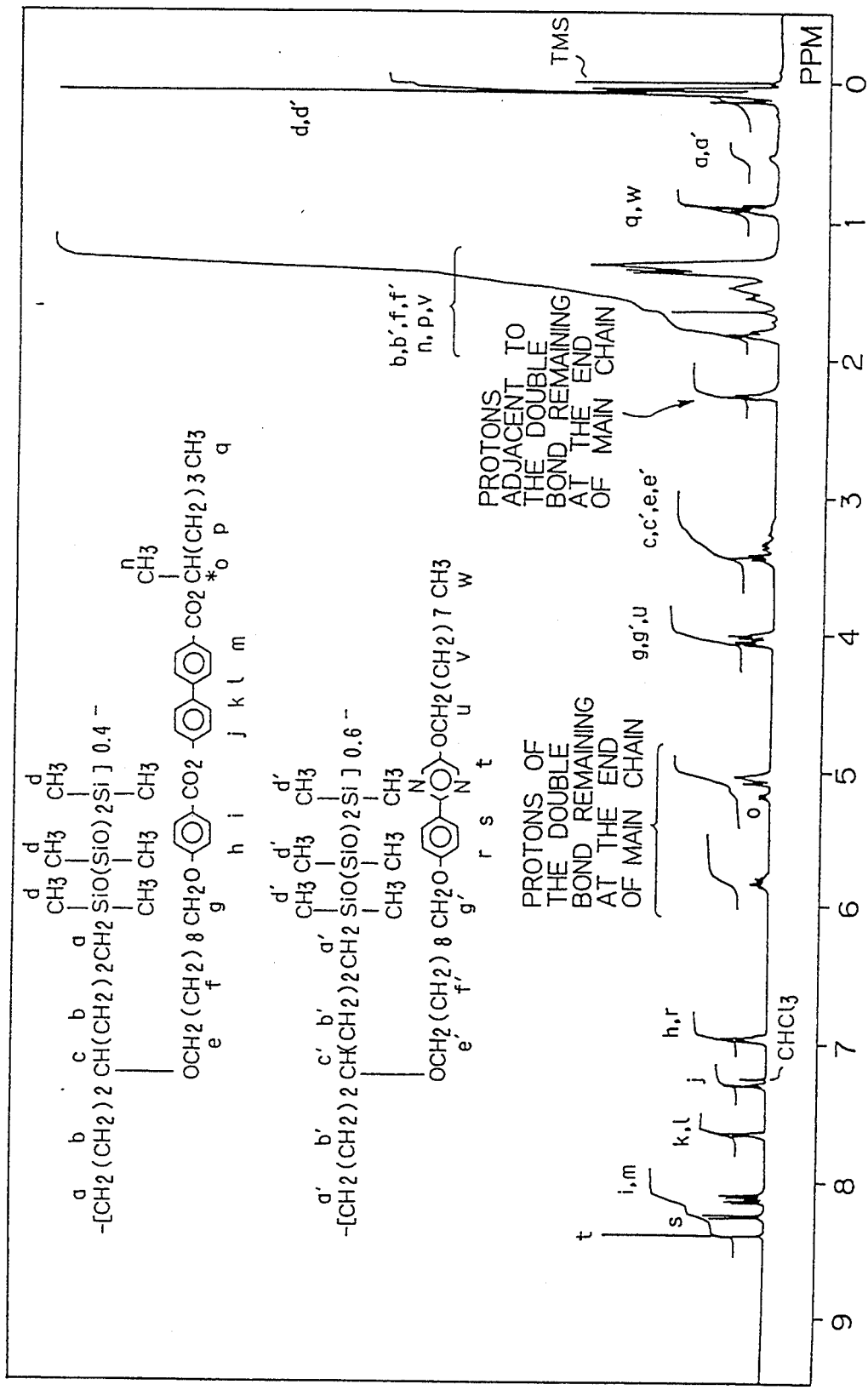
FIG. 20 is an NMR spectrum of the copolymer obtained in Example 30.
Figure 21:
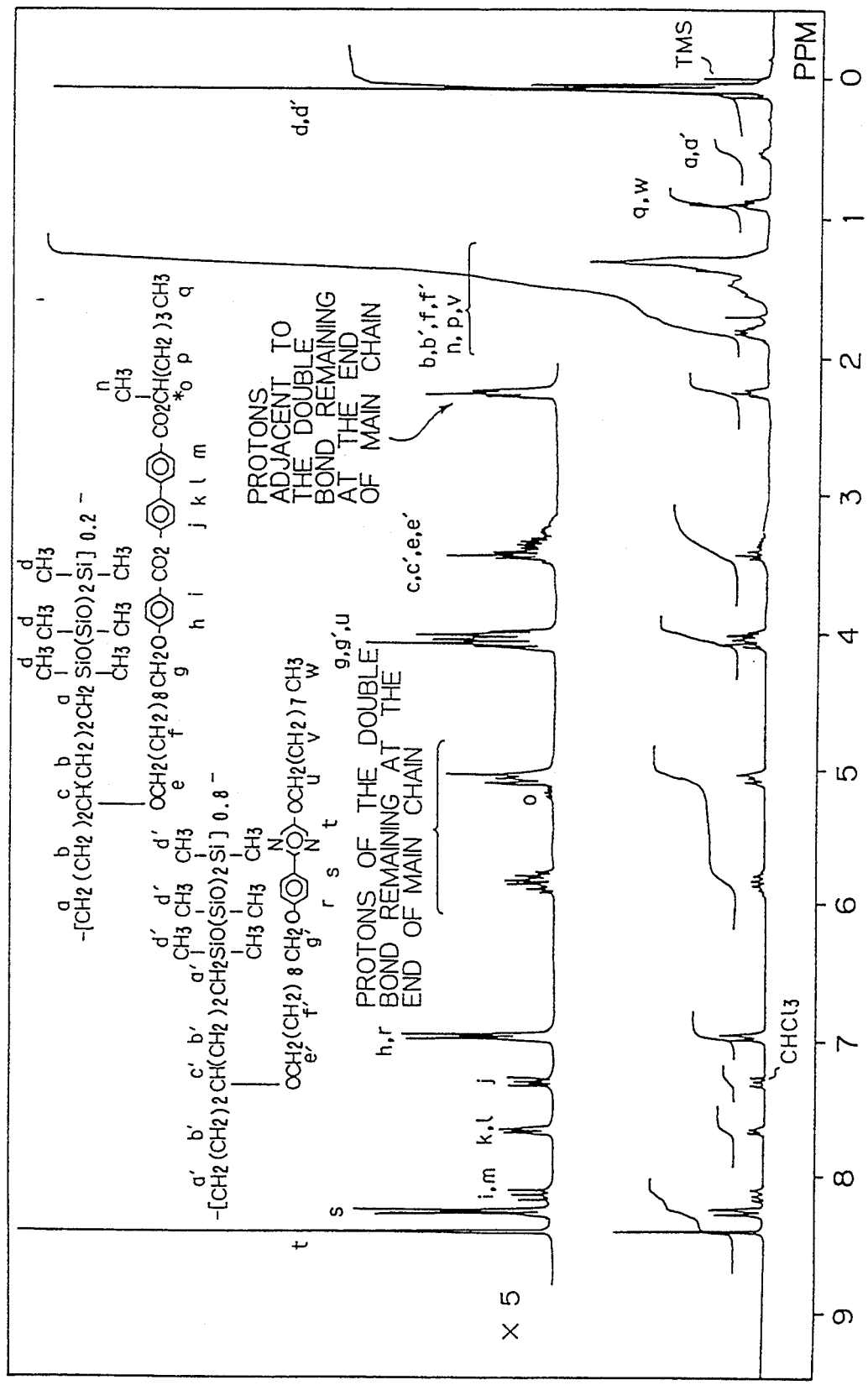
FIG. 21 is an NMR spectrum of the copolymer obtained in Example 31.

The properties of the obtained copolymers are listed in Table 1. The NMR chart of the copolymer of Example 29 is shown in FIG. 19, the NMR chart of the copolymer of Example 30 in FIG. 20, and the NMR chart of the copolymer of Example 31 in FIG. 21.

EXAMPLE 32

Synthesis of a copolymer:

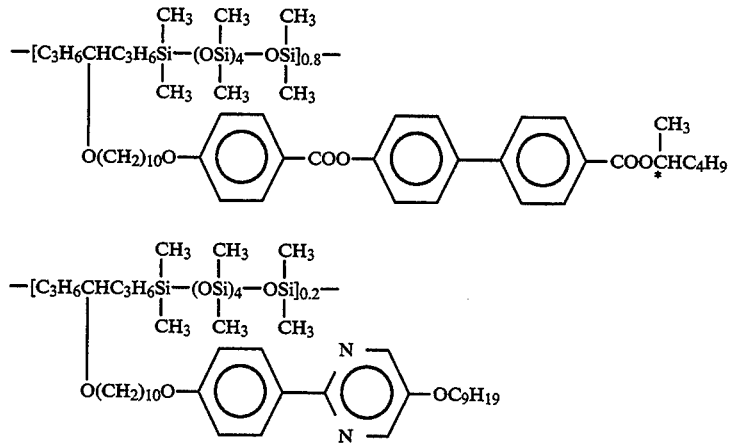

0.93 g of the optically active monomer D synthesized by the method of Synthesis 9 and 0.20 g of the optically inert monomer (k) synthesized by the method of Synthesis 21 were dissolved in 10 ml of toluene, and the atmosphere was replaced with argon. After addition of 0.58 g of an α,ω-hydrogen oligodimethylsiloxane (weight average molecular weight: 670) and a catalytic amount of hydrogen hexachloroplatinate (IV) hexahydrate, polymerization was carried out at 85° C. for 12 hours. After the solvent was distilled off under reduced pressure, the residue was purified by silica gel column chromatography, to obtain 1.4 g of the objective copolymer. (Yield: 82%)

Figure 22:
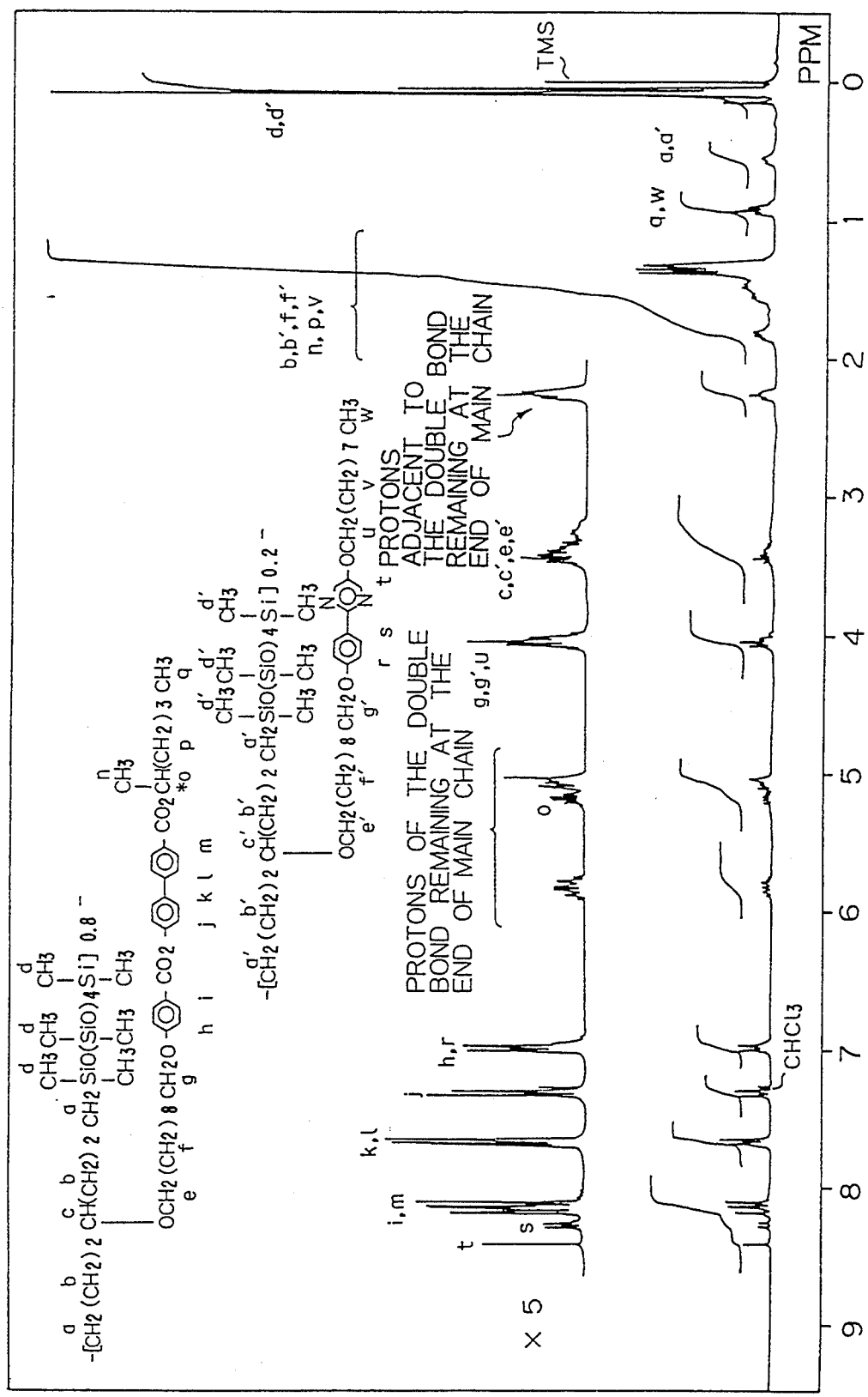
FIG. 22 is an NMR spectrum of the copolymer obtained in Example 32.

The properties of the copolymer are listed in Table 1. The NMR chart of the copolymer is shown in FIG. 22.

EXAMPLES 33 AND 34

Synthesis of copolymers:

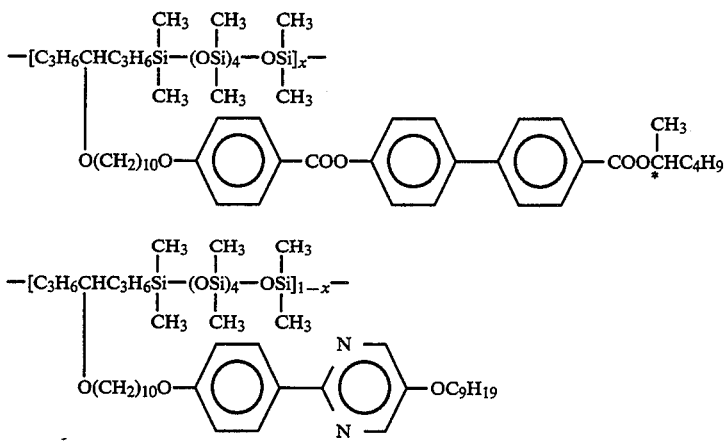

Copolymerizations were carried out in the same manner as in Example 32 with the exception that optically active monomer D and optically inert monomer (k) were used in the ratios listed in Table 4.

TABLE 4

| Examples | Monomer D | Monomer (k) | Siloxane | Yield | Yield |
|---|---|---|---|---|---|
| 33 | 0.67 g | 0.38 g | 0.60 g | 1.4 g | 85% |
| 34 | 0.39 g | 0.49 g | 0.55 g | 1.2 g | 84% |

Figure 23:
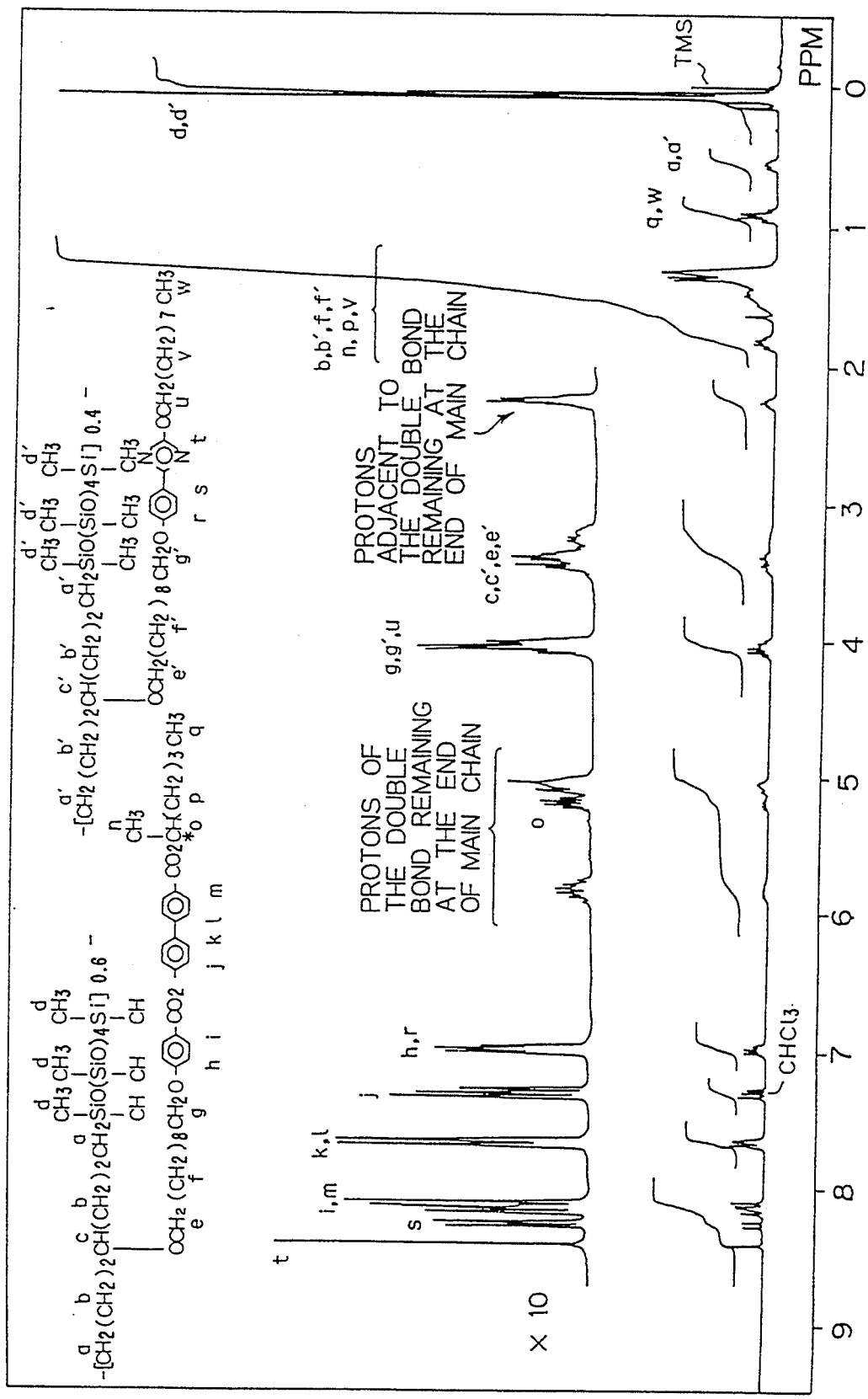
FIG. 23 is an NMR spectrum of the copolymer obtained in Example 33.
Figure 24:
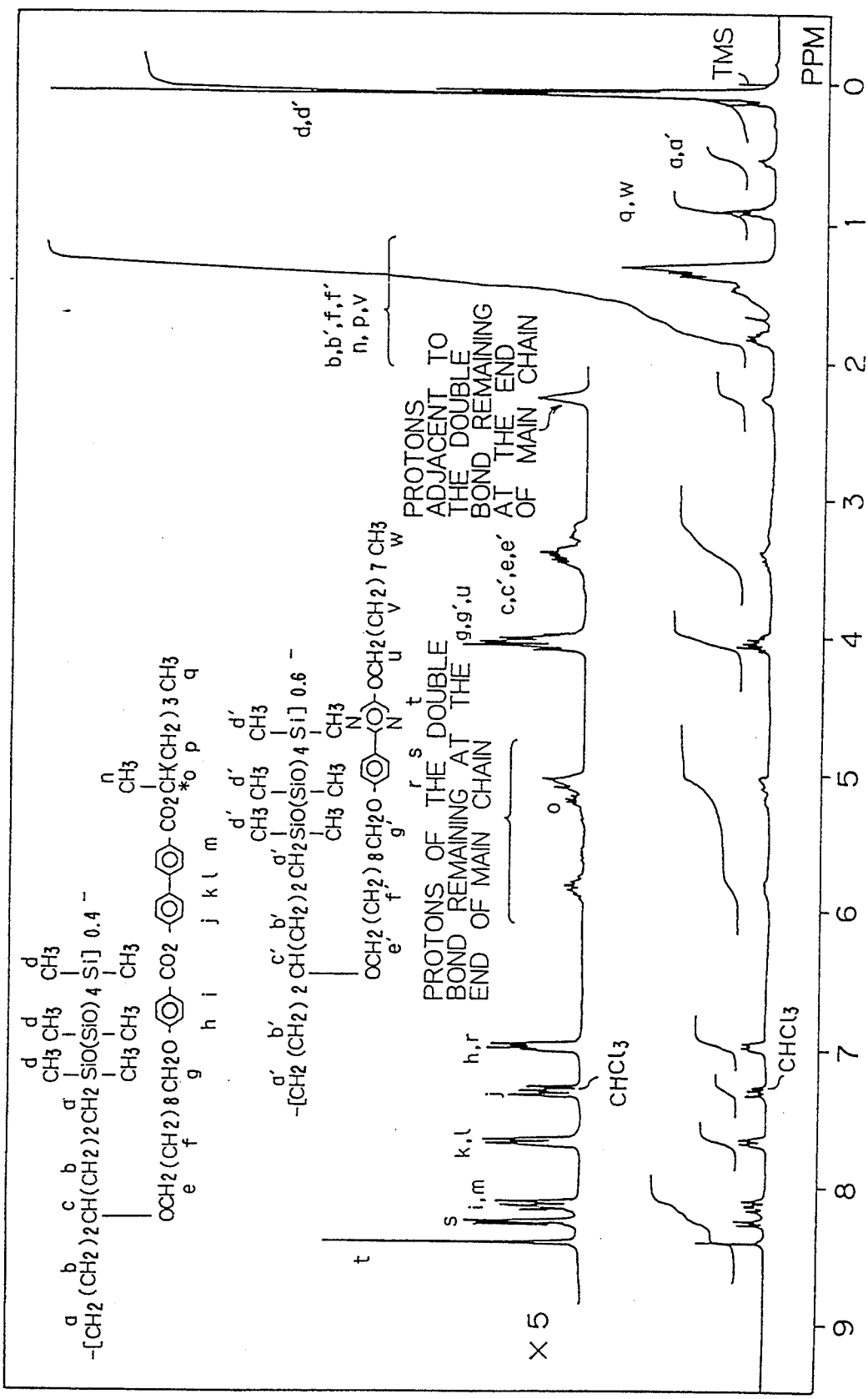
FIG. 24 is an NMR spectrum of the copolymer obtained in Example 34.

The properties of the obtained copolymers are listed in Table 1. The NMR chart of the copolymer of Example 33 is shown in FIG. 23, and the NMR chart of the copolymer of Example 34 in FIG. 24.

EXAMPLE 35

Synthesis of a copolymer:

0.86 g of the optically active monomer E synthesized by the method of Synthesis 10 and 0.18 g of the optically inert monomer (k) synthesized by the method of Synthesis 21 were dissolved in 10 ml of toluene, and the atmosphere was replaced with argon. After addition of 0.52 g of an $\alpha,\omega$-hydrogen oligodimethylsiloxane (weight average molecular weight: 670) and a catalytic amount of hydrogen hexachloroplatinate (IV) hexahydrate, polymerization was carried out at 85° C. for 14 hours. After the solvent was distilled off under reduced pressure, the residue was purified by silica gel column chromatography, to obtain 1.5 g of the objective copolymer. (Yield: 96%)

Figure 25:
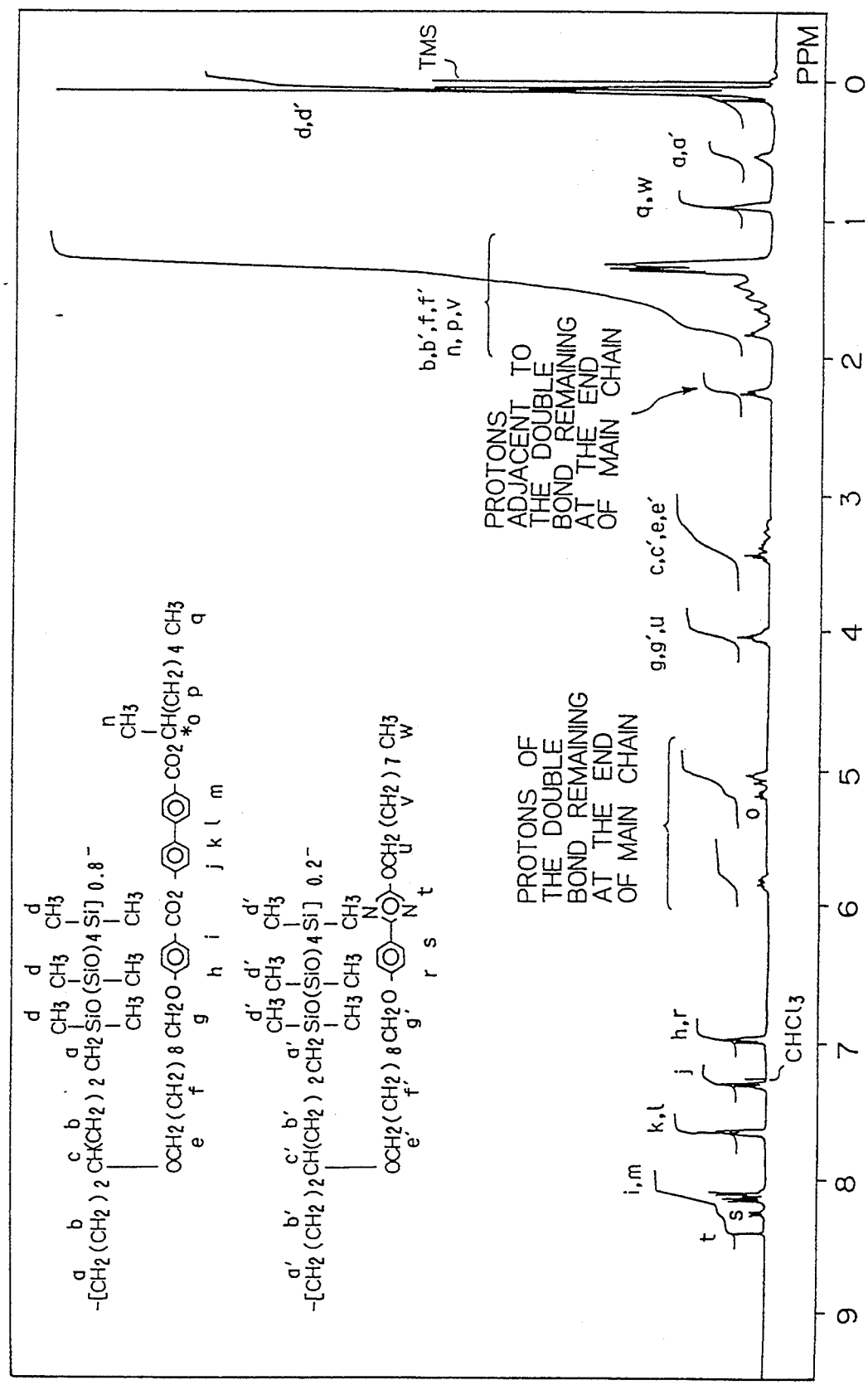
FIG. 25 is an NMR spectrum of the copolymer obtained in Example 35.

The properties of the copolymer are listed in Table 1. The NMR chart of the copolymer is shown in FIG. 25.

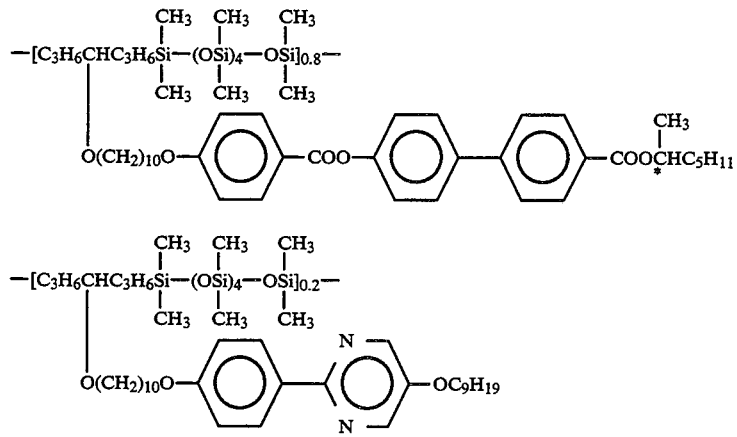

TABLE 1

| | Phase transition behavior | | | Mw | Response time (room temperature) |
|---|---|---|---|---|---|
| Example 1 | glass ⇐ ⟶ $S_C^*$ ⇐ ⟶ Iso | −10 | 98 | 3500 | 10.3 ms |
| Example 2 | glass ⇐ ⟶ $S_C^*$ ⇐ ⟶ Iso | −15 | 97 | 2600 | 3.8 ms |

TABLE 1-continued

| | Phase transition behavior | Mw | Response time (room temperature) |
|---|---|---|---|
| Example 3 | glass ←→ S$_C$* ←→ Iso<br>−15  93 | 2600 | 3.8 ms |
| Example 4 | glass ←→ S$_C$* ←→ Iso<br>−15  99 | 3300 | 5.8 ms |
| Example 5 | glass ←→ S$_C$* ←→ Iso<br>−20  95 | 2500 | 1.3 ms |
| Example 6 | glass ←→ S$_C$* ←→ Iso<br>−15  96 | 2400 | 2.8 ms |
| Example 7 | glass ←→ S$_C$* ←→ Iso<br>−10  84 | 3000 | 4.0 ms |
| Example 8 | glass ←→ S$_C$* ←→ Iso<br>−10  86 | 2600 | 3.2 ms |
| Example 9 | glass ←→ S$_C$* ←→ Iso<br>−10  78 | 2400 | 4.2 ms |
| Example 10 | glass ←→ S$_C$* ←→ Iso<br>−10  96 | 2900 | 4.5 ms |
| Example 11 | glass ←→ S$_C$* ←→ Iso<br>−10  97 | 2900 | 4.7 ms |
| Example 12 | glass ←→ S$_C$* ←→ Iso<br>−10  94 | 3000 | 5.9 ms |
| Example 13 | glass ←→ S$_C$* ←→ Iso<br>−10  97 | 3200 | 5.5 ms |
| Example 14 | glass ←→ S$_C$* ←→ Iso<br>−10  93 | 3600 | 7.2 ms |
| Example 15 | glass ←→ S$_C$* ←→ Iso<br>−15  95 | 3100 | 3.8 ms |
| Example 16 | glass ←→ S$_C$* ←→ Iso<br>−15  95 | 3300 | 3.9 ms |
| Example 17 | glass ←→ S$_C$* ←→ Iso<br>−15  68 | 4100 | 3.0 ms |
| Example 18 | glass ←→ Iso<br>60 | 5700 | — |
| Example 19 | glass ←→ S$_C$* ←→ Iso<br>−15  76 | 2300 | 4.3 ms |
| Example 20 | glass ←→ S$_C$* ←→ Iso<br>−10  80 | 3500 | 5.7 ms |
| Example 21 | glass ←→ S$_C$* ←→ Iso<br>−15  83 | 3800 | 3.7 ms |

TABLE 1-continued

| | Phase transition behavior | Mw | Response time (room temperature) |
|---|---|---|---|
| Example 22 | glass ⇌ $S_C^*$ ⇌ Iso<br>−15　　　77 | 2600 | 2.6 ms |
| Example 23 | glass ⇌ $S_C^*$ ⇌ Iso<br>−15　　　74 | 2800 | 2.0 ms |
| Example 24 | glass ⇌ $S_C^*$ ⇌ $S_A$ ⇌ Iso<br>−20　　74　　82 | 1900 | 840 μs |
| Example 25 | glass ⇌ $S_C^*$ ⇌ $S_A$ ⇌ Iso<br>−20　　68　　77 | 1900 | 920 μs |
| Example 26 | glass ⇌ $S_C^*$ ⇌ Iso<br>−15　　　68 | 3700 | 2.1 ms |
| Example 27 | glass ⇌ $S_C^*$ ⇌ Iso<br>−20　　　55 | 3600 | 980 μs |
| Example 28 | glass ⇌ $S_C^*$ ⇌ Iso<br>−20　　　71 | 2000 | 800 μs |
| Example 29 | glass ⇌ $S_C^*$ ⇌ Iso<br>−20　　　75 | 1900 | 1.2 ms |
| Example 30 | glass ⇌ $S_C^*$ ⇌ Iso<br>−20　　　73 | 1500 | 800 μs |
| Example 31 | glass ⇌ $S_C^*$ ⇌ Iso<br>−15　　　71 | 1800 | 4.3 ms |
| Example 32 | glass ⇌ $S_C^*$ ⇌ Iso<br>−20　　　43 | 3400 | 940 μs |
| Example 33 | glass ⇌ $S_C^*$ ⇌ Iso<br>23　　　25 | 3300 | 900 μs |
| Example 34 | glass ⇌ $S_C^*$ ⇌ Iso<br>20　　　45 | 3000 | 1.3 ms |
| Example 35 | glass ⇌ $S_C^*$ ⇌ Iso<br>−20　　　45 | 3200 | 830 μs |

The phase transition temperatures were determined by observation with a polarizing microscope. The measurements of the phase transition temperatures and the response times were carried out in the same manner as those described in Example 36 with the exception that the measurements of response time was carried out by adjusting the cell thickness to 2 μm and applying a voltage of 20 V at room temperature. Mw represents the weight average molecular weights of the copolymers, which were estimated in those of PS (polystyrenes) from GPC measurements.

TABLE 5

| The results of the analyses of NMR charts |
|---|
| NMR of Examples 3, 4, 6, 8, 10, 12, 14, 18 and 19 |
| 0–0.2 ppm　Si—C$\underline{H}_3$ |
| 0.5–0.6 ppm　Si—C$\underline{H}_2$—C |

TABLE 5-continued

| The results of the analyses of NMR charts |
|---|
| NMR of Examples 3, 4, 6, 8, 10, 12, 14, 18 and 19 |
| 0.8–1.0 ppm　CH$_2$—C$\underline{H}_3$ |
| 1.1–1.9 ppm　C—C$\underline{H}_2$—C, CH—C$\underline{H}_3$ |
| 2.2–2.3 ppm　H$_2$C=CH—C$\underline{H}_2$—C (the end of main chain) |
| 3.1–3.5 ppm　C$\underline{H}$—O—C$\underline{H}_2$—C |
| 3.9–4.1 ppm 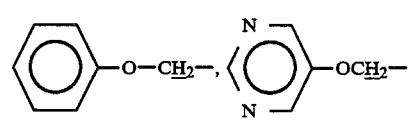 |
| 4.9–5.2 ppm　COO—C$\underline{H}$—, H$_2$C=C$\underline{H}$—C (the end of main chain) |
| 5.7–5.9 ppm　H$_2$C=C$\underline{H}$—C (the end of main chain) |

TABLE 5-continued

The results of the analyses of NMR charts
NMR of Examples 3, 4, 6, 8, 10, 12, 14, 18 and 19

6.8–8.4 ppm    aromatic ring

The copolymerization ratios determined from NMR charts

|  | Optically active component | Optically inert component |
|---|---|---|
| Example 3 | 62 | 38 |
| Example 4 | 79 | 21 |
| Example 6 | 89 | 11 |
| Example 7 | 60 | 40 |
| Example 8 | 41 | 59 |
| Example 10 | 81 | 19 |
| Example 11 | 80 | 20 |
| Example 12 | 77 | 23 |
| Example 14 | 82 | 18 |
| Example 18 | 81 | 19 |
| Example 19 | 79 | 21 |

EXAMPLE 36

The high polymer obtained in Example 3 and a ferroelectric liquid crystal (Trade name: CS-1015, produced by Chisso Sekiyukagaku Kabushiki Kaisha) were mixed in a weight ratio of 8:2 to obtain a composition.

Phase transition behavior of CS-1015
$$\text{glass} \xrightarrow{-17°\text{C.}} S_C^* \xrightarrow{57.6°\text{C.}} S_A \xrightarrow{67.9°\text{C.}} N^* \xrightarrow{78.1°\text{C.}} \text{Iso}$$

Mixing method 40 mg of the high polymer obtained in Example 3 and 10 mg of CS-1015 were dissolved in 5 ml of a solvent (dichloromethane), and the solution was agitated sufficiently, followed by evaporating the solvent approximately at 100° C.

The thus obtained composition was disposed between two glass substrates carrying their respective ITO electrodes (electrode area: 0.2 cm², the thickness of ITO: 1000 angstroms, cell thickness: 3 μm), and the identification of phases were conducted by using a polarizing microscope (magnification: ×400). A voltage of ±10 V was applied between the electrodes at need.

Phase transition behavior of the composition
$$\text{glass} \xrightarrow{-25°\text{C.}} S_C^* \xrightarrow{49°\text{C.}} S_A \xrightarrow{90-97°\text{C.}} \text{Iso}$$

The liquid crystal phases of the composition were observed to be uniform ones with no island structure characteristic of dispersion compositions, and the compatibility between the high polymer and the low molecular weight smectic liquid crystal was confirmed. Subsequently, the composition in the cell was oriented by applying a shear stress several times between the substrates facing each other at 85° C. (orientation by a shearing method). When a rectangular voltage of ±30 V between the electrodes at 25° C., a response time of 1.5 ms was measured.

EXAMPLE 37

The high polymer obtained in Example 18 and a low molecular weight liquid crystal of the following structure (Trade name: P1008, produced by Midori Kagaku Kabushiki Kaisha) were mixed in a weight ratio of 8:2.

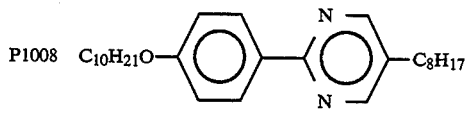

P1008

Phase transition behavior
$$\text{Cryst} \xrightarrow{20°\text{C.}} S_C \xrightarrow{64°\text{C.}} S_A \xrightarrow{68°\text{C.}} \text{Iso}$$

The mixing was carried out in the same manner as in Example 36.

Phase transition behavior of the composition
$$\text{glass} \xrightarrow{-15°\text{C.}} S_C^* \xrightarrow{73°\text{C.}} S_A \xrightarrow{80-84°\text{C.}} \text{Iso}$$

Response time at 25° C.: 1.3 ms

The measurements of the phase transition behavior and the response time were carried out in the same manner and under the same conditions as those of Example 36 with the exception that the orientation was carried out at 78° C.

The liquid crystal phases of the composition were observed to be uniform ones with no island structure characteristic of dispersion compositions, and the compatibility between the high polymer and the low molecular weight smectic liquid crystal was confirmed.

Although the high polymer obtained in Example 18 exhibits no liquid crystal phase by itself, the addition of the low molecular weight smectic liquid crystal (non-chiral) P1008 provided the ferroelectric liquid crystal composition that exhibited uniform liquid crystal phases including a ferroelectric phase and was usable as a liquid crystal optical device.

EXAMPLE 38

The high polymer obtained in Example 27 and the P1008 used in Example 37 were mixed in a weight ratio of 8:2.

Phase transition behavior of the composition
$$\text{glass} \xrightarrow{-20°\text{C.}} S_C^* \xrightarrow{74°\text{C.}} S_A \xrightarrow{80-83°\text{C.}} \text{Iso}$$

Response time at 25° C.: 850 μs

The measurements of the phase transition behavior and the response time were carried out in the same manner and under the same conditions as those of Example 36 with the exception that the orientation was carried out at 78° C.

EXAMPLE 39

The high polymer obtained in Example 28 and the following low molecular weight ferroelectric liquid crystal that was known one and synthesized by a common method were mixed in the ratios as listed in Table 4 by the same method employed in Example 36.

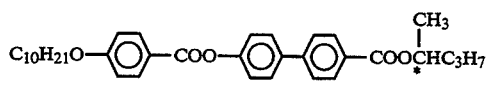

Phase transition behavior
$$\text{Cryst} \xrightarrow{45°\text{C.}} S_X^* \xrightarrow{53°\text{C.}} S_C^* \xrightarrow{107°\text{C.}} S_A \xrightarrow{132°\text{C.}} \text{Iso}$$

-continued (Sx*: a smectic phase of a higher order than that of Sc*.)

TABLE 4

| The high polymer of Example 28 : The low molecular weight liquid crystal | Phase transition behavior | Response time (25° C.) |
|---|---|---|
| 8:2 (weight ratio) | glass ←→ S$_C$* ←→ S$_A$ ←→ Iso<br>−20° C.   74° C.   100° C. | 530 μs |
| 6:4 (weight ratio) | glass ←→ S$_C$* ←→ S$_A$ ←→ Iso<br>−20° C.   60° C.   110° C. | 460 μs |

The measurements of the phase transition behavior and the response time were carried out in the same manner and under the same conditions as those of Example 36 with the exception that the orientation temperatures were 96° C. for the 8:2 composition and 106° C. for the 6:4 composition.

EXAMPLE 40

A liquid crystal optical device was produced by using a liquid crystal composition of the same composition as that in Example 37. A 20% by weight toluene solution of the composition was prepared and were applied to the electrode surface of an ITO-electroded polyether sulfone (PES) substrate to 3 μm thick by using a micro gravure coater. After drying the solvent, the same kind of a non-coated substrate was laminated on the coated substrate so that the liquid crystal layer was in contact with the electroded surfaces of the substrates, to obtain a sheet of unoriented device (width: 150 mm, length: 3 m).

Figure 26:
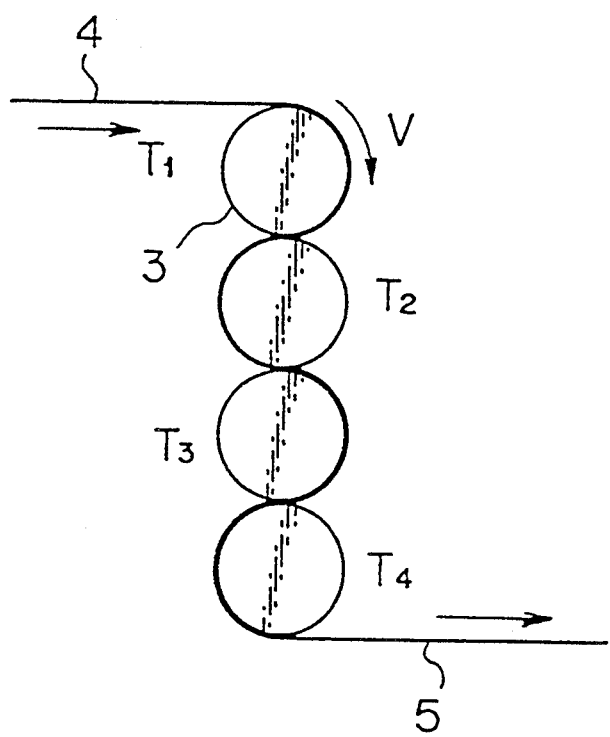
FIG. 26 is a drawing illustrating a method of producing a liquid crystal device.

Subsequently, by using an orienting apparatus as shown in FIG. 26 comprising four heating rolls, the unoriented device 4 was oriented by bending. Each heating roll 3 was a chromium-plated iron roll of 80 mm in diameter and 300 mm in width. The surface temperatures of the rolls were adjusted to $T_1=87°$ C., $T_2=83°$ C., $T_3=77°$ C. and $T_4=75°$ C., and the line speed to $v=8$ m/min. The liquid crystal composition in the unoriented device 4 was cooled from isotropic phase to a liquid crystal phase ($S_A$) by the orienting apparatus while it was applied with shear owing to bending. Finally, the liquid crystal composition aligned uniaxially and homogeneously in a direction perpendicular to the longitudinal direction of the substrates, and thus an oriented device 5 was obtained.

Two polarizers were arranged above and under the oriented device so that the polarizing axes intersect perpendicularly each other. When a voltage of ±20V was applied between the electrodes, the contrast was measured to be so good as 25 in contrast ratio.

Thus, it was substantiated that the composition was suitable for the continuous production of liquid crystal optical devices by employing the simple method as described above.

What is claimed is:

1. A ferroelectric liquid crystal composition comprising a high polymer comprising a recurring unit (I) represented by the formula:

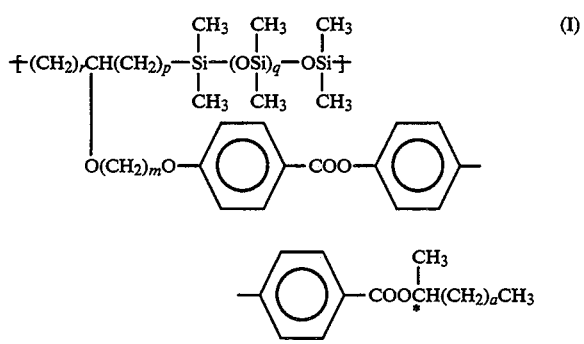

and a recurring unit (II) represented by the formula:

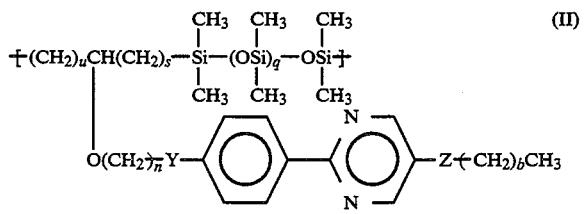

wherein
r, u, p and s each represent an integer of 2 to 5,
q represents a number of 0 to 20,
m represents an integer of 8 to 12,
n represents an integer of 6 to 15,
a represents an integer of 1 to 8,
b represents an integer of 5 to 15,
Y represents —O— or —COO—,
Z represents —O— or a single bond,
and * represents an asymmetric carbon, and
a low molecular weight smectic liquid crystal.

2. The composition of claim 1, wherein the high polymer comprises the recurring units represented by the following formulas:

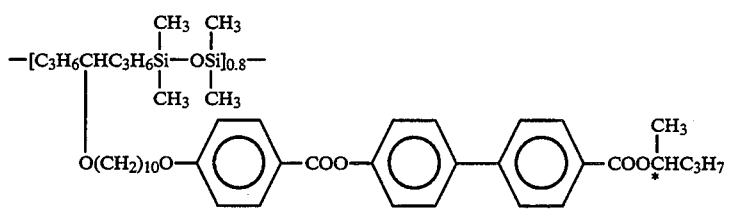

and

-continued

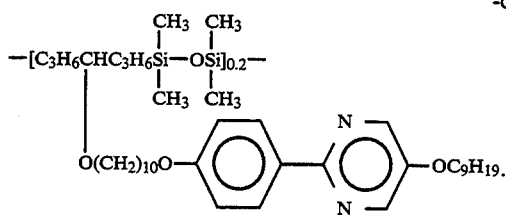

3. The ferroelectric liquid crystal composition as claimed in claim 1, wherein the ferroelectric liquid crystal composition contains 5 to 99% by weight of the high polymer based on the total of the high polymer and the low molecular weight smectic liquid crystal.

4. The ferroelectric liquid crystal composition as claimed in claim 3, wherein the high polymer and the low molecular weight smectic liquid crystal are compatible with each other and are present in the ferroelectric liquid crystal composition in a state of a uniform mixture.

5. The ferroelectric liquid crystal composition as claimed in claim 4, wherein the high polymer has a weight average molecular weight of 1,000 to 1,000,000.

6. The ferroelectric liquid crystal composition as claimed in claim 5, wherein the recurring unit (I) and the recurring unit (II) are present in the high polymer in a molar ratio (I):(II) ranging from 5:95 to 95:5.

7. The ferroelectric liquid crystal composition as claimed in claim 6, wherein r represents an integer of 2 or 3, p represents an integer of 3, q represents a number of 0 to 12, m represents an integer of 10, a represents an integer of 2 to 5, u represents an integer of 2 or 3, s represents an integer of 3, n represents an integer of 8 to 12, and b represents an integer of 6 to 11.

8. The ferroelectric liquid crystal composition as claimed in claim 7, wherein the high polymer is selected from the group consisting of a high polymer comprising the recurring units represented by the following formulas:

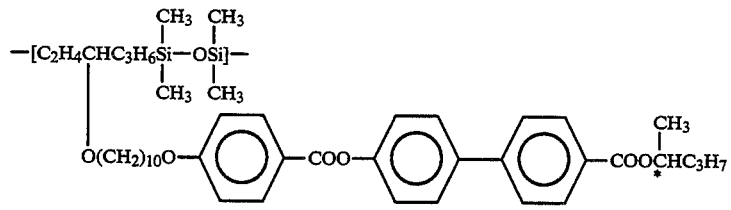

and

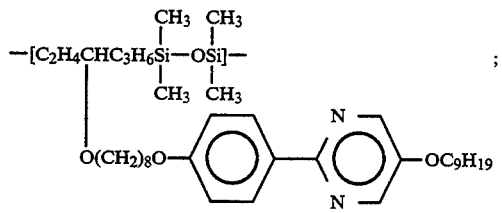

a high polymer comprising the recurring units represented by the following formulas:

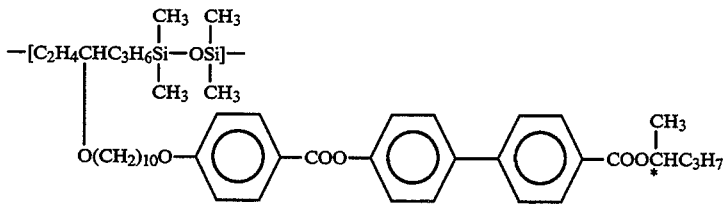

and

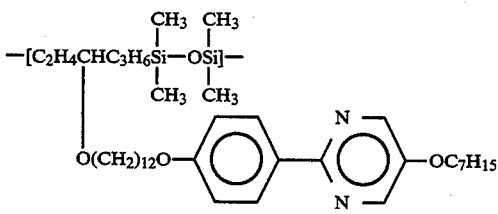

a high polymer comprising the recurring units represented by the following formulas:

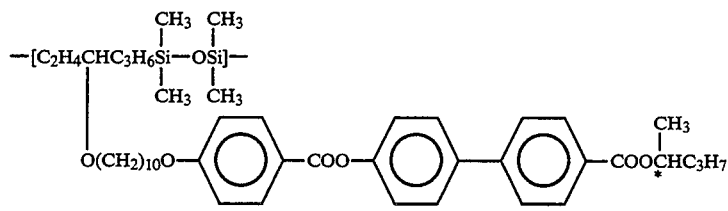
and
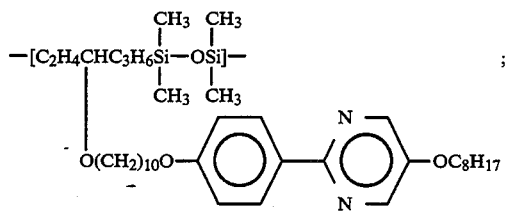
a high polymer comprising the recurring units represented by the following formulas:
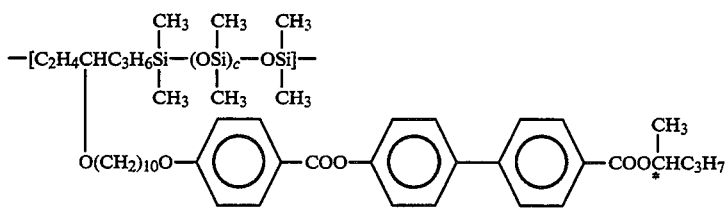
and
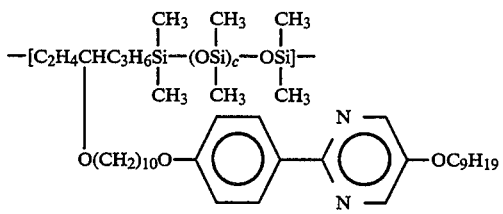
wherein c is an integer of 0, 1, 5 or 12;
a high polymer comprising the recurring units represented by the following formulas:
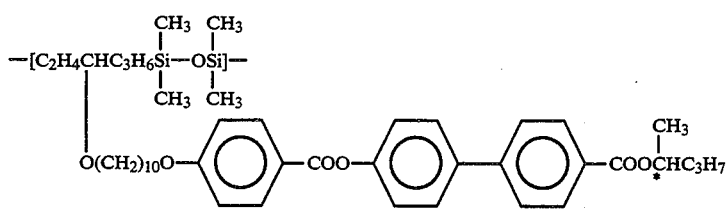
and
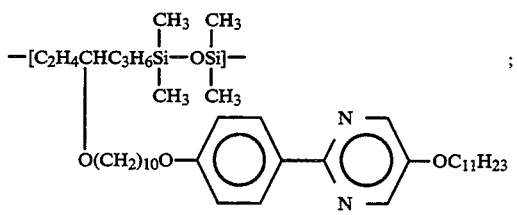
a high polymer comprising the recurring units represented by the following formulas:

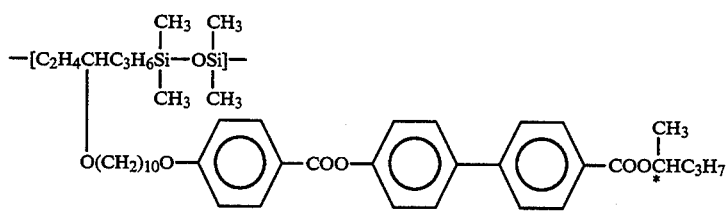
and
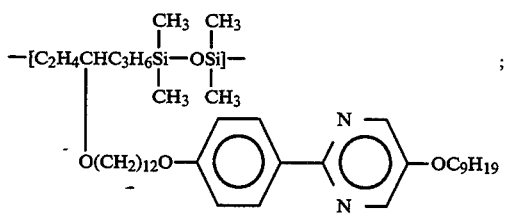
a high polymer comprising the recurring units represented by the following formulas:
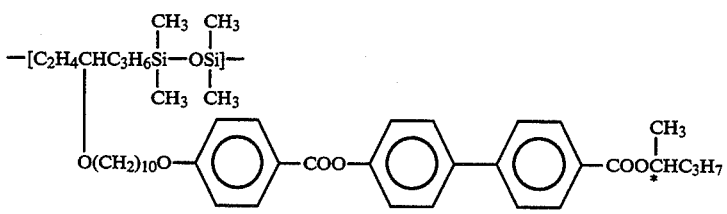
and
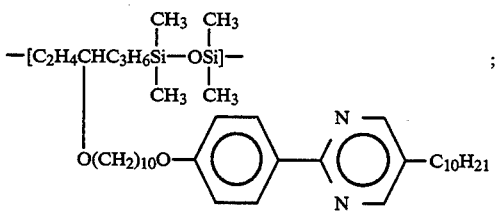
a high polymer comprising the recurring units represented by the following formulas:
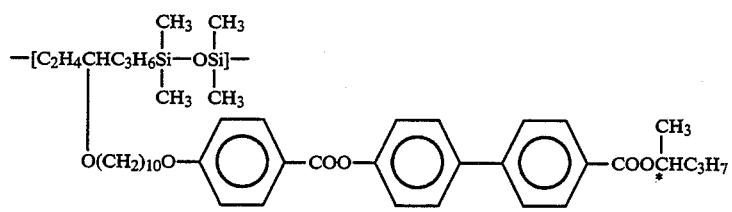
and
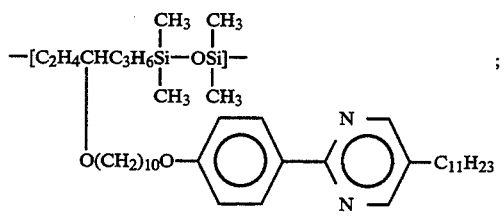
a high polymer comprising the recurring units represented by the following formulas:

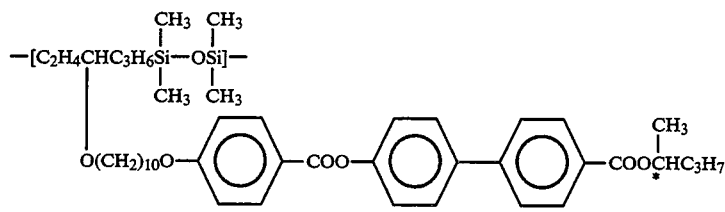
and
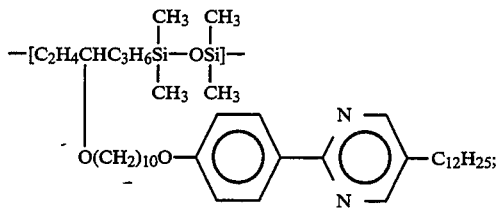
a high polymer comprising the recurring units represented by the following formulas:
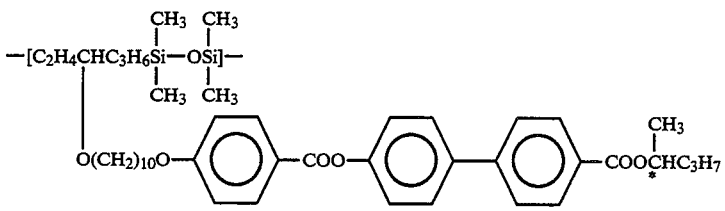
and
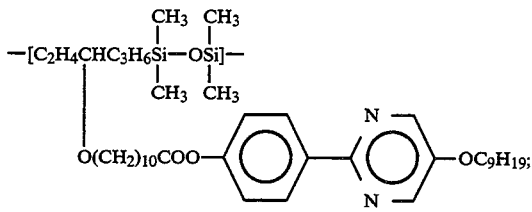
a high polymer comprising the recurring units represented by the following formulas:
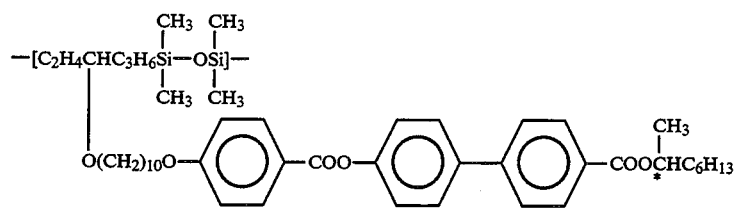
and
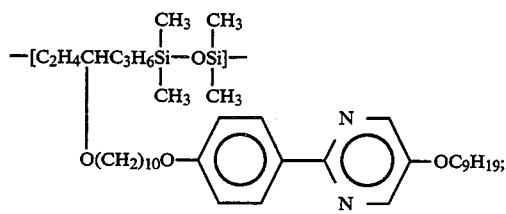
a high polymer comprising the recurring units represented by the following formulas:

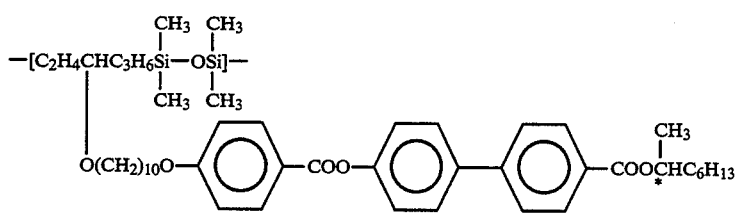
and
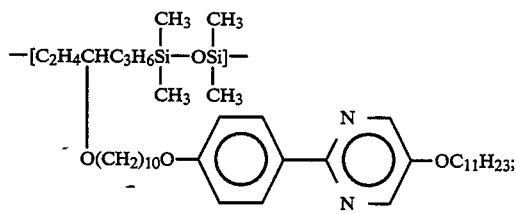
a high polymer comprising the recurring units represented by the following formulas:
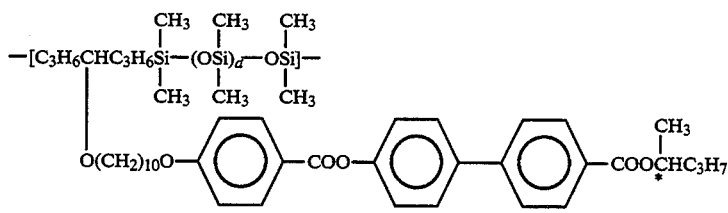
and
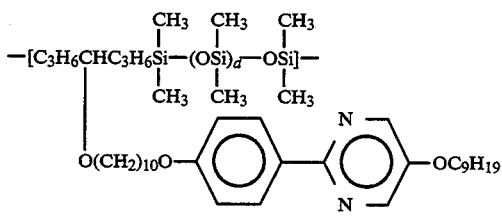
wherein d is an integer of 0, 1, 2, 4 or 5;
a high polymer comprising the recurring units represented by the following formulas:
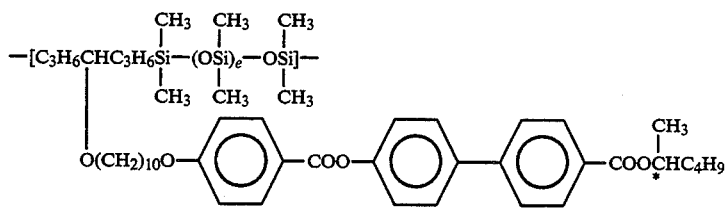
and
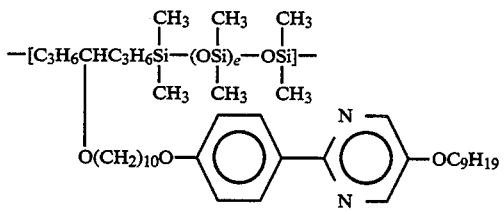
wherein e is an integer of 2 or 4;
and a high polymer comprising the recurring units represented by the following formulas:

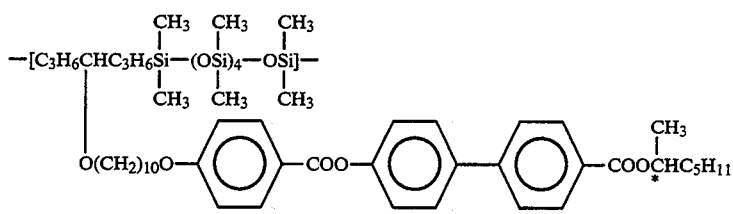

and

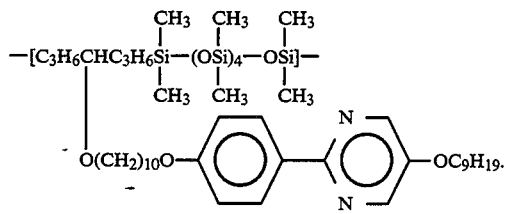

9. The ferroelectric liquid crystal composition as claimed in claim 8, wherein the high polymer is selected from the group consisting of
a high polymer comprising the recurring units represented by the following formulas:

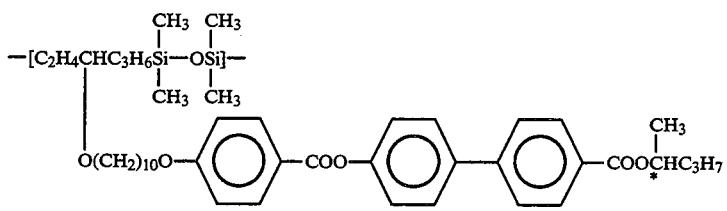

and

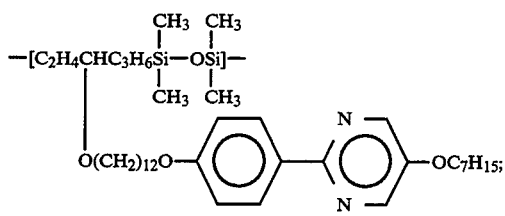

a high polymer comprising the recurring units represented by the following formulas:

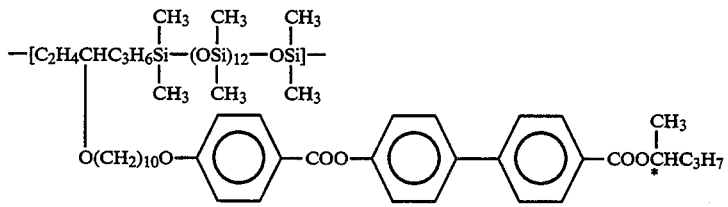

and

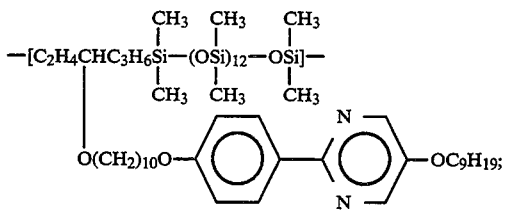

a high polymer comprising the recurring units represented by the following formulas:

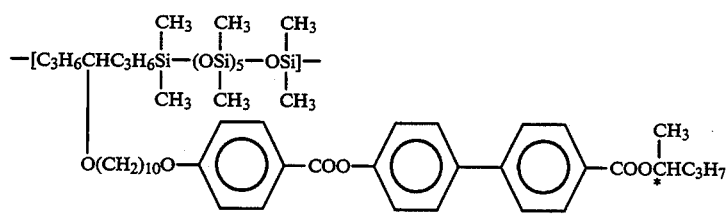

and

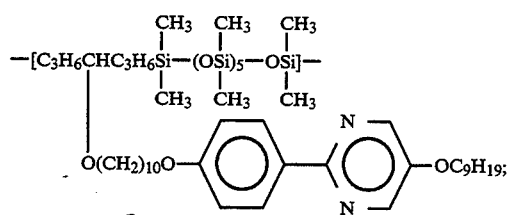

and a high polymer comprising the recurring units represented by the following formulas:

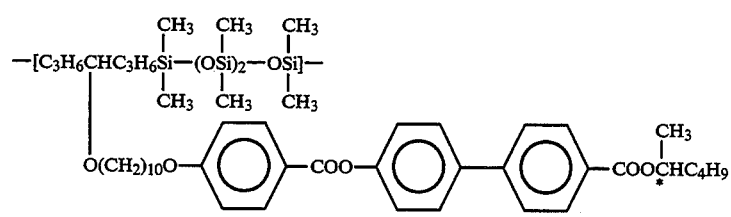

and

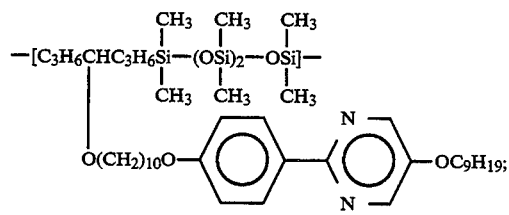

and the low molecular weight smectic liquid crystal is selected from the group consisting of a low molecular weight smectic liquid crystal represented by the following formula:

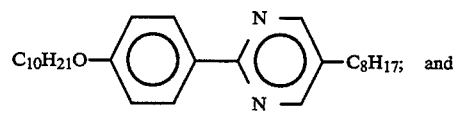

a low molecular weight smectic liquid crystal represented by the following formula:

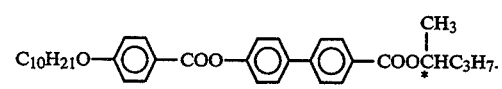

10. The ferroelectric liquid crystal composition as claimed in claim 5, wherein the low molecular weight smectic liquid crystal is selected from the group consisting of

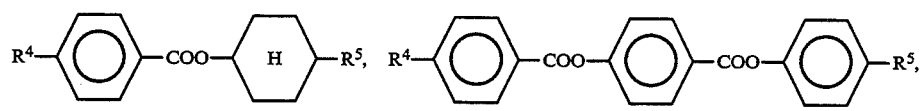

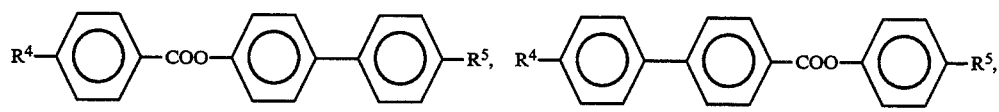

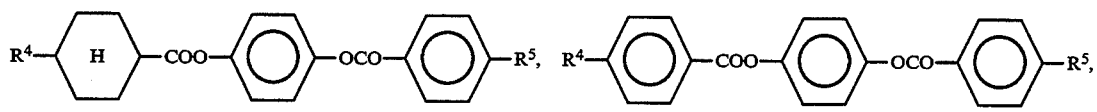

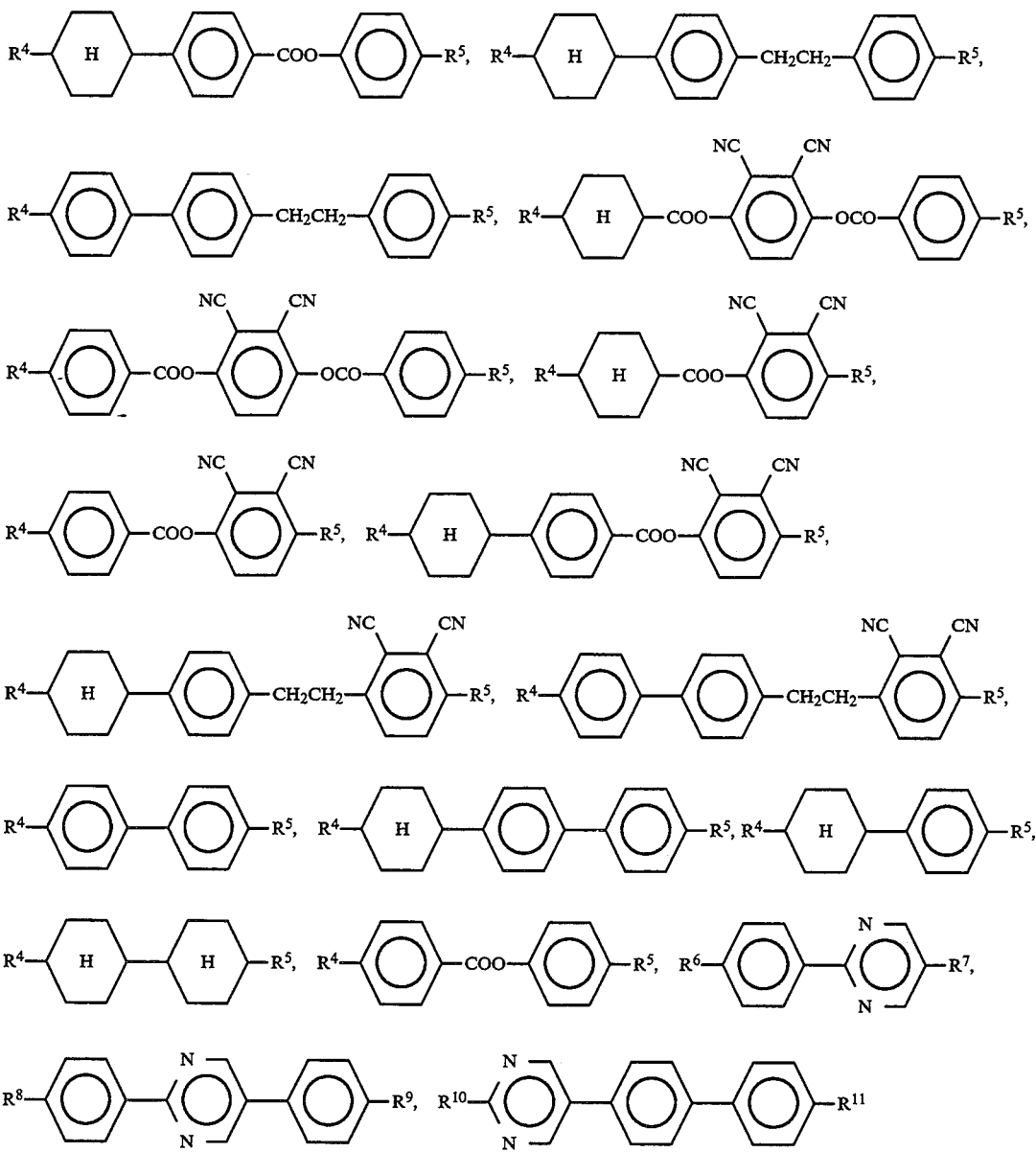

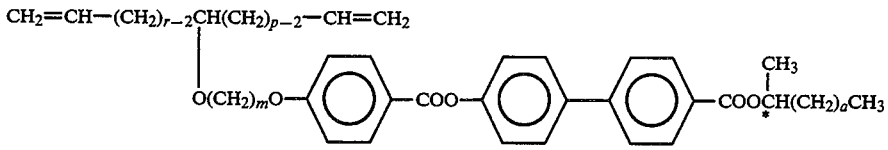

wherein r and p each represent an integer of 2 to 5, m represents an integer of 8 to 12, a represents an integer of 1 to 8, and * represents an asymmetric carbon, $R^4$ and $R^5$ each represent an alkyl of 1 to 12 carbon atoms, an alkoxy of 1 to 12 carbon atoms or an acyloxy of 1 to 12 carbon atoms, and are identical with or different from each other, $R^6$ represents an alkyl of 7 to 12 carbon atoms, an alkoxy of 6 to 11 carbon atoms or an acyloxy of 6 to 12 carbon atoms, $R^7$ represents an alkyl of 7 to 12 carbon atoms or an alkoxy of 6 to 11 carbon atoms, $R^8$ and $R^9$ each represent an alkyl of 4 to 14 carbon atoms or an alkoxy of 4 to 14 carbon atoms, and are identical with or different from each other, $R^{10}$ represents an alkyl of 4 to 14 carbon atoms, and $R^{11}$ represents an alkyl of 5 to 14 carbon atoms or an alkoxy of 4 to 14 carbon atoms.

11. The ferroelectric liquid crystal composition as claimed in claim 10, wherein the low molecular weight smectic liquid crystal is selected from the group consisting of

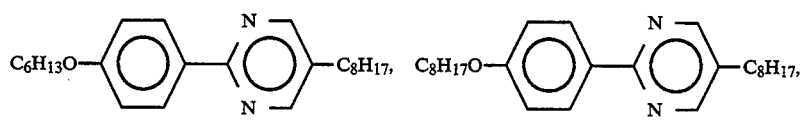
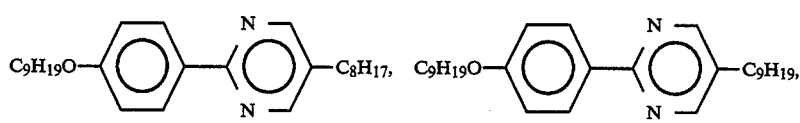
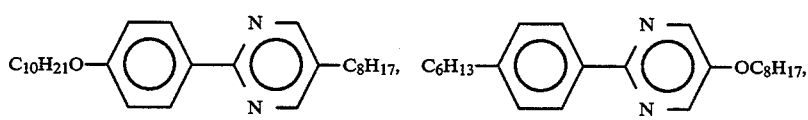
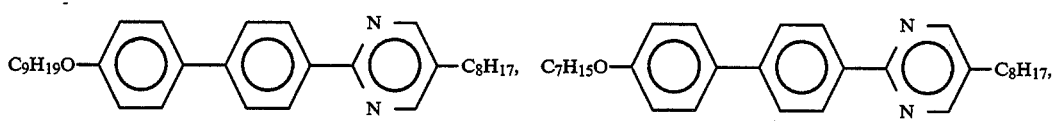
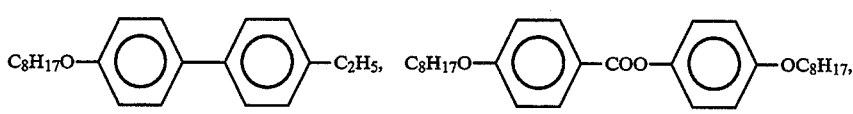
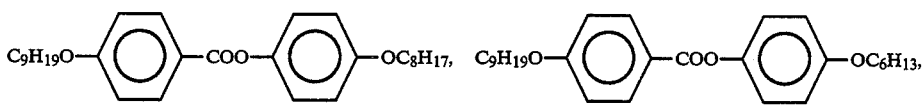
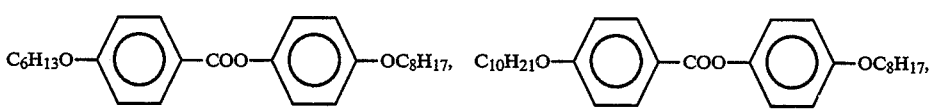
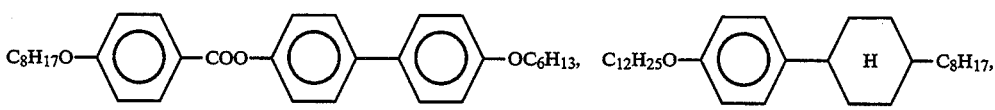
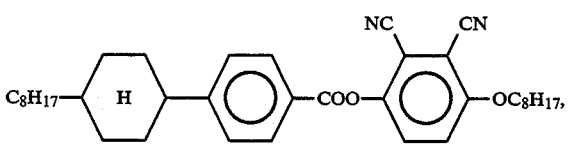
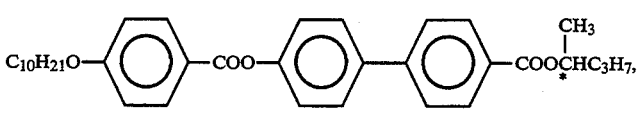
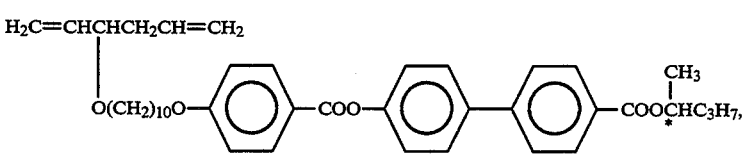
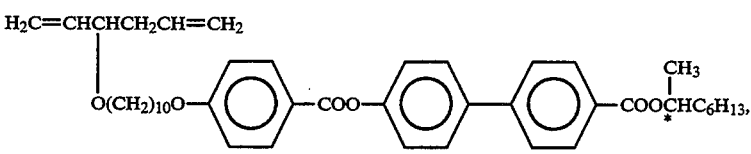

-continued
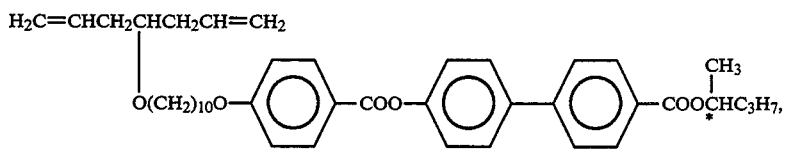
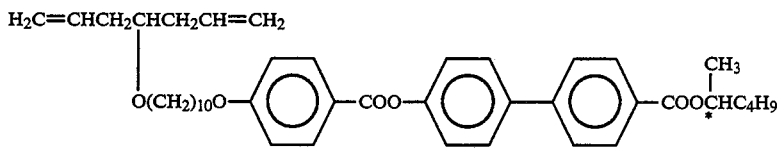
and
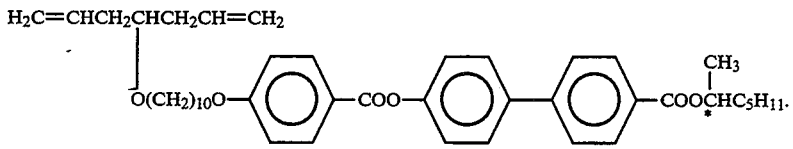
12. The ferroelectric liquid crystal composition as claimed in claim 11, wherein the low molecular weight smectic liquid crystal is selected from the group consisting of
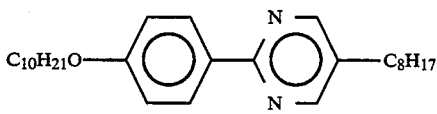
and
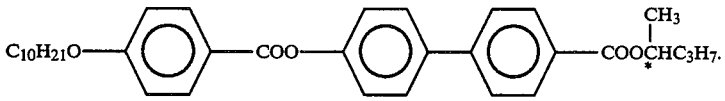
13. The ferroelectric liquid crystal composition as claimed in claim 5, wherein the low molecular weight smectic liquid crystal is a ferroelectric liquid crystal.
* * * * *